(12) United States Patent
Hart

(10) Patent No.: US 11,588,933 B2
(45) Date of Patent: *Feb. 21, 2023

(54) METHODS AND APPARATUS FOR IDENTIFICATION AND OPTIMIZATION OF ARTIFICIAL INTELLIGENCE CALLS

(71) Applicant: Ribbon Communications Operating Company, Inc., Westford, MA (US)

(72) Inventor: Justin Hart, Purton (GB)

(73) Assignee: Ribbon Communications Operating Company, Inc., Westford, MA (US)

( * ) Notice: Subject to any disclaimer, the term of this patent is extended or adjusted under 35 U.S.C. 154(b) by 132 days.

This patent is subject to a terminal disclaimer.

(21) Appl. No.: 17/156,608

(22) Filed: Jan. 24, 2021

(65) Prior Publication Data
US 2021/0144248 A1    May 13, 2021

Related U.S. Application Data

(63) Continuation of application No. 16/389,973, filed on Apr. 21, 2019, now Pat. No. 10,944,864.

(60) Provisional application No. 62/824,228, filed on Mar. 26, 2019.

(51) Int. Cl.
| | |
|---|---|
| *H04M 3/42* | (2006.01) |
| *H04M 3/436* | (2006.01) |
| *G06N 20/00* | (2019.01) |
| *H04M 3/493* | (2006.01) |
| *H04M 3/51* | (2006.01) |
| *H04M 3/523* | (2006.01) |

(52) U.S. Cl.
CPC ........ *H04M 3/42059* (2013.01); *G06N 20/00* (2019.01); *H04M 3/436* (2013.01); *H04M 3/4936* (2013.01); *H04M 3/5166* (2013.01); *H04M 3/5235* (2013.01); *H04M 2203/2027* (2013.01); *H04M 2242/24* (2013.01)

(58) Field of Classification Search
None
See application file for complete search history.

(56) References Cited

U.S. PATENT DOCUMENTS

| | | | | |
|---|---|---|---|---|
| 2010/0157853 A1* | 6/2010 | Li | ....................... | H04L 65/1079 707/E17.014 |
| 2011/0294478 A1* | 12/2011 | Trivi | ..................... | H04M 3/436 455/415 |

* cited by examiner

*Primary Examiner* — Nafiz E Hoque
(74) *Attorney, Agent, or Firm* — Straub & Straub; Stephen T. Straub; Michael P. Straub

(57) ABSTRACT

The present invention relates to communications methods and apparatus for determining whether a received call originated from an artificial intelligence system and the call handling procedures to be used on the received call based on whether or not the call was determined to have been originated from an artificial intelligence system. An exemplary method embodiment includes the steps of: receiving a first call; determining whether said first call originated from an artificial intelligence system; and when said first call is determined to have originated from an artificial intelligence system performing one or more artificial intelligence call handling operations.

20 Claims, 13 Drawing Sheets

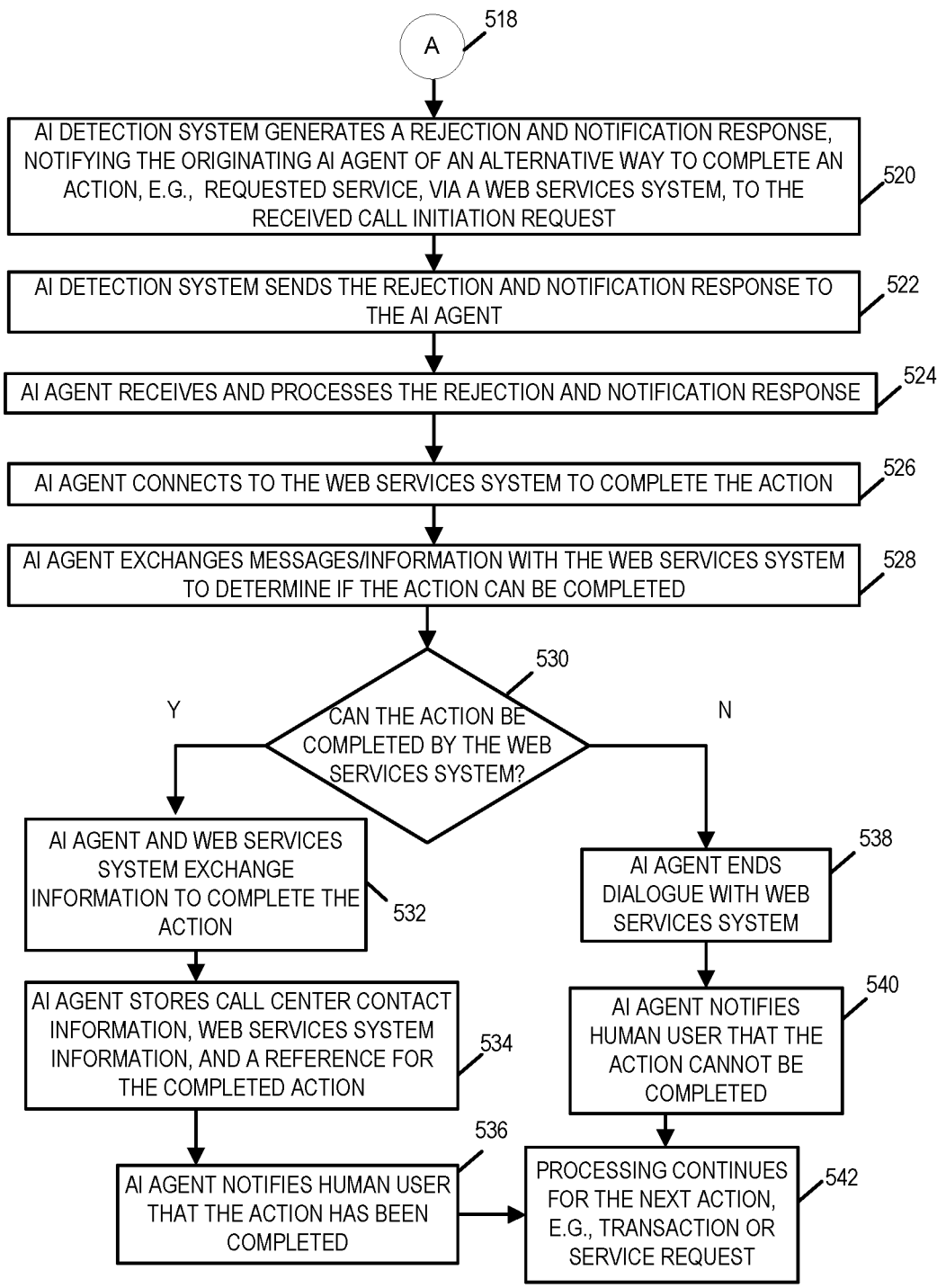

METHODS AND APPARATUS FOR IDENTIFICATION AND OPTIMIZATION OF ARTIFICIAL INTELLIGENCE CALLS

RELATED APPLICATIONS

The present application is a continuation of U.S. patent application Ser. No. 16/389,973 which was filed on Apr. 21, 2019 and published as U.S. Patent Application Publication No.: US 2020-0314246 A1 on Oct. 1, 2020 and which claimed the benefit of the filing date of U.S. Provisional Patent Application Ser. No. 62/824,228 filed on Mar. 26, 2019 each of the aforementioned patent applications and publications being hereby expressly incorporated by reference in their entirety. The present application hereby also expressly incorporates by reference in its entirety, U.S. Patent Application, entitled, "Methods And Apparatus For Identification And Optimization Of Artificial Intelligence Calls", inventor: Justin Hart, Applicant: Ribbon Communications Operating Company, Inc., filed on Apr. 21, 2019 and which issued as U.S. Pat. No. 10,645,216 on May 5, 2020.

FIELD OF INVENTION

The present invention relates to communications methods, systems and apparatus for identification and optimization of artificial intelligence calls/sessions in communications systems/networks.

BACKGROUND

Although uncommon today, the rapid progress being made in Machine Learning (ML) and Natural Language Processing is bringing within reach of the telecommunications industry the day when computer systems will be able to engage in conversation with humans to achieve an objective. This is best illustrated by the progress being made with today's mobile assistants such as for example, Alexa, Google Home, Siri and Cortana. The current state of the art is such that these systems are generally limited to simple request/responses. However, recent progress (most notable Google Duplex and Alexa "multi turn dialog"), extends this to the point where for short conversations the human participant may not be aware the other party is an Artificial Intelligence (AI).

This shift in abilities, introduces several implications to various industries and in particular to the telecommunications industry. Many of these abilities are advantageous, but there are some which require changes to the network to prevent abuse of systems and/or to optimize system resources. Key to preventing abuse of systems and/or optimizing system resources in such instances will be the ability to detect calls which are generated and/or controlled by artificial intelligence systems.

In order to further expound upon the need and/or desire for the ability to detect artificial intelligence calls, three exemplary scenarios in which the detection of artificial intelligence generated and/or controlled calls will now be discussed.

The first scenario relates to a new generation of robocalls whose implementation is anticipated. With the advancement of artificial intelligence and the ability to interact with humans in conversation, it is anticipated that a new generation of robocalls will also evolve beyond the simple "dial and play announcement/interactive voice response-script" style robocalls of today. The more natural engagement of artificial intelligence systems will result in end users being less aware a call is a robocall immediately, possibly changing call hold times, and making it less obvious to certain detection systems that robocalls are being received.

The second scenario relates to nuisance calls. It is not a given that these AI systems will always work effectively, and it is highly probable that some end systems (e.g., businesses) will consider these AI systems a source of nuisance calls. However, these AI calls can be highly distributed (e.g., being sourced from any arbitrary mobile device, e.g., smartphones, cellphone, tablet, etc.) and therein harder to screen based on source identifiers.

The third scenario relates to call handling. It is anticipated that enterprises and individuals receiving an inbound call will want the ability to treat calls generated by/received from an AI differently to calls from a human while no solution to this anticipated need currently exists.

From the foregoing it is apparent that there is a need for a technological solution to how to effectively, efficiently and in a cost-efficient manner identify artificial intelligence calls. Furthermore, there is a need for a technical solution to the problem of how to optimize resources in connection with artificial intelligence calls. There is also a need for inter-working of an "AI indication" between different signalling and media encoding schemes to aid compatibility in complex networks.

SUMMARY

The present invention relates to communications methods and apparatus for determining whether a received call originated from an artificial intelligence system and the call handling procedures to be used on the received call based on whether or not the call was determined to have been originated from an artificial intelligence system. Various embodiments of the present invention address and solve one or more of the technological problems discussed above.

An exemplary method embodiment of the present invention includes the steps of: receiving a first call; determining whether said first call originated from an artificial intelligence system; and when said first call is determined to have originated from an artificial intelligence system performing artificial intelligence call handling operations. In some embodiments, receiving said first call includes receiving first call origination signaling to establish said first call, said first call origination signaling including an indication whether the first call was originated from an artificial intelligence. The first call is typically initiated using one of the following protocols: Voice Over Internet Protocol, Session Initiation Protocol, ITU-T Recommendation H.323 protocol, and Signaling System No. 7 telephony protocol. In some method embodiments, the first call origination signaling includes a SIP INVITE message with said indication of whether said first call originated from an artificial intelligence being included in a parameter or header field of the SIP INVITE message.

In some embodiments, the determination of whether said first call originated from an artificial intelligence system is based on an indication included in said first call signaling or an indication included in said first call media that said call originated from an artificial intelligence device. In some such embodiments, the step of determining whether said first call originated from an artificial intelligence system includes one or more of the following: determining if an artificial intelligence indicator is present in call signaling of the first call (e.g., new SIP header/parameter in SIP INVITE or SDP mime (or equivalent signaling indicating source of the call); and determining if an artificial intelligence indicator is present in call media of the first call (e.g., audio signal such as a fixed tone, tone pattern, speech announcement designed to be understood by the human ear (e.g., "this is Alexa calling", "this is Google Assistant calling", "this is an Artificial Intelligence calling"), text or image designed to be understood by the human eye (e.g., text message indicating AI or image of an avatar representing an Artificial Intelligence).

The step of determining whether said first call originated from said artificial intelligence system may, and in some embodiments does, include one or more of the following steps: determining if an artificial intelligence indicator is present in said first call; processing the audio signal of the first call to determine if it is from an artificial intelligence; and processing the video signal of the first call to determine if it is from an artificial intelligence.

In at least some embodiments, the step of processing the audio signal of the first call to determine if it is from an artificial intelligence includes determining whether the audio signal of the first call includes a fixed tone, tone pattern or speech announcement indicating that the first call originated from an artificial intelligence system and determining that the first call was originated from an artificial intelligence system upon determining that the audio signal of the first call does include a fixed tone, tone pattern or speech announcement indicating that the first call originated from an artificial intelligence system.

In various method embodiments of the present invention, the method further includes the step of determining based on a call handling policy the call handling operations to be performed.

In various embodiments, one or more of the following call handling operations are performed when the first call is determined to have originated from an artificial intelligence system: placing said first call in a call waiting queue behind human originated identified calls; instructing the artificial intelligence system that originated the first call to call back at a different time via signaling inserted into the signaling or media path of the first call; instructing the artificial intelligence system that originated the first call to call back to different number via signaling inserted into the signaling or media path of the first call; redirecting or transferring the first call to a voice messaging system to take a record a message; redirecting or transferring the first call to an interactive voice response system that will acquire the artificial intelligence's contact information to contact the artificial intelligence at a future time; blocking the first call; rejecting the first call; instructing the artificial intelligence system that originated the first call to contact a web service system, the contact information (e.g., IP address, URL, web address) of said web service system being included in a signaling response or media response to said first call.

In some embodiments, the call handling operation(s) to be performed on the first call is further based on one or more of the following: a type of artificial intelligence system from which the first call originated; information identifying the specific artificial intelligence system which originated the first call; information identifying the specific version of the artificial intelligence system from which the first call originated; information about previous calls received from the specific artificial intelligence system which originated the first call (e.g., pattern of AI originated calls indicating robocall, malicious activity or potentially malicious activity); additional information about the first call (e.g., one or more of the following: callee, caller, location, time of day, date, types of media used to be used for the call, status of callee (office line, on-line, available, busy)). In some embodiments, information identifying the type and/or specific version of artificial intelligence system from which the call originated is communicated by the originating artificial intelligence system in the signaling or audio for the call. This information can then be used at least in some embodiments by the device which receives the call to determine the capabilities of the artificial intelligence system that originated the call, e.g., capabilities of Alexa version 1.0 vs. the capabilities of Alexa version 2.0. In some embodiments, the call handling policies to be implemented in response to the detection of an AI originated call take into account or are based upon the capabilities of the call originating AI system as informed by the type and/or of the call originating AI system. The type of the AI system can include the particular AI system, e.g., Amazon's Alexa, and/or capabilities of the AI system such as for example, AI system which makes robocalls.

The present invention is also directed to a method of operating a user device. In an exemplary embodiment, the user device is operated to: establish a first call with a second system by an artificial intelligence system or application included in the user device in response to a first request for service from a first user; request the service from the second system by playing an announcement; receive an indication that the second system is an artificial intelligence system via signaling or media received from the second system as part of the first call, said indication including a URI for a web service system; establish a connection with the web service system using said URI; complete a transaction with the web service system; notify the user of the user device that the requested service has been completed; store in memory of the user device the type of service requested by the user, contact information initially used to contact the second system, and the URI provided by the second system. In some such embodiments, the method further includes the artificial intelligence system or application included in the user device in establishing the first call including an indication in either the call signaling or the call media that the call is being originated from an artificial intelligence. In some embodiments of the method, the method includes the additional steps of: receiving a second request for service from a user of the user device, said second request being for the same type of service as included in said first request; refraining from initiating a call to the second system; retrieving from said memory said URI provided by the second system; establishing a second connection with the web service system using said retrieved URI; completing a second transaction with the web service system; notifying the user of the user device that the second requested service has been completed.

One or more embodiments of the present invention include one or more of the following features: (1) self identification of AI calls from the originating party via either signalling or media means, (2) interworking of an "AI indication" between different signalling and media encoding schemes to aid compatibility in a complex network, (3) identification by an intermediate node or terminating party of an AI originated call via media analysis, (4) differential treatment for AI originated calls versus human calls by means of policy applied either in the network or on an end point, (5) directing an AI call originator to reattempt at a later point or on a different path via signalling or media clues back to the originator, (6) identification that 2 AI systems are talking to each other, (7) directing AI system 1 to move to a M:M communication by AI system 2 (either via clues in the media path or signalling path) with the AI system 1 in some embodiments being the AI system that generated the call, (8) the advertisement of the capabilities offered by a M:M communication system to AI system 1 from AI system 2 via clues provided by AI 2 in either the media or signalling path with AI system 1 being the AI system that generated the call in some embodiments, (9) discovery by AI system 1 (e.g via a cache table) that the destination supports a web service or other M:M communication path that should be tried in preference to a voice call.

The invention is also directed to systems, devices and apparatus that are used to implement the various method embodiments of the invention. The systems, devices, and apparatus, in some embodiments, include a processor and a memory said memory including instructions which when executed by processor control the operation of the system, device or apparatus to perform one or more functions and/or steps of the various methods of the invention disclosed herein.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 5 comprises FIG. 5A, FIG. 5B, and FIG. 5C.

FIG. 5B illustrates the second part of a flowchart of a method in accordance with one embodiment of the present invention.

FIG. 8 comprises FIG. 8A, FIG. 8B, FIG. 8C and FIG. 8D.

DETAILED DESCRIPTION

Figure 1:
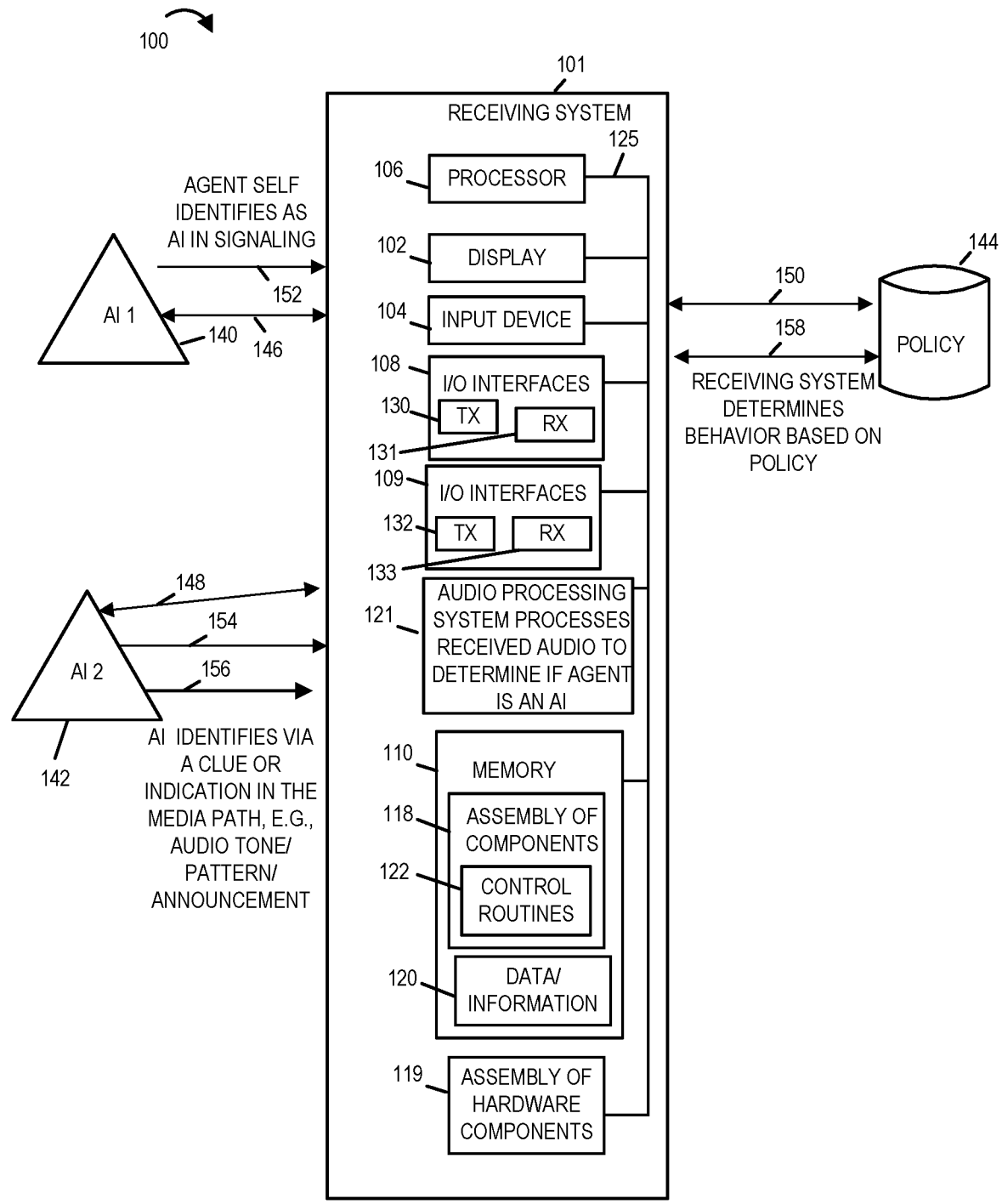
FIG. 1 illustrates a first exemplary system in accordance with an embodiment of the present invention in which artificial intelligence agents send artificial intelligence identification signals to a receiving system.

There are various types of Artificial Intelligence agents some of which will now be discussed. The term Artificial Intelligence agent refers to artificial intelligence device, system, and component, e.g., application executed on hardware device, e.g., a processor, in a communications device.

There are different reasons for companies and individuals to deploy an AI agent to place a call on their behalf. Some AI agents will be attempting to complete some useful task on behalf of a user such as for example book an appointment, change a flight, provide emergency notifications, etc., these AI agents have no agenda other than successfully completing their task as efficiently as possible for all involved. Failure to do so, could result in these agents being blocked or not used in future interactions which could in turn result in the loss of business or an inability to receive emergency notifications, etc.

However, there are other reasons a company might deploy such an AI agent, where the motives are not so innocent, such as robocalls, fraud or other "negative" use cases. In these cases, it is entirely possible and highly likely that the AI agent will not play nicely or cooperate with the far end, e.g., called party, and indeed will attempt to avoid detection.

Furthermore, in between these two extremes of behavior, there will no doubt be a large range of complexity and maturity in the AI agents themselves. This will result in differing abilities for the AI agents to achieve the desired end goal or objective, whether that is a co-operative or deceptive end goal or objective.

Presented below are a range of strategies and various methods for dealing with AI calls. Some strategies and methods are dependent on the level of co-operation provided by the AI agent. Various embodiments of the present invention include or address one or more of the following types of AI agents', devices', apparatus', components' or systems' behavior:

(1) Well behaved AIs that use techniques, standard or otherwise, to advertise themselves via an easily detectable media tone/pattern, or via signaling;

(2) Well behaved AIs that use a voice phrase to announce they are an AI;

(3) AIs that do not announce or identify themselves as AI with a voice phrase, but use a standard "voice" to speak; and (4) AIs that purposely attempt to mask/fool end users with variable voice characteristics/patterns.

In the above discussion, various scenarios in which it may be desirable for someone to use an AI to originate a call and some of the implications related to the scenarios were discussed. As previously mentioned, it is therefore highly desirable for there to be a way to identify an AI originated call to provide differentiated treatment to it. For example, calls identified as AI originated could be provided differentiated call handling such as for example, AI generated calls can be put into call hold queue(s) in preference to human originated calls. Therein helping to minimize wait times for end users. In another example, calls identified as AI may be instructed (i.e., via an announcement in the media path, or in designated signaling) to call back at a different time or on a different number to reduce busy hour queue times. In various embodiments of the present invention, one or more of the following methods of identifying an AI originated call is implemented.

In some embodiments, the AI provides a clue and/or an indication in the media of the call, early in the dialogue, such as for example, an audio tone and/or fixed announcement, that is designed to be easily processed by an audio signal processing device at the receiving end after the establishment of the call.

In some embodiments, the AI provides a clue and/or an indication in the call or session signaling of the call, e.g., in the signaling path, such as for example a new header/parameter in a Session Initiation Protocol (SIP) INVITE request or an Session Description Protocol (SDP) mime (or equivalent signaling) to indicate the source of the call. It should be appreciated that with respect to implementations using Session Initiation Protocol there are many different ways such an indication may be included in a SIP INVITE message. Some of the ways in which an indication a call is from an AI which may be included in a SIP INVITE message are:

(a) Extension of the "User-Agent" field;
(b) Extension of the "From" field;
(c) Addition of a new "P" or "X" header; and
(d) Addition of a new standard Request for Comment (RFC) approved header via the Internet Engineering Task Force (IETF) process.

For example, the User-Agent header is included in a SIP INVITE message and is defined in Internet Engineering Task Force IETF Request For Comment (RFC) 3261 entitled "SIP: Session Initiation Protocol" issued June 2002 which is herein incorporated by reference in its entirety. The User-Agent header provides a way to identify the type of device/software originating a session in SIP. In some embodiments, an explicit AI indication indicating that an artificial intelligence system is originating the session is provided in a SIP INVITE User-Agent header such as for example, "User-Agent: Alexa 2.0" which indicates that the Alexa version 2.0 Artificial Intelligence System originated the call or "User-Agent: AI 1.0" indicating more generically that an Artificial Intelligence System versions 1.0 originated the call.

Furthermore, the SIP Feature-Caps header may be, and in some embodiments is, used to convey an indication that a call originated from an Artificial Intelligence agent or system. Internet Engineering Task Force Request For Comment 6809 entitled "Mechanism To Indicate Support of Features And Capabilities in the Session Initiation Protocol (SIP)" and dated November 2018" which is hereby incorporated by reference in its entirety defines the Feature-Caps header/parameter. This is a generic parameter used to signal new SIP capabilities. Details of the new capabilities can be registered with IANA, but similar to the User-Agent header example no standards update is required. The contents of the Feature-Caps header/parameter can map to multiple domains (called trees), such as the SIP domain (sip.) or the global domain (g.) as used by the 3GPP. In some embodiments an existing domain is reused, or alternatively a new domain is added. For example, reusing the SIP domain, the header could be Feature-Caps: sip.AI-Agent-Calling which provides an AI indication that the call is originating from an AI-Agent or system. The Feature-Caps header would be included in a SIP INVITE request message. Another example using the global tree is the use of the Feature-caps: g.amazon.alexa-calling header which could be included in a SIP INVITE request message to indicate that the Alexa artificial intelligence system is originating the call.

Furthermore, in another example a SIP INVITE request message may include an AI indicator in a private (P-) header or experimental (X-) header to indicate that the call originated from an AI agent or system. For example, P-AI-Agent: Alexa is a private SIP header that may be included in a SIP INVITE request message to indicate that the call originated from an Alexa artificial intelligence agent/system. X-AI-Agent: Alexa is an example of X-header AI indicator that may be, and in some embodiments is, included in a SIP INVITE request message that indicates that the call originated from the Alexa artificial intelligence agent/systems.

In another example directed to Signaling System No. 7 calls, the AI provides a clue or an indication in the ISDN User Part (ISUP) Initial Address Message (IAM). The IAM contains the Calling Party Category (CPC) parameter, which is an 8 bit field that provides additional information regarding the nature of the party originating the call. See ITU-T Recommendation Q.763 (1999)—Amendment 3 (April 2004) entitled Series Q: Switching And Signalling Specifications of Signalling System No. 7—ISDN user part, Signalling System No. 7—ISDN user part formats and codes Amendment 3 which was approved on Apr. 13, 2004 by the ITU-T which is hereby incorporated by reference in its entirety. The IAM Calling Party's Category parameter field includes a number of spare codes and also codes reserved for national use. One of these spares codes or codes reserved for national use can be used to indicate that the originating party is an Artificial Intelligence party. The ISUP Initial Address Message also supports optional parameters, and in some embodiments, a completely new parameter is added to pass the information that the calling party is an Artificial Intelligence.

In some embodiments, the AI provides a voice announcement designed to be understood by a human ear, e.g., "this is Alexa calling". Such indications are harder for a receiving entity/device/system to automatically detect and understand, but detection of such AI indications can be achieved under certain circumstances using existing biometric systems.

System 100 of FIG. 1 illustrates an exemplary embodiment of the present invention. System 100 includes AI 1 140, AI 2 142, receiving system 101, and policy database 144. System 100 also includes communications links 146, 148, and 150 which couple and/or connect AI 1 140, AI 2 142, and the policy database 144 to the receiving system 101. The communications links may be wired or wireless. In some embodiments, the communications links are fiber optic cables. AI 1 140 and AI 2 142 are artificial intelligence systems or agents which are included in communications devices or are communications devices such as for example a user device, e.g., smartphone, computer, laptop, mobile device, etc. The communications device capable of making both AI originated calls and non-AI originated calls (e.g., calls originated/generated by a human). In some embodiments in which AI 1 140 and AI 2 142 are AI agents the AI agents are software components or applications and/or hardware components or a combination of software and hardware components, the software executing on hardware, e.g., a processor, in a communications device such as for example a user device, e.g., a smartphone, computer, laptop, mobile device, etc. The AI agent is typically a part of and communicates with an AI system, e.g., located in the cloud.

The receiving system 101 includes an optional display 102, an input device 104, a processor 106, e.g., a CPU, I/O interfaces 108 and 109, which couple the receiving system 101 to networks or communications links and/or various other nodes/devices/systems, memory 110, and an assembly of hardware components 119, e.g., circuits corresponding to different components and/or modules, coupled together via a bus 125 over which the various elements may interchange data and information. Memory 110 includes an assembly of components 118, e.g., an assembly of software components, and data/information 120. The assembly of software components 118 includes a control routines component 122 which includes software instructions which when processed and executed by processor 106 control the operation of the receiving system 101 to perform various functions and/or one or more steps of the various method embodiments of the invention. The I/O interface 108 includes transmitters 130 and receivers 131. The I/O interface 109 includes transmitters 132 and receivers 133. The I/O interfaces are hardware interfaces including hardware circuitry. The receiving system 101 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Internet Protocol (IP), Transport Control Protocol (TCP), User Datagram Protocol (UDP), Representative State Transfer (REST) protocol, SQL (Structured Query Language) Protocol, and HDFS Hadoop Distributed File System Protocol, SQL and/or HDFS being used to interface and access information from the various databases and/or storage devices to which it may be coupled. In some embodiments, the receiving system 101 includes a communication component configured to operate using IP, TCP, UDP, WebRTC protocols, REST protocol, SQL (Structured Query Language), HDFS Hadoop Distributed File System. In some embodiments, the communications component is a hardware component, a software component or a component including hardware and software components. While only a single hardware processor is illustrated in some embodiments, it is to be understood that receiving system 101 can include more than one processor with the processing being distributed among the plurality of processors.

The receiving system 101 also includes an audio processing system 121 that is configured to process received audio, e.g., audio from the media path of a call, to determine if the caller from which the media was received is an AI agent or system. The audio processing system 121 may be implemented as hardware circuitry or software stored in memory of the receiving system 101 and executed on processor 106 of the receiving system 101. In some embodiments the audio system 121 is implemented as one of the components of the assembly of components 119. In some embodiments, the audio processing system is implemented as one of the components of assembly of software components 118. In some embodiments for example those in which the received audio signal is a simple audio tone, audio tone pattern, and/or audio announcement the audio processing system 121 may be implemented as a hardware or software digital signaling processor (DSP). The audio processing system 121 may be, and in some embodiments is, a more elaborate biometric measurement system. Such biometric measurement systems are used for example when the received signal to be processed from the AI agent is a voice pattern that requires more complex analysis.

It is expected that some AI systems will implement one or more of these schemes voluntarily so that a callee will not be duped by the AI system. For example, Google in response to backlash in connection with Google's Duplex AI system has already stated that it would ensure that its AI systems would identify themselves at the beginning of a call so that the callee would not be duped. It is also possible that the Federal Communications Commission or other regulator body may choose to mandate such a scheme. For example, the FCC may mandate a scheme similar to the "STIR/SHAKEN" (Secure Telephony Identity Revisited)/(Secure Handling of Asserted information using toKENs) scheme for use with AI systems. STIR/SHAKEN being the industry-developed set of protocols and operational procedures for the cryptographic signing of telephone calls, designed to authenticate telephone calls and mitigate Caller ID spoofing and illegal robocalling.

In another exemplary embodiment of the present invention, a machine learning (ML) algorithm is implemented at the receiving system or terminal. The machine learning algorithm monitors the contents of the received media packets (e.g., Real-time Transport Protocol (RTP) packets). Currently, the speech generation used by AI's is tied to certain libraries of recorded speech patterns. Although the recorded speech patterns are mixed together in increasingly natural ways that mimic human speech patterns, there will still be limited variability in the way words are spoken for any given AI. The way words are spoken/pattern is detectable at least in some instances. The AI detection system would in some embodiments include training on new voice patterns as they are introduced. Training would also include sets of false data as well. In an exemplary embodiment, Biometric systems are used to create biometric signatures based on sample voice recordings of known AI systems. Upon receipt of a call, the received audio signal and in particular the voice pattern is checked against the biometric signatures created from the AI voice recording samples. When the check indicates that the voice pattern matches the biometric signatures, the system identifies the call as being from an AI system. In some embodiments, the determination of whether the voice pattern matches the biometric signatures is based on statistical analysis pattern matching in which a probability is generated as to whether a match has occurred. Based on the probability of a match, the AI detection system may perform different calling operations. For example, if the probability is 95% that there is a match indicating the call is from an AI system, the AI detection system may assign the call a lower priority in a call handling queue than other calls with a lower probability of being an AI system generated call. As an AI system generated voice pattern will vary minimally from pre-recorded samples this technique will be effective at identifying AI systems. With respect to AI systems, e.g., malicious systems, that are actively attempting to avoid detection, the biometric systems will still work for at least some of the AI system calls but additional techniques will need to be implemented wherein the AI detection system is frequently updated with new voice pattern samples from detected malicious AI systems.

Given that it is possible to communicate clues or indications that the originating agent of a call is an AI agent through both signaling, e.g., a new SIP header parameter, and media means, e.g., audio signal, and within those methods through several possible sub-options, there also exists a need to have an interworking AI detection system. For example, a first system may only be capable of detecting audio signals indicating the call is originated from an AI agent while another system may only be capable of receiving and/or understanding signaling based indications that a call is originated from an AI agent. An intermediate AI interworking detection system can be implemented that is capable of detecting AI systems through both implicit and explicit signaling and media means can be used. In such scenarios the intermediate AI interworking detection system receives both the signaling and audio for a call, monitors both the signaling and media path for an indication either implicit or explicit that the call has been originated from an AI system and then notifies the end system also referred to as the target, receiving or called system that the call is an AI system call when the indication indicates it is from an AI system or that it is not an AI system call when the indication or absence of an indication indicates it is not from an AI system. The notification may be, for example by inserting one or more explicit indications that the call originated from an AI system into one of or both of the signaling and media paths for the call depending on the known capabilities of the called, receiving or target system or by inserting one or more explicit indications that the call did not originate from an AI system into the signaling path for the call depending on the known capabilities of the called, receiving or target system.

Figure 2:
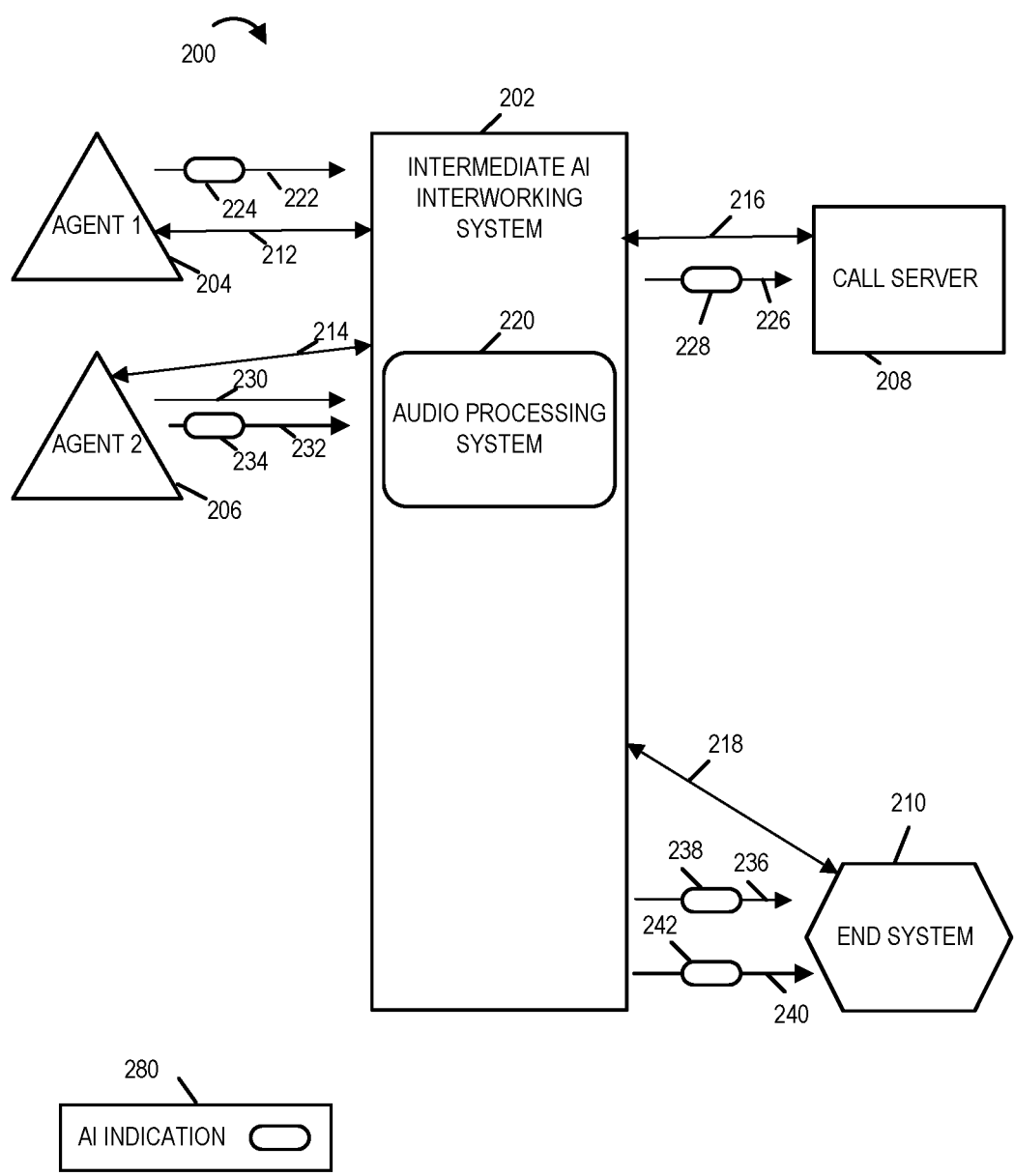
FIG. 2 illustrates a second exemplary system in accordance with an embodiment of the present invention which includes an Intermediate artificial intelligence interworking system.

FIG. 2 illustrates system 200 which is another exemplary embodiment of the present invention. System 200 includes exemplary intermediate AI interworking detection system 202, AI agent 1 204, AI agent 2 206, call server 208, end system 210, and a plurality of communications links 212, 214, 216 and 218 which couple AI agent 1 204, AI agent 2 206, call server 208 and end system 210 to intermediate AI interworking detection system 202 respectively. Intermediate AI interworking detection system 202 includes audio processing system 220 which processes incoming audio signals to determine if they originated from an AI agent or system. Legend 280 illustrated in FIG. 2 shows that the ⊃ symbol represents an AI signaling indication. In this example AI agent 1 204 only sends explicit AI identification indication(s) in the signaling path while AI agent 2 206 only sends explicit AI identification indication(s) in the media path. The Call Server 208 never receives media and therefore must get notified in the signalling plane. The capabilities of the End System 210 that is whether or not the end system can detect either AI indications in the signaling or in the media corresponding to a call are unknown to the intermediate AI interworking detection system 202. The intermediate AI interworking detection system 202 is aware that the call server 208 only receives call signaling and not media for the call either via setup configuration information or notification provided by the call server.

In operation when the intermediate AI interworking detection system 202 receives call initiation signaling 222, e.g., a SIP INVITE message, including an explicit AI indication 224, the intermediate AI interworking detection system 202 determines the call initiation signaling is to be sent to the call server 208. The intermediate AI interworking detection system 202 then analyzes the contents of the AI signalling indication 224 included in the call initiation signaling 222 (e.g., SIP header, SIP header parameter, SDP mime parameter, etc) and determines whether the explicit AI signaling indication 224 is compatible with the call server 208. That is does the call server 208 have the capabilities to detect and understand the explicit AI signaling indication 224. If the intermediate AI interworking detection system 202 determines that the AI signaling indication 224 is not compatible with the call server 208, the intermediate AI interworking detection system modifies or adjusts the explicit AI signaling indication to one or more formats supported by the call server 208. In some embodiments, the intermediate AI interworking detection system 202 will generate, as part of modifying or adjusting the explicit AI signaling indication 224, a different explicit AI signaling indication to insert into the call initiation signaling before transmitting it to the call server 208. For example, in some embodiments, the intermediate AI interworking detection system 202 generates call initiation signaling 226 based on the received call initiation signaling 222. The call initiation signaling 226 includes an explicit AI signaling indication 228 which is generated based on call initiation signaling 222, and in some embodiments, information regarding the AI signaling types supported by the call server 208. For example, the call initiation signaling 222 may be a SIP INVITE message including explicit AI signaling indication 224 which is an extension of the "User-Agent" field from which the intermediate AI interworking detection system 202 generates call initiation signaling 226 which is a SIP INVITE message including explicit AI signaling indication 228 which is an extension of the "From" field. The explicit AI signaling indication 228 being based on the explicit AI signaling information 224 and information that call server 208 supports identification of AI agent calls based on AI signaling indication which are an extension of the "From" field. In this way the intermediate AI interworking device 202 has performed the interworking function of converting the AI signaling indication from a type unsupported by the call server 208 to an AI signaling indication that is supported by the call server 208. Upon the receipt and processing of the call initiation signaling 226 by call server 208, the call server 208 is able to identify that call initiation signaling 226 is to initiate an AI agent originated call by analysis of the AI signaling indication 228.

When AI agent 2 206 initiates a call, it generates and sends a call initiation signal 230, e.g., SIP INVITE request message, to the intermediate AI interworking system 202 with the target or destination being the call server 208. In this example, the SIP INVITE request message does not contain an AI signaling indication as the AI agent 2 includes its AI indication in the media path after call establishment has been completed. As a result, the intermediate AI interworking detection system 202 upon receiving the call initiation signaling without an AI signaling indication terminates the call, setting up a media path connection between the AI agent 2 206 and intermediate AI interworking detection system 202. The intermediate AI interworking system 202 then receives the media signal 232, e.g., an audio signal, of the call. The media signal 232 includes AI audio indication 234. The intermediate AI interworking detection system 202 upon receipt of the media signal 232, the audio processing system 220 processes the media content which in this example is audio in order to determine if the call is an AI originating call. Upon the audio processing system 220 of intermediate AI interworking system 202 detecting the AI audio indication 234 included in the media signal 232, a determination is made that the call is an AI agent originated call. The intermediate AI interworking system 202 in response to determining that the call is an AI agent originated call generates the appropriate signalling indication towards the Call Server 208, e.g., call initiation signaling (e.g., SIP INVITE request message) with an AI signaling indication that is supported by the call server 208, e.g., an AI signaling indication which is an extension of the "From" field and is supported by the call server 208.

When AI agent 1 204 or AI agent 2 206 connect toward the End System 210, as the capabilities of the End System 210 are unknown to the intermediate AI interworking system, the intermediate AI interworking system is configured to generate an AI indication in both the media and signalling plane or path for the call. The intermediate AI interworking system therefore modifies/adjusts the received AI indications from either AI agent 1 204 or Agent 2 206. In the case of AI agent 1 204, the intermediate AI interworking system 208 generates an additional AI audio indication signal 238 and inserts it into the media signal 236 sent to the End System 210, in the case of AI agent 2 206, the intermediate AI interworking system processes the AI audio indication signal and generates an AI signalling indication 242 and adds it into the call initiation signaling 240 sent to the End System 210 while also either forwarding the AI audio indication signal and/or generating and sending a second AI audio indication signal which may be the same or different than the AI audio indication signal received from the AI agent 2 206. In this way, the End System 210 is provided both an AI signaling indication and an AI audio indication.

As explained above the intermediate AI interworking system 202 functions allow AI agents or systems to identify the calls they are originating to devices, systems and nodes that are not compatible with the method of AI identification being utilized by the AI agents or systems.

As a general rule it is undesirable to delay the media path cut through for normal human to human calls, so the above described interworking is typically based on policy determined by the operator, e.g., an enterprise operator, network operator, or service provider operator. It is however much more common to direct and hold the media of a call at an initial node (such as an IVR (Interactive Voice Response) system) for first or initial processing when contacting a call center.

Figure 3:
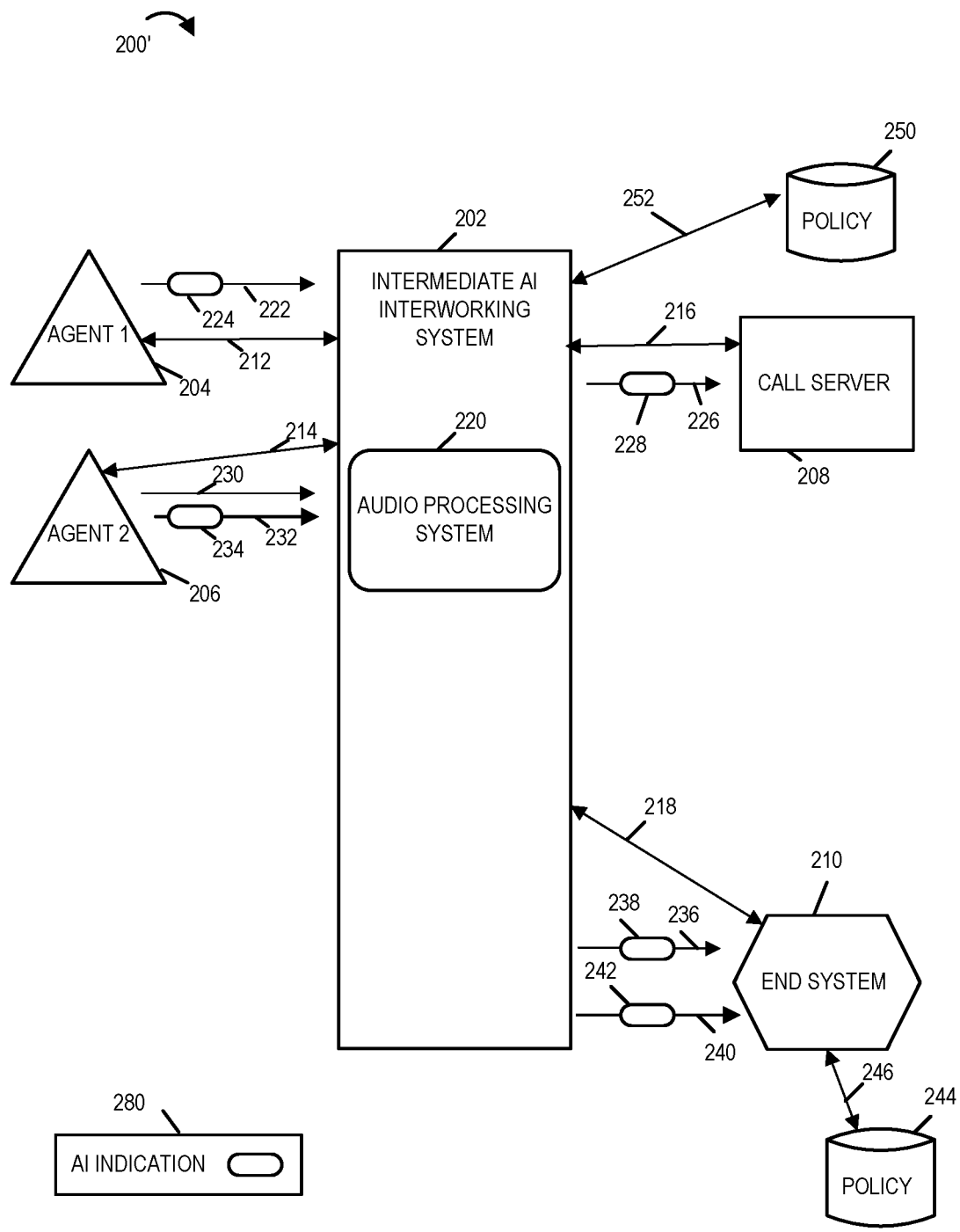
FIG. 3 illustrates a third exemplary system in accordance with an embodiment of the present invention.

System 200' shown in FIG. 3 illustrates another exemplary embodiment of the present invention. System 200' contains many of the same elements as discussed in connection with system 200 shown in FIG. 2. Elements or steps with the same reference numbers used in different figures are the same or similar and those elements or steps will not be described in detail again. System 200' of FIG. 3 also includes a policy database system 250 coupled or connected to the Intermediate AI Interworking System 202 via communications link 252 and a policy database system 244 coupled to the End System 210 via communications link 246. In some embodiments only one of the policy database systems 250 and 244 are utilized. In some embodiments, the policy database systems 250 and 244 each include a processor and memory, said memory including instructions which when executed by the processor control the processor to perform one or more functions or steps of the methods described in the various embodiments described herein. The policy database system 250 includes policies, e.g., rules and/or instructions to be implemented by the Intermediate AI interworking system 202 regarding how to handle AI detected calls. The policy database system 244 includes policies, e.g., rules and/or instructions to be implemented by the end system 210 regarding how to handle AI detected calls. The Intermediate AI Interworking System 202 retrieves and/or receives policies regarding how to handle AI detected calls from the policy database 250 for example at fixed times or upon the detection of an AI call. Similarly, the end system 210 retrieves and/or receives policies regarding how to handle AI detected calls from the policy database 244 for example at fixed times or upon the detection of an AI call. The database systems 250 and 244 may, and in some embodiments do, support one or more database query languages such as for example, SQL (Structured Query Language) Protocol and HDFS Hadoop Distributed File System Protocol language.

Once it is detected that the call is originated from an AI agent or system, policy can be applied to the call. The policy may be, and in some embodiments are, a set of instructions, commands, or rules implemented when certain conditions are satisfied, e.g., detection of an AI originated call, AI type, AI requested service, AI originated call address or identification, etc. Policy may either be applied by the end party itself, or a node within the network that receives the call first (such as for example an SBC, call server or other call processing or application node). Also policy may be selected and enforced on behalf of either an end user or an operator, e.g., network operator. Such policies can interact and overlap. For example, an operator may decide to block all calls detected as being AI originated irrespective of whether an end user wants them or not. Or the operator may choose to block calls detected as being AI originated by default, but allow the end user to override network decisions and allow AI calls for some cases or under certain conditions. Alternatively, the operator may block none of the detected AI originated calls, but offer a service to an end user where the user can selectively block some AI agents, preventing the calls from ever reaching the end user.

A wide variety of call handling operations are available once a call has been detected as an AI generated or originated call. Some examples of specific types of policies that may be, and in some embodiments are, implemented and enforced will now be discussed. The specific call handling operations which will be discussed include call blocking of calls identified as AI originated calls, differential routing for calls identified as AI originated calls, redirection of calls identified as AI originated calls, and call back instructions for calls identified as AI originated calls. It is to be understood that unless otherwise stated the policies may be implemented by the operator network equipment (e.g., within the operator's network) or by the end customer equipment (e.g., at the end customer's location, e.g., customer premise) such as for example by customer premise equipment (CPE). Furthermore, the AI policies and call handling operations may also be determined by further operator defined policy based on how the operator wishes to offer services.

Call blocking: In an exemplary embodiment, an operator or user determines that they want to block all calls from any caller identified as an AI, or selectively block certain types of AI or even specific originating AIs. In such a case, network equipment and/or user equipment in response to determining that the call originated from an AI caller generates and sends the originating user or caller a message indicating that the call will not be progressed, e.g., a SIP 4xx code indicating the call will not be progressed, resulting in the call not being completed but instead being blocked.

Differentially Route: Network operator and/or user equipment is configured to implement different routing of AI originated calls or subsets of AI originated calls or calls from selected types of AIs such as for example to different destinations or via different communications paths (e.g., communications links with lower quality of service). In one example, calls identified as AI originated are parked in a queue while calls which are not determined to be AI originated calls are not parked in a queue but are directed immediately to their destinations. The call signalling for the AI originated call completes as normal, but the SIP INVITE or other call initiation signaling is routed to a different location or destination address. In some embodiments, a determination is made as to which of a set of different AI agents originated the call and based on the determination of which AI agent originated the call, the call is routed to different destinations. In this way, calls identified as corresponding to different AI calling agents are routed differently.

Redirect: Network operator or user equipment is configured to redirect calls identified as being originated from an AI, particular AIs or a type of AI to one or more different end user(s) or location(s). For example, to a different call centre, or to specific lines for dealing with AI traffic, traffic corresponding to specific AIs or AI types. As an example, an end user may decide that originating AI's must connect via a premium (paid) number, rather than a free phone number. In such a case the network equipment or user equipment upon determining that the call is an AI originated call generates and sends the originating AI agent or system a redirection message, e.g., a SIP 3xx response message, that the originating AI agent or system upon receipt would use or follow in accordance with normal SIP procedures to locate the new destination to which the AI originated call is being redirected. In such cases, the destination of the redirection may, and in some embodiments is, determined based on the type of AI originator, or the specific AI originator.

Instruct to call later: Operator network equipment or user equipment, in some embodiments is, configured to send a message to the AI originating system to re-attempt the call at a later time. For example, the network equipment or user equipment may be, and in some embodiment is, configured to determine whether or not an AI originated call should be queued and when it is determined that the call is not to be queued, generates and sends the AI originating system or agent a message to call back at a later time. For example, based on a time of day, or how busy a call or contact centre is, the network or user equipment determines that queuing a call identified as being originated from AI system or agent is undesirable. As this AI system or agent that originated the call is a machine, it's appropriate to program the AI system or agent with instructions to re-attempt the call at a different time/date upon receipt of a particular response message indicating that the call should be retried. This could be achieved by adding an extension or header into a SIP 4xx response, such that the call is terminated, but at the same time a new date/time is offered to the originating user, e.g., AI system or agent. The AI system or agent upon receipt of the SIP 4xx response message with the added extension or header providing a new date/time can then cache the new date/time and set a reminder or event trigger to reattempt the call at that time/date.

It should also be understood that these examples of policy can be further combined with many factors to refine the set of calls to which the AI call handling operations will be applied and treatments or call handling operations to be applied. For example, call handling operations to be performed may be, and in some embodiments are, determined based on the identification of the call originator being an AI system or agent, a type of AI or specific AI in combination with one or more attributes of the call, e.g., data readily available about the callee, caller, location, time of day, date, types of media used, state of callee (offline, on-line, available, busy), as well as attributes of previously received calls, e.g., pattern of AI originated calls indicating robocalling, malicious activity or potentially malicious activity, etc.

Furthermore, there is an additional case where the policy implemented upon the detection of an AI originated call is to direct the originating AI to switch to a different mode of communication to achieve its aim or the objective of its call. This is discussed in further detail below wherein Machine to Machine Communication embodiments are explained. In some embodiments, this is achieved by the network or user device upon detection of a call from an AI originated system generates and sends a response message to the AI originating system instructing it to switch to a different mode of communication such as for example to a machine to machine mode of communications wherein the AI originating system is redirected to a non-human computer system to handle a transaction.

AI Adoption at the Call Receiver End

The present invention is also directed to cases and embodiments in which enterprises or businesses utilize or adopt their own AI systems to optimize the use of resources at the receiving end of calls. While current interactive voice response (IVR) systems are limited to a fixed set of options that they can offer (either in a list or tree format). This lends itself well to mapping to a set of definable services that can be offered to a machine customer, or which a machine customer can learn.

In cases where AI originated calls are identifiable (e.g. via one of the previously described mechanisms). It should be understood however that the deployment of biometric systems to verify the voice pattern of the caller are particularly well suited to deployment into an IVR/call center environment. Any caller into an IVR/call center environment or system expects to be received by an automated system, so the end user experience does not radically change when the AI is used for receiving calls. This is much less the case with a call directed to an end user, where such a system is much less likely to be used. However, in such cases it is also applicable to voice mail systems wherein callers to direct end users do expect to receive an automated system experience.

Machine to Machine Communications

For incoming human calls, the AI receiving system will progress as if it is an IVR system, interrogating the user/calling party for information to either answer a query or direct the user to the correct party.

For incoming AI calls, the result is that two AI systems or agents wind up using human speech to attempt to negotiate their end goal or objective which in most instances will be inefficient for both parties, and will tie up telephony resources unnecessarily. A better approach is to redirect the originating AI to a web service, where the dialogue can progress through other mediums/mechanisms.

Figure 4:
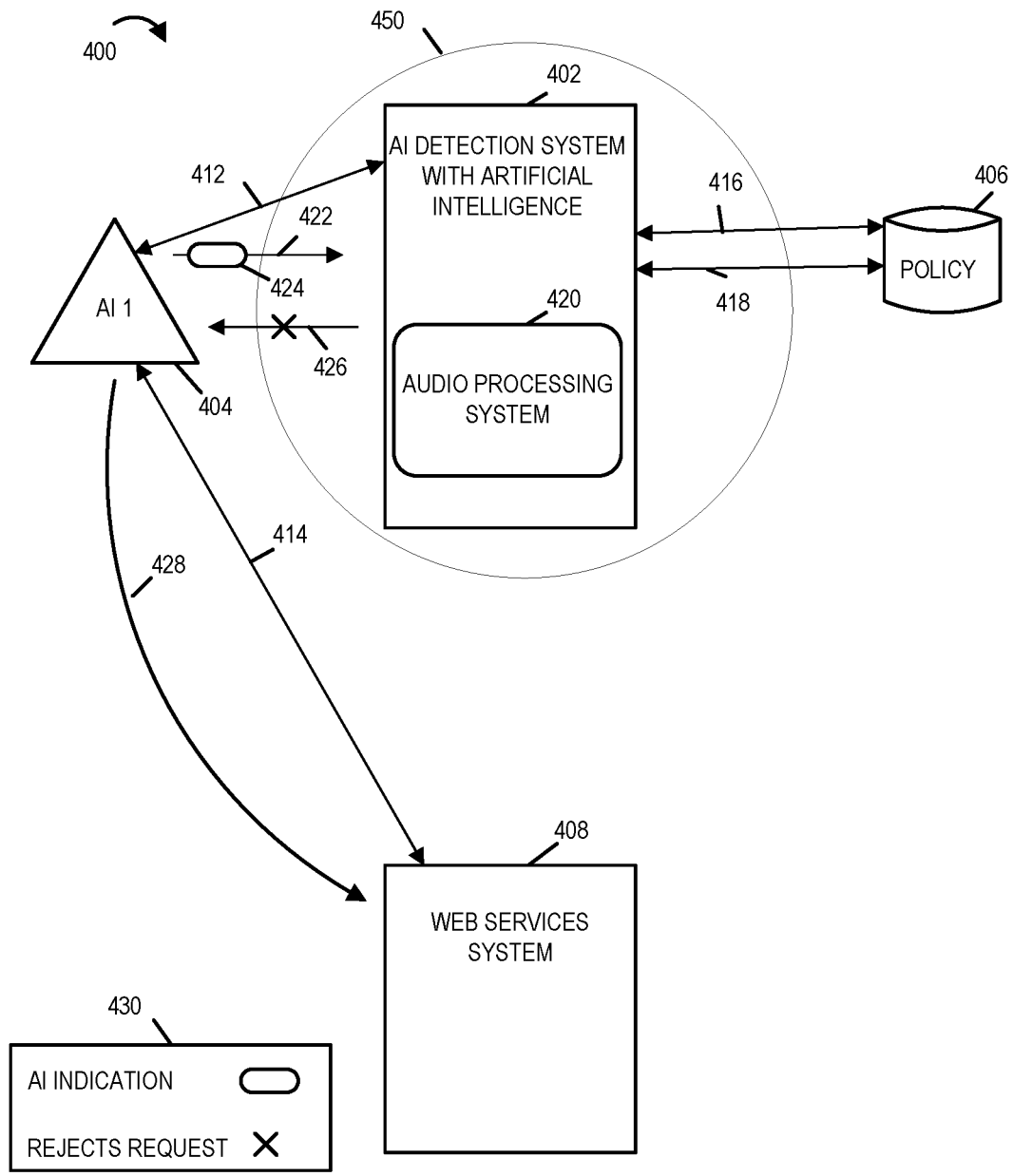
FIG. 4 illustrates a fourth exemplary system in accordance with an embodiment of the present invention which includes an Artificial Intelligence Detection System using artificial intelligence.

FIG. 4 illustrates an exemplary system in which machine to machine communications are implemented in accordance with an embodiment of the present invention. System 400 includes intermediate AI detection system 402, AI agent 1 404, policy database system 406, Web Services System 408 and a plurality of communications links 412, 414, and 416. Communications link 412 and 416 couple AI agent 1 404 and policy database system 406 to AI detection system 402 respectively. Communications link 414 couples AI agent 1 404 to Web Services System 408. AI detection system 402 includes audio processing system 420 which processes incoming audio signals to determine if they originated from an AI agent or system. The AI detection system 402 is also an artificial intelligence system. In this example AI detection system 402 is located in call center 450. Legend 430 shows that the ⌬ symbol represents an AI signaling indication and that X symbol represents a request rejection.

Generally speaking the system works in the following manner. AI agent 404 contacts the call center 450 to request completion of an action, e.g., making a flight reservation. AI detection system 402 of the call center identifies that the call is from an AI agent and rejects the request, notifying the AI agent of an alternative way to complete the action via a Web Services System 408. AI agent 404 connects to the Web Services System 408 to complete the action. There are two main ways this method may be, and typically is, implemented. In the first, the call is held open while the AI agent 404 attempts to complete the action with the Web Services System 408 while in the second the call is closed. Some of the features of the how the call held open and call closed variations of the method will now be discussed.

The system operates in the following manner when the call is held open. The AI detection system 402 which is itself an AI system and can be referred to as the terminating AI system, determines the incoming call is from an AI and therefore this is an AI to AI call. The AI detection system 402 uses the audio or signaling exchange of the call to provide the originating AI, AI agent 404, a Universal Resource Identifier, web address or IP address for where the originating AI, AI agent 404, can locate a Web Service, e.g., a URI for Web Service System 408, to complete the service request. The originating AI, AI agent 404, in parallel opens a web connection to the Web Service, e.g., Web Service System 408 providing the web service, and verifies the services offered by the Web Service, e.g., Web Service System 408. If the request can be completed via the Web Service System 408, the call between the originating AI agent 404 and the AI detection system 402 (i.e., the terminating AI system of call center 450) will be terminated. If however, the request cannot be completed via the Web Service, e.g., Web Service System 408, the AI originating agent will hold the voice line open and wait for a human operator of the call center to be available to help complete the transaction. For example, the call center 450 terminating AI system being configured to transfer the call to a human operator after a certain period of time has elapsed without an entry. The period of time being configured to a time deemed sufficient to allow a calling AI agent to determine whether or not the Web Service System 408 can complete the requested service(s).

The system operates in the following manner when the call is not held open but is instead closed after notification is sent to the originating AI agent of the address of a web service, e.g., Web Server System 408. The AI detection system 402 also sometimes referred to as the terminating AI system or agent determines the incoming call is from an AI and therefore this is an AI to AI call. This may occur either via identification of an explicit AI indication in the call signaling and/or an AI indication (either implicit or explicit) in the call media indicating the call is from an AI, e.g., audio tone, pattern, detection of an announcement message, or speech recognition. The terminating AI rejects the call, but advertises a Web Service URI, e.g., a URI for Web Server System 408, in the call release signaling (such as for example via an extension to a SIP 4xx message or similar messaging). The release signaling releases, i.e., closes or ends the call between the originating AI agent or system 404 and the AI detection system which is the terminating AI system 402 in this case. In some embodiments, the Web Service URI is included in the media signaling wherein the terminating AI 402 plays an audio message providing the Web Service URI or a message providing and/or identifying how the originating AI agent or system 404 can contact the Web Service, e.g., Web Service System 408, before releasing or closing the call. In response to receiving the Web Service URI from the terminating AI 402, the originating AI agent 404 opens a web connection and verifies the services offered by the Web Service. For example, originating AI agent 404 using the URI provided by the terminating AI 402 to setup a connection to the Web Server System 408 and then verifies the services the Web Services System 408 offers for example by determining, e.g., via querying the Web Server System 408, regarding the services it offers. If the Web Services System 408 is determined to offer the requested services, the originating AI 404 completes the service via that method. Otherwise the dialogue ends and the service can not be completed, e.g., the AI is unable to make a flight reservation. In some embodiments, when the originating AI 404 determines it is unable to complete the service request, the originating AI notifies its human user that the user needs to take over to complete the requested service if possible or that the requested service was not completed.

Figure 5A:
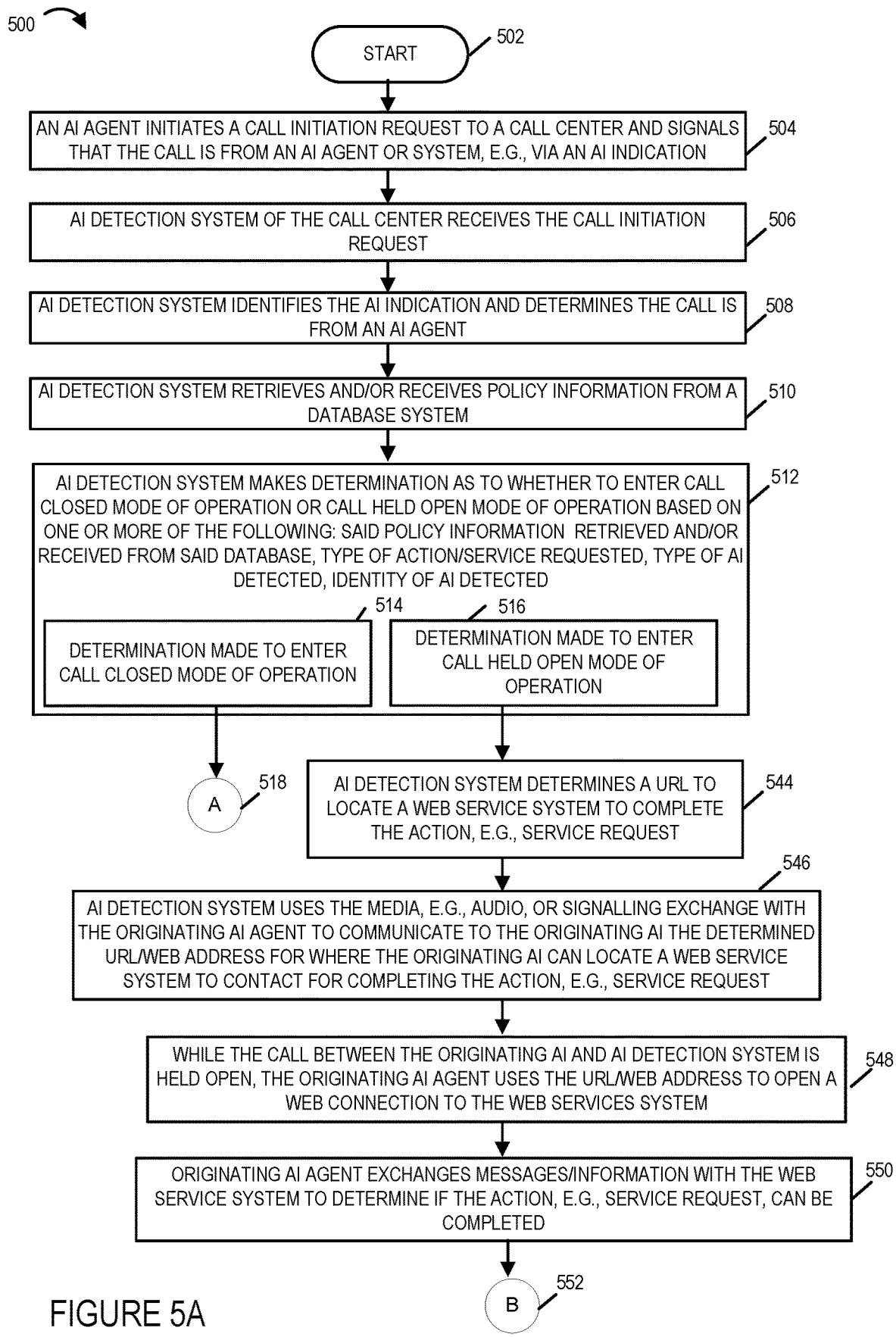
FIG. 5A illustrates the first part of a flowchart of a method in accordance with one embodiment of the present invention.
Figure 5C:
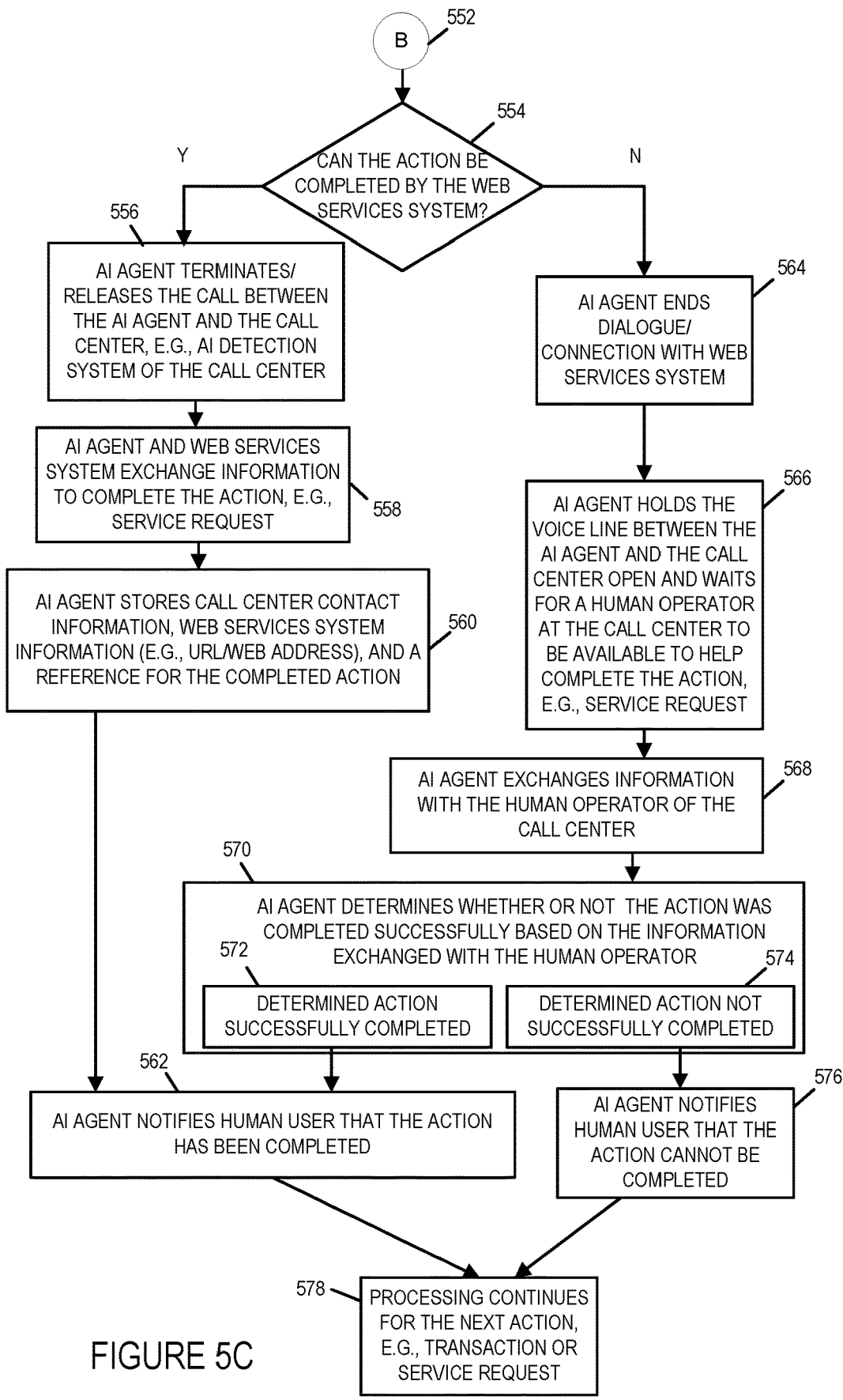
FIG. 5C illustrates the third part of a flowchart of a method in accordance with one embodiment of the present invention.

FIG. 5 comprises FIG. 5A, FIG. 5B and FIG. 5C. FIG. 5A illustrates the first part of a flowchart of a method in accordance with one embodiment of the present invention. FIG. 5B illustrates the second part of a flowchart of a method in accordance with one embodiment of the present invention. FIG. 5C illustrates the third part of a flowchart of a method in accordance with one embodiment of the present invention.

FIG. 5 illustrates the steps of a flow chart of an exemplary method 500 of machine to machine communications in accordance with one embodiment of the invention which will now be described using system 400. It is to be understood that system 400 is only being used for explanatory purposes and that the method 500 may be, and in some embodiments is, used with other systems and/or devices.

The exemplary method 500 starts in start step 502 shown on FIG. 5A. Operation proceeds from start step 502 to step 504.

In step 504, AI agent 1 404 initiates a call to the call center 450 via call initiation request 422 which includes AI signaling indication 424 identifying that the call is from an AI agent or system. The initiation of the call is in response to a user input into the AI system 404 to complete an action, e.g., service request such as obtain a flight registration in response to the user input, e.g., user inputted voice or text commands, requesting a flight registration be obtained. Operation proceeds from step 504 to step 506.

In step 506, the AI detection system 402 of the call center 450 receives the call initiation request 422. The AI detection system 402 is itself an artificial intelligence system sometimes referred to as a terminating AI system. Operation proceeds from step 506 to step 508.

In step 508, the AI detection system 402 identifies the AI indication 424 in the call initiation request 422 and determines that the call is from an AI agent. In this example, the AI indication 424 is an explicit signaling indication, e.g., AI indication information included in a SIP INVITE message or in an SDP message included in a SIP INVITE message wherein the SIP INVITE message is the call initiation message. Operation proceeds from step 508 to step 510.

In step 510, the AI detection system of the call center retrieves and/or receives policy information 418 from a database system, e.g., policy database system 406. Operation proceeds from step 510 to step 512.

In step 512, the AI detection system 402 makes a determination as to whether to enter call closed mode of operation or call held open mode of operation based on one or more of the following: said policy information retrieved and/or received from said database system, type of action/service being requested, type of AI detected, and identity of AI detected. Step 512 includes sub-steps 514 and 516. In sub-step 514, the AI detection system 402 makes the determination to enter call closed mode of operation. Operation proceeds from sub-step 514 via connection node A 518 to step 520 shown on FIG. 5B. In sub-step 516, the AI detection system 402 makes the determination to enter call held open mode of operation. Operation proceeds from sub-step 516 to step 544.

In step 520, the AI detection system 402 based on the policy information 418 retrieved and/or received from database system 406 generates a rejection and notification response 426 to the received request to initiate a call 422. The rejection and notification response 426 includes information rejecting the call initiation request but notifying the AI call originating agent 404 of an alternative way to complete the action, e.g., requested service, via a Web Services System 408. In some embodiments, the rejection and notification response 426 includes contact information such as a URI, URL, or IP address for the Web Services System 408. Operation proceeds from step 520 to step 522.

In step 522, the AI detection system 402 sends the rejection and notification response 426 to AI agent 1 404 in response to the call initiation request 422. Operation proceeds from step 522 to step 524.

In step 524, the AI agent 1 404 receives and processes the rejection and notification response 426. Operation proceeds from step 524 to step 526.

In step 526, AI agent 1 404 connects to the Web Services System 408 to complete the action, e.g., complete the flight registration. Operation proceeds from step 526 to step 528.

In step 528, AI agent 1 404 exchanges messages/information 428 with the Web Services System 408 to determine whether the requested service, e.g., flight reservation, can be completed by the Web Services System 408. Operation proceeds from step 528 to decision step 530.

When it is determined in decision step 530 that the action, e.g., requested service, can be completed by the Web Services System 408, operation proceeds from decision step 530 to step 532. When it is determined in decision step 530 that the Web Services System 408 can not complete the requested service, operation proceeds from step 530 to step 538.

In step 532, the AI agent 1 404 and Web Service System 408 exchange information to complete the action, e.g., requested service, e.g., make the flight reservation. Operation proceeds from step 532 to step 534.

In step 534, the AI agent 1 404 stores in memory, e.g., cache memory of the device on which the AI agent 1 404 is implemented, the contact information for the call center 450 along with the contact information provided for the Web Service System 408 as well as a reference to the service requested. In this way in the future when the AI agent 1 404 wants to request the same service instead of calling the call center 450 it will automatically connect instead to the Web Service System 408. Operation proceeds from step 534 to step 536.

In step 536, the AI Agent 1 404, notifies the human user that the action, e.g., requested service, has been completed. After notifying the human user of the AI agent 1 404 that inputted the request for service that the action has been completed, operation proceeds from step 536 to 542.

In step 542, processing continues for the next action, e.g., service request.

Returning to step decision step 530, when it is determined that the action, e.g., requested service, cannot be completed by the Web Service System 408 operation proceeds from step 530 to step 538 as previously explained.

In step 538, the AI agent 1 404 ends the dialogue established with the Web Services System 408. Operation proceeds from step 538 to step 540.

In step 540, the AI agent 1 404 notifies the human user that the requested action, e.g., requested service, could not be completed. Operation proceeds from step 540 to step 542 wherein processing continues for the next action, e.g., service request.

Returning to sub-step 516 of step 512, as previously discussed when the AI detection system 402 makes the determination to enter in to the call held open mode of operation, operation proceeds from sub-step 516 of step 512 to step 544.

In step 544, the AI detection system 402 determines a Universal Resource Locator (URL)/web address that the AI agent 404 can use to locate a web service system to complete or attempt to complete the action, e.g., service requested. Operation proceeds from step 544 to step 546.

In step 546, the AI detection system 402 uses the media, e.g., audio, or signaling (control signaling) exchange with the originating AI agent 404 to communicate to the originating AI agent 404 the determined URL/web address for where the originating AI agent 404 can locate a Web Services System, e.g., Web Services System 408, to contact for completing or attempting to complete the action, e.g., the service requested. Operation proceeds from step 546 to step 548.

In step 548, while the call between the originating AI agent 404 and the AI detection system 402 of the call center 450 is held open, the originating AI agent 404 uses the URL/web address to open a web connection (e.g., web connection 414) to the Web Services System 408. Operation proceeds from step 548 to step 550.

In step 550, originating AI agent 1 404 exchanges messages/information 428 with the Web Services System 408 over the web connection to determine whether the action, e.g., requested service, e.g., flight reservation, can be completed by the Web Services System 408. Operation proceeds from step 550 via connection node B 552 to decision step 554 shown on FIG. 5C.

When it is determined in decision step 554 that the action, e.g., requested service, can be completed by the Web Services System 408, operation proceeds from decision step 554 to step 556. When it is determined in decision step 554 that the Web Services System 408 can not complete the requested service operation proceeds from step 554 to step 564.

In step 556, the originating AI agent 404 terminates/releases the call between the originating AI agent 404 and the call center 450, e.g., AI detection system 402 of the call center 450. Operation proceeds from step 556 to step 558.

In step 558, the AI agent 1 404 and Web Services System 408 exchange information to complete the action, e.g., requested service, e.g., make the flight reservation. Operation proceeds from step 558 to step 560.

In step 560, the AI agent 1 404 stores in memory, e.g., cache memory of the device on which the AI agent 1 404 is implemented, the contact information for the call center 450 along with the contact information provided for the Web Services System 408 as well as a reference to the action/service requested. In this way in the future when the AI agent 1 404 wants to request the same action/service instead of calling the call center 450 it will automatically connect instead to the Web Services System 408. Operation proceeds from step 560 to step 562.

Returning to step decision step 554, when as previously discussed the AI agent 404 determines that the action/service request can not be completed by the Web Services System 408, operation proceeds from step 554 to step 564.

In step 564, the originating AI agent 404 ends the dialogue/connection with the Web Services System 408. Operation proceeds from step 564 to step 566.

In step 566, the AI agent 404 holds the voice line of the call between the AI agent and the call center (e.g., AI detection system of the call center 450) open and waits for a human operator at the call center to be available to help complete the action, e.g., service request. In some embodiments, the AI detection system will transfer the call to a human operator after a predetermined amount of time has been passed during which the call has been held open. The predetermined amount of time being programmable set or configured in the AI detection system based on the amount of time it typically takes to complete a service request using the web connection. Operation proceeds from step 566 to step 568.

In step 568, the AI agent 404 exchanges information with the human operator of the call center 450 in an attempt to complete the action, e.g., service requested, e.g., make the flight reservation. Operation proceeds from step 568 to step 570.

In step 570, the originating AI agent 404 determines whether or not the action, e.g., requested service, was completed successfully based on the information exchanged with the human operator in step 568. Step 570 includes sub-steps 572 and 574. In sub-step 572, the AI agent 404 makes the determination that the action, e.g., service request, has been successfully completed. Operation proceeds from sub-step 572 of step 570 to step 562. In sub-step 574, the AI agent 404 determines that the action, e.g., service request, has not been successfully completed. Operation proceeds from sub-step 574 of step 570 to step 576.

In step 576, the AI agent 404 notifies the human user of the AI agent that inputted the request for service that the action, e.g., service requested, cannot be completed. Operation proceeds from step 576 to step 578.

In step 562, the AI Agent 1 404, notifies the human user of the AI agent that the action, e.g., requested service, has been completed. After notifying the human user of the AI agent 1 404 that inputted the request for service that the action has been completed, operation proceeds from step 562 to 578.

In step 578, processing continues for the next action, e.g., service request.

The method 500 includes an example of an AI detection system in a call center with both a closed call mode of operation and held open call mode of operation. In the closed call mode of operation, the call is released by the AI detection system and the call release response, e.g., SIP 4XX message, includes the contact information for the Web Service System 408. In the hold open mode of operation, the contact information for the Web Service System 408 is not included in a call release response but is instead included in either a call signaling response, e.g., SIP or SDP response message or media response, e.g., audio or visual response, without tearing down the call. In some embodiments, the AI detection system is designed to only operate with one mode of operation either closed call mode of operation or call held open mode of operation. In some embodiments, the AI detection system is configured to operate in either the closed call mode of operation or call held open mode of operation prior to the receipt of the detection of the AI originated call, e.g., as a system configuration setting. In some embodiments, the mode of operation whether call held open or closed call mode of operation is configured during initialization of the AI detection system. In some embodiments, the call held open or call closed mode of operation is determined based on the AI detection system or call center system's available resources at the time of the detection of the AI originated call, e.g., based on call wait time, processing capabilities, number of incoming calls being serviced, etc.

AI and machine to machine interactions will now be discussed. A general approach to building an AI system that can engage in human dialogue is to split the problem into two parts. Firstly, Speech to Text algorithms are used, once the speech is converted to text it is then passed through a natural language system to "understand" what is meant. At which point the appropriate functionality can be executed to complete the action (e.g., actually book a flight).

The conversion of the text back and forth to speech is only necessary when a human is involved. If both ends of the communication are AI's, then the nature of the communication can be moved from a telephony call to a web service invocation, for example using text instead of speech to exchange information. This would still require natural language processing to take place, but simplifies the steps by removing the need to do audio processing as a first stage. It also increases the accuracy of the system by removing mistakes that may be made in the text/speech conversion phases.

The continued use of natural language text as the medium for communication is less efficient than a direct Application Programming Interface (API) call, but it offers a significant advantage in that the layers of AI allow 2 systems that are not pre-programmed with the details of an API to still connect and complete some action. Conversely however there is still a processing cost associated with this, as well as a degree of inaccuracy (which may be low, but is very difficult to remove completely).

Alternatively, it could be further reduced to more structured protocol exchange (even as far as API call) depending on the capabilities of the originator to understand the services offered. For example sticking to consistent language phrasing, use of words, etc. will reduce the scope for errors. In the extreme case, it may even progress to a "structured English" which is simpler (and less error prone) for an AI to interpret, but stops short of expecting the originating end to understand the specific syntax and semantics of an API it has not been explicitly programmed to engage with.

Consider for example a registration system, it may offer objects for checking availability, requesting a reservation, cancelling a reservation, amending one, etc. These are relatively standard primitives which an originating AI may, and in some embodiments does, recognize as needed to complete the task given to it.

For example a complete system, via its various access methods may respond to different forms of request:

1) Verbally spoken "I would like to book an appointment"
2) Text message "I would like to book an appointment"
3) Structured command "BOOK APPOINTMENT AT XX:YY ON ZZZ".

A further enhancement here is to consider why the AI is attempting to connect to another AI over a voice call in the first place. This is generally because the originating AI is unaware that the destination supports anything other than a "human operator" to query, and so assumes it must "talk" to the end party. Once it has discovered that the end user supports more native machine to machine (M:M) communications, it makes sense to cache this information in a table. This will permit the AI to avoid initiating such calls in the future and instead move directly to a more appropriate communication path.

Figure 6:
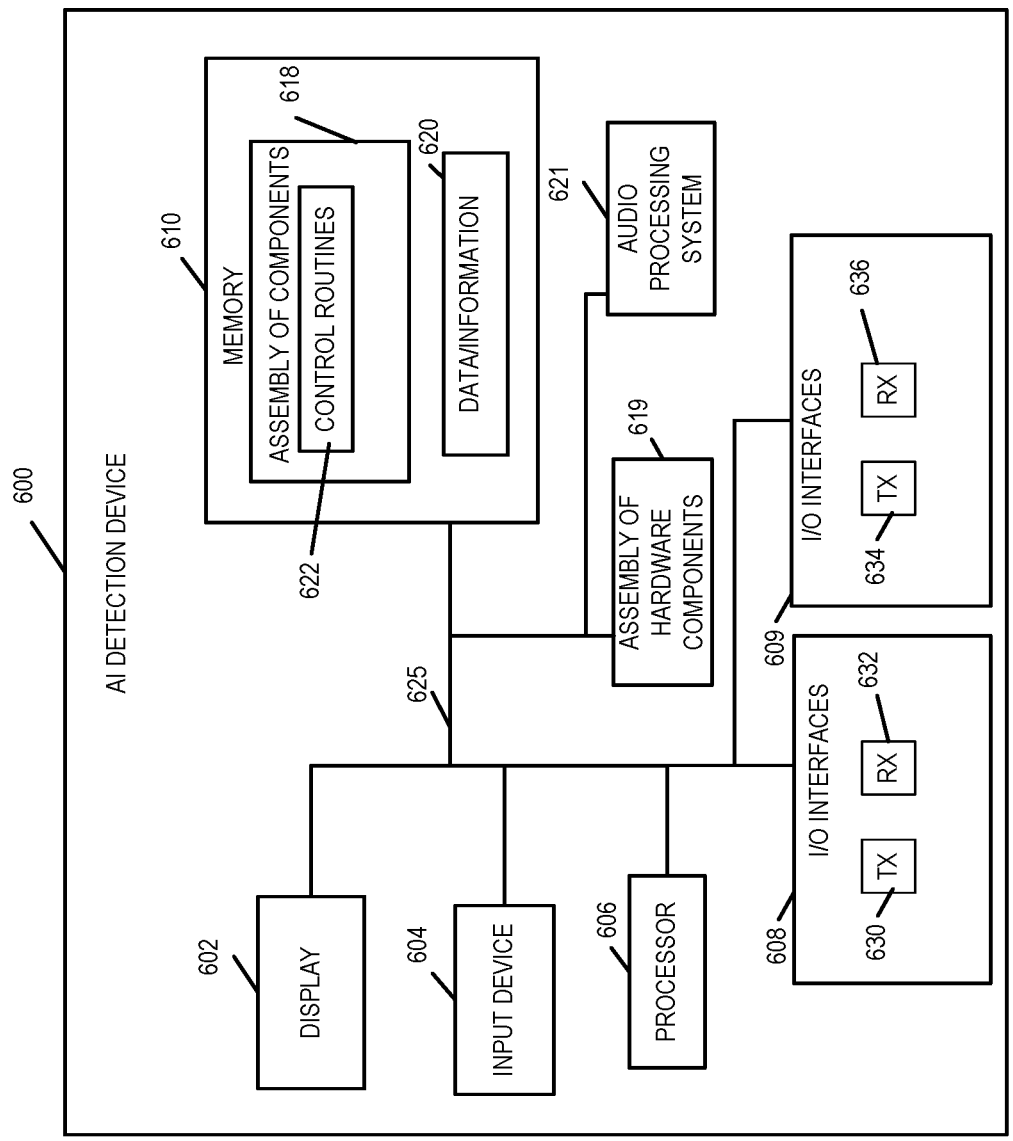
FIG. 6 illustrates an exemplary Artificial Intelligence Detection Device or System in accordance with an embodiment of the present invention.

In some embodiments, one or more of the AI receiving systems, intermediate AI interworking detection devices, or AI detection systems are implemented in accordance with the exemplary AI detection device 600 illustrated in FIG. 6.

Exemplary AI detection device 600 includes an optional display 602, an input device 604, a processor 606, e.g., a CPU, an audio processing system 621, I/O interfaces 608 and 609, which couple the AI detection device 600 to networks or communications links and/or various other nodes/devices, memory 610, and an assembly of hardware components 619, e.g., circuits corresponding to different components and/or modules, coupled together via a bus 625 over which the various elements may interchange data and information. Memory 610 includes an assembly of components 618, e.g., an assembly of software components, and data/information 620. The assembly of software components 618 includes a control routines component 622 which includes software instructions which when processed and executed by processor 606 control the operation of the AI detection device 600 to perform various functions and/or one or more steps of the various method embodiments of the invention. The I/O interface 608 includes transmitters 630 and receivers 632. The I/O interface 609 includes transmitters 634 and receivers 636. The I/O interfaces are hardware interfaces including hardware circuitry. The AI detection device 600 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Internet Protocol (IP), Transport Control Protocol (TCP), User Datagram Protocol (UDP), WebRTC protocols, Representative State Transfer (REST) protocol, SQL (Structured Query Language) Protocol, and HDFS Hadoop Distributed File System Protocol, SQL and/or HDFS being used to interface and access information from the various databases and/or storage devices to which it may be coupled. In some embodiments, the AI detection device 600 includes a communication component configured to operate using IP, TCP, UDP, REST protocol, SQL (Structured Query Language), HDFS Hadoop Distributed File System. In some embodiments, the communications component is a hardware component, a software component or a component including hardware and software components. While only a single hardware processor is illustrated in some embodiments, it is to be understood that the AI detection device 600 can include more than one processor with the processing being distributed among the plurality of processors. The audio processing system 621 in some embodiments includes an interactive voice response component that utilizes artificial intelligence. In some embodiments, the audio processing system 621 is implemented as one of the hardware components in the assembly of hardware components 619. In some embodiments, the audio processing system 621 is implemented as a software component in the assembly of software components 618. In some embodiments, one or more of the following are implemented in accordance with the AI detection device 600 illustrated in FIG. 6: receiving system 101, intermediate AI interworking system 202, AI detection system 402, and AI agent 404.

Figure 7:
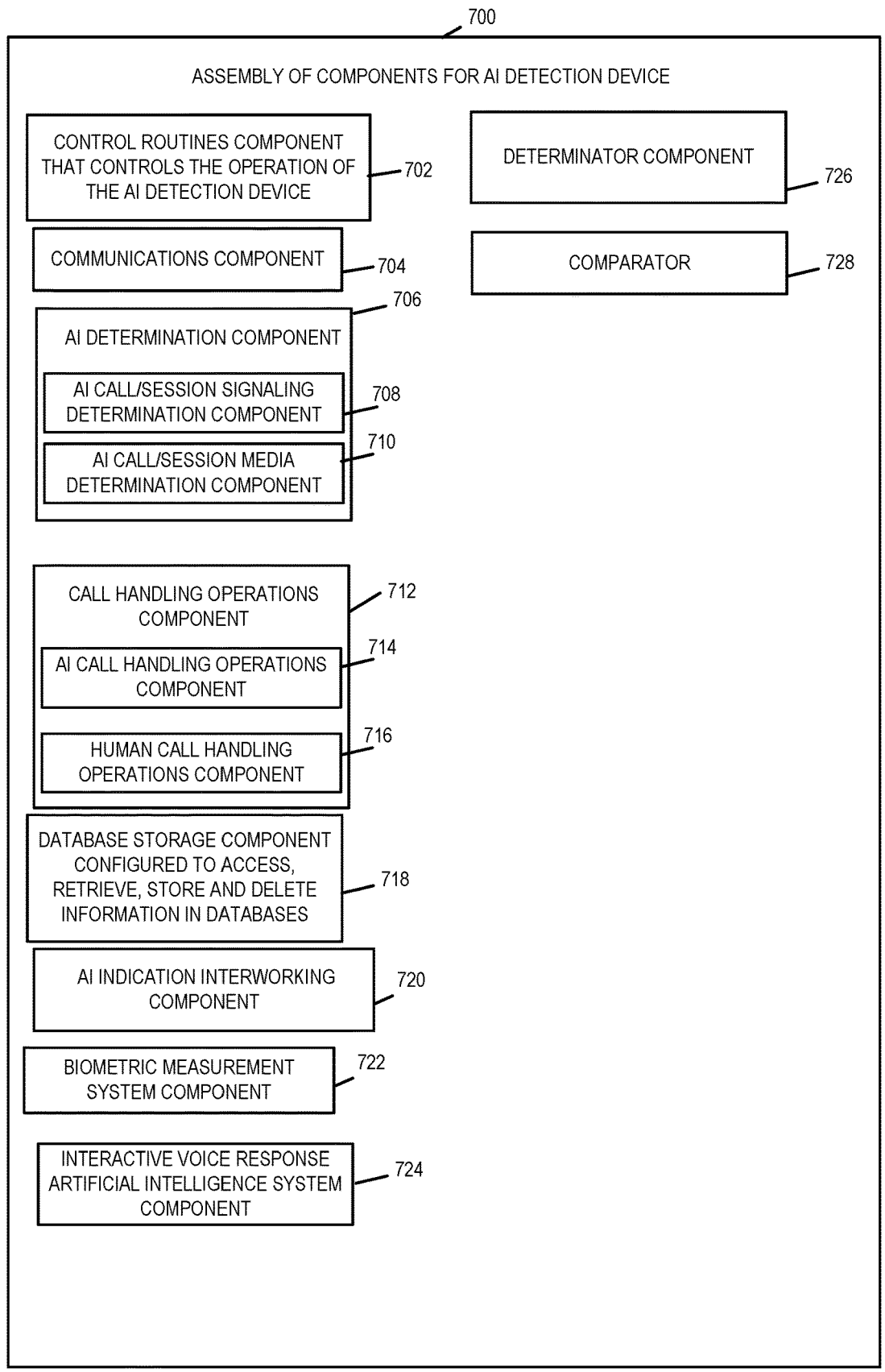
FIG. 7 illustrates an exemplary assembly of components for a artificial intelligence detection device or system in accordance with an embodiment of the present invention.

An exemplary assembly of components 700 which may be included in the exemplary AI detection device/system 600 implemented in accordance with one embodiment of the present invention is illustrated in FIG. 7. The components in the assembly of components 700 can, and in some embodiments are, implemented fully in hardware within a processor, e.g., processor 606, e.g., as individual circuits. The components in the assembly of components 700 can, and in some embodiments are, implemented fully in hardware within the assembly of hardware components 619, e.g., as individual circuits corresponding to the different components. In other embodiments some of the components are implemented, e.g., as circuits, within processor 606 with other components being implemented, e.g., as circuits within assembly of components 619, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 610 of the AI detection device 600, with the components controlling operation of AI detection device 600 to implement the functions corresponding to the components when the components are executed by a processor e.g., processor 606. In some such embodiments, the assembly of components 700 is included in the memory 610 as assembly of software components 618. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 700 is stored in the memory 610, the memory 610 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the AI detection device 600 or elements therein such as the processor 606, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

The exemplary assembly of components 700 include the following components: a control routines component 702, a communications component 704, an AI determination component 706, a call handling operations component 712, a database storage component 718, an AI indication interworking component 720, biometric measurement system component 722, an interactive voice response artificial intelligence system component 724, a determinator component 726, and a comparator component 728.

The control routines component 702 controls the operation of the AI detection device.

The communications component 704 performs communications operations for incoming and outgoing signals and messages, e.g., generating messages, receiving and processing messages in accordance with the various supported communications protocols.

The AI determination component 706 includes in some embodiments an AI call/session signaling determination component 708 and an AI call/session media determination component 710. The AI determination component 706 determines whether a call/session originated from an AI system. The AI call/session signaling determination sub-component 708 makes a determination as to whether a call/session originated from an AI system based on information, e.g., an AI indicator, included in the call/session signaling. The AI call/session media determination sub-component 710 makes a determination as to whether a call/session originated from an AI system based on at least a portion of the media included in the call, e.g., audio or video, e.g., RTP packets, included at the beginning of the call/session.

In some embodiments the call handling operations component 712 includes an AI call handling operations component 714 and a human call handling operations component 716. The call handling operations component performs one or more call handling operations component based on whether the call is determined to have originated from an AI system or a human. In some embodiments, the call handling operations implements call handling policies retrieved from a policy database. In some embodiments the call handling operations component determines one or more call handling operations to be performed based not only on whether the call was originated from an AI system but on additional information available about the call such as for example, the type of AI that originated the call, the specific identity of the AI system that originated the call, the version of the AI system that originated the call, the calling party number/address, the called party number/address, the day, time of day, called party status, network congestion.

The database storage component 718 is configured to access, retrieve, store and delete information in databases, e.g., a policy database.

The AI indication interworking component 720 modifies a received call's or session's signals and/or call media to include one or more additional explicit AI indicators in the call's signals, e.g., SIP INVITE header fields and/or call's media, e.g., insertion of an audio tone, audio pattern, or speech indicting that the call originated from an AI system or that the call did not originate from an AI system.

The biometric measurement system component 722 performs biometric measurement artificial intelligence voice pattern recognition on audio of the call to determine if it recognizes voice pattern as being generated by an artificial intelligence system. In some embodiments, the biometric measurement system component 722 is a sub-component of the AI determination component 706 or the AI call/session media determination sub-component 710.

The interactive voice response (IVR) artificial intelligence system component 724 plays media messages, e.g., audio message prompts, receives a caller's input, e.g., either audio tones (e.g., touch tones) or voice speech, processes the received caller's input, and takes action based on the caller's input. Processing the caller's input in some embodiments includes detection or determination that the caller is an artificial intelligence system for example based on an explicit or implicit AI indication included in the media of the call. Among the actions the IVR system performs upon detection or determination that the call originated from an AI system is to communicate information to the originating AI system that both parties to the call are machines, i.e. this is a Machine to Machine (M:M) call, advertise the services offered and/or additional interfaces, e.g., English language text interface, for another machine/system, e.g., a web service system, to handle the call and the contact information, e.g., URI, for the other machine or system, e.g., a web service system.

The determinator component 726 makes various determinations based on inputted information and data such as for example, if a call or session originated from an AI intelligence or human, the type of artificial intelligence system, the specific artificial intelligence system, whether the call is a M:M call, the call handling operations to be performed, whether call handling operation policies are be retrieved and/or applied, whether a probability threshold has been met to determine if a callee is an AI and/or the type of call handling operation to be applied to the call based on the probability that the call originated from an AI, whether an interworking function is to be performed on the received signaling or media for a call and what modifications to the received signaling or media to the call is to be made.

The comparator component 728 makes various comparisons, decisions and/or determinations based on the results of the comparisons, e.g., comparing received audio of a call to voice patterns or self-identifications words of known AI systems.

Figure 8A:
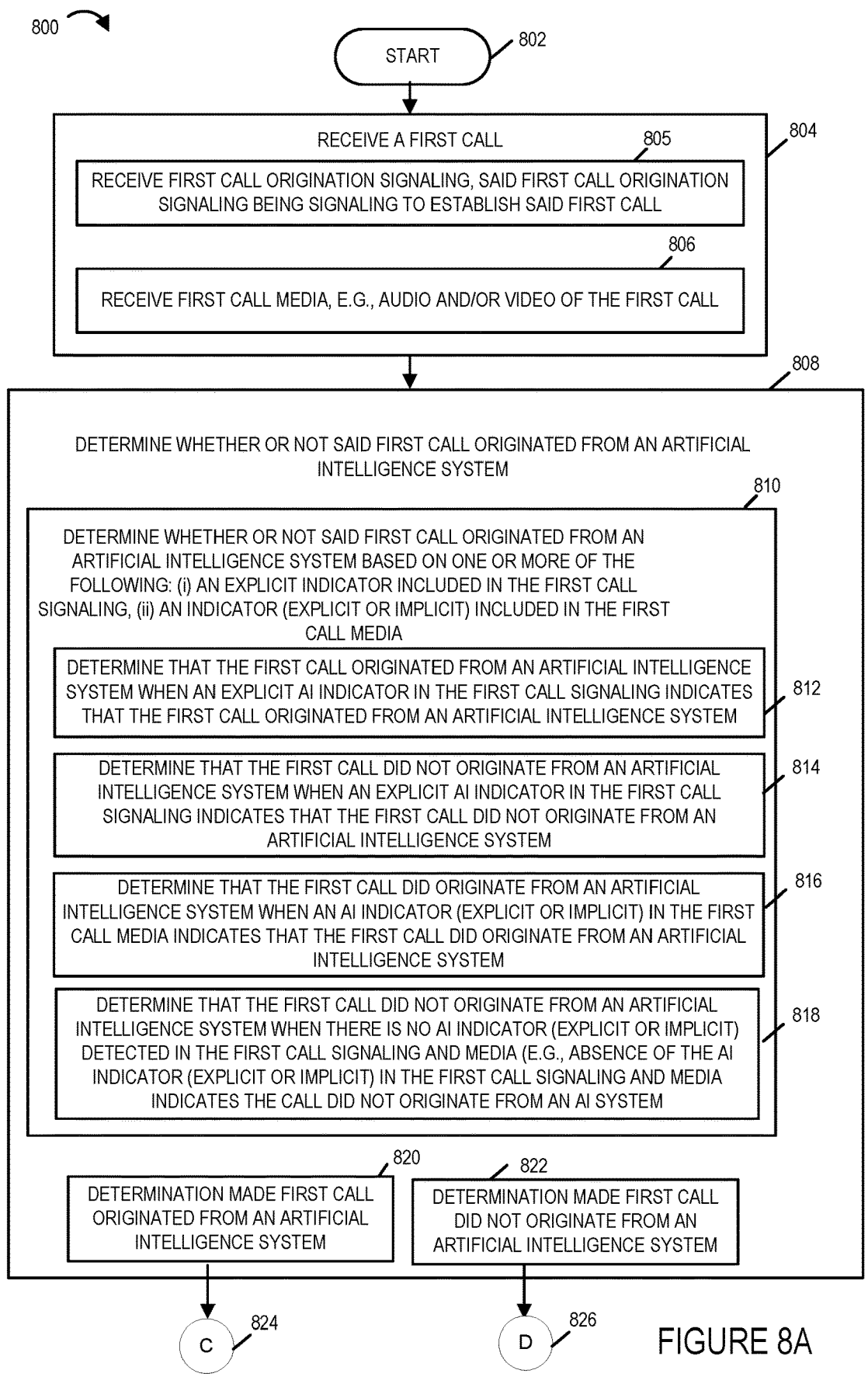
FIG. 8A illustrates the first part of a flowchart of a method in accordance with one embodiment of the present invention.
Figure 8B:
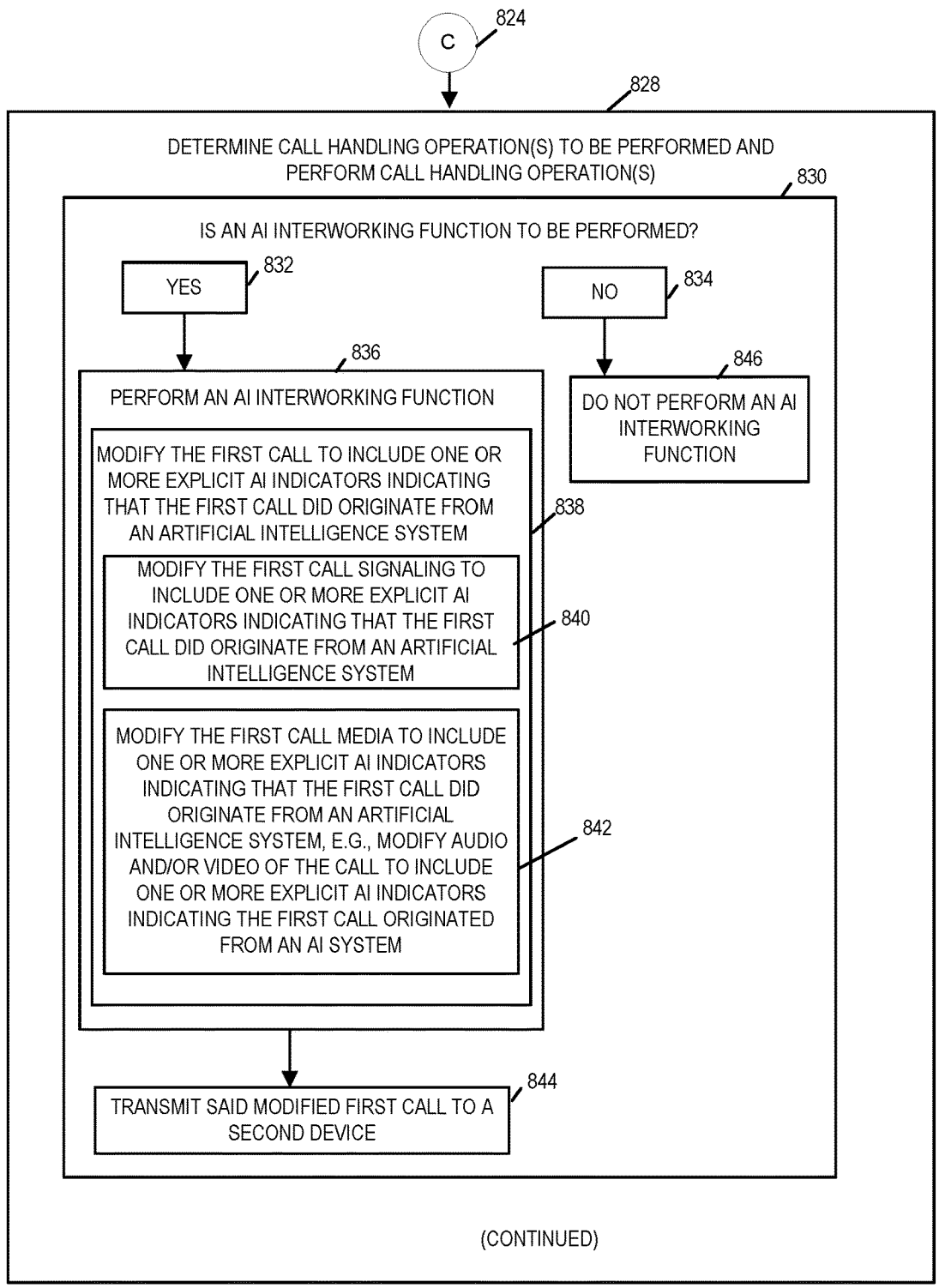
FIG. 8B illustrates the second part of a flowchart of a method in accordance with one embodiment of the present invention.
Figure 8C:
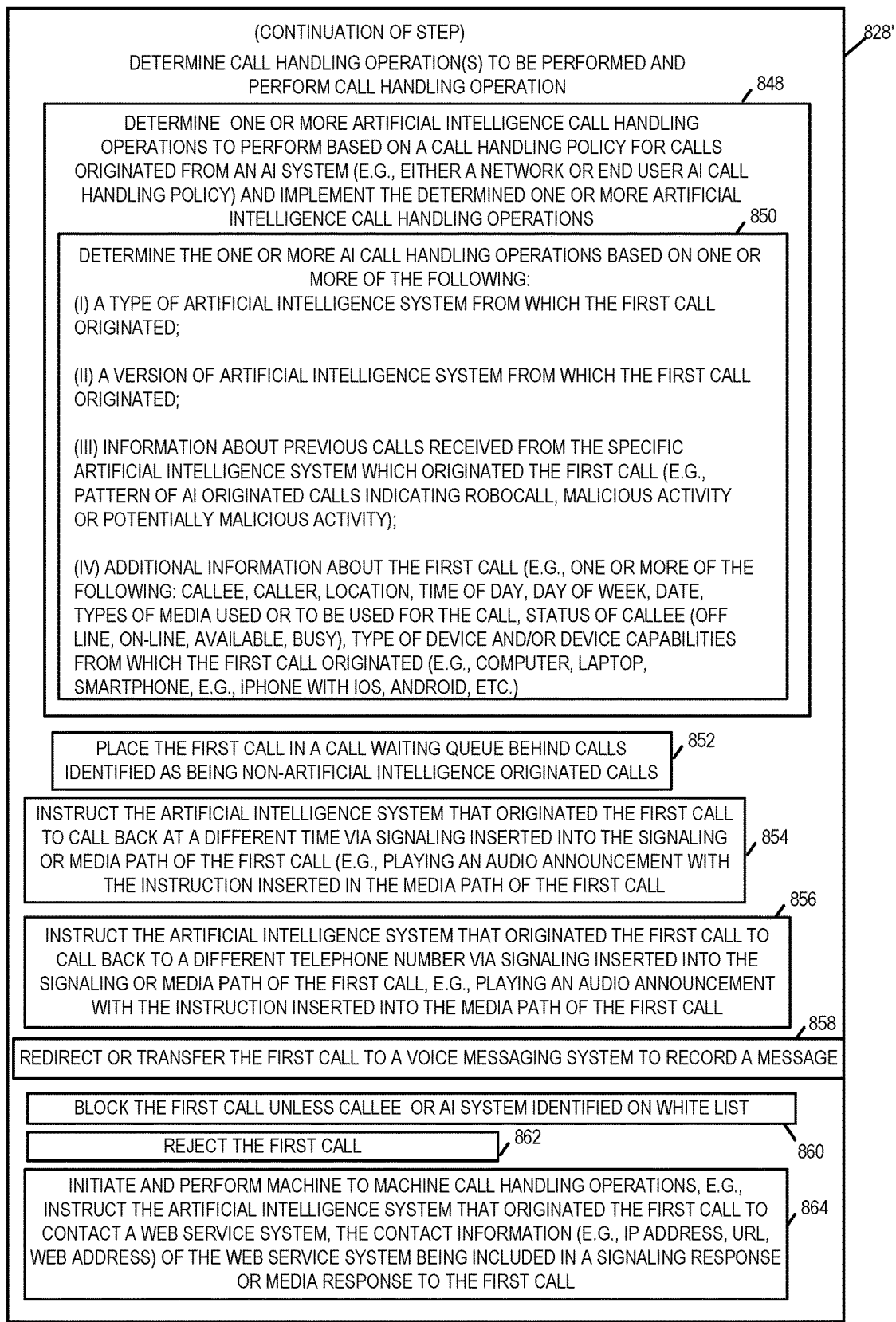
FIG. 8C illustrates the third part of a flowchart of a method in accordance with one embodiment of the present invention.
Figure 8C:
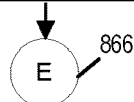
Figure 8D:
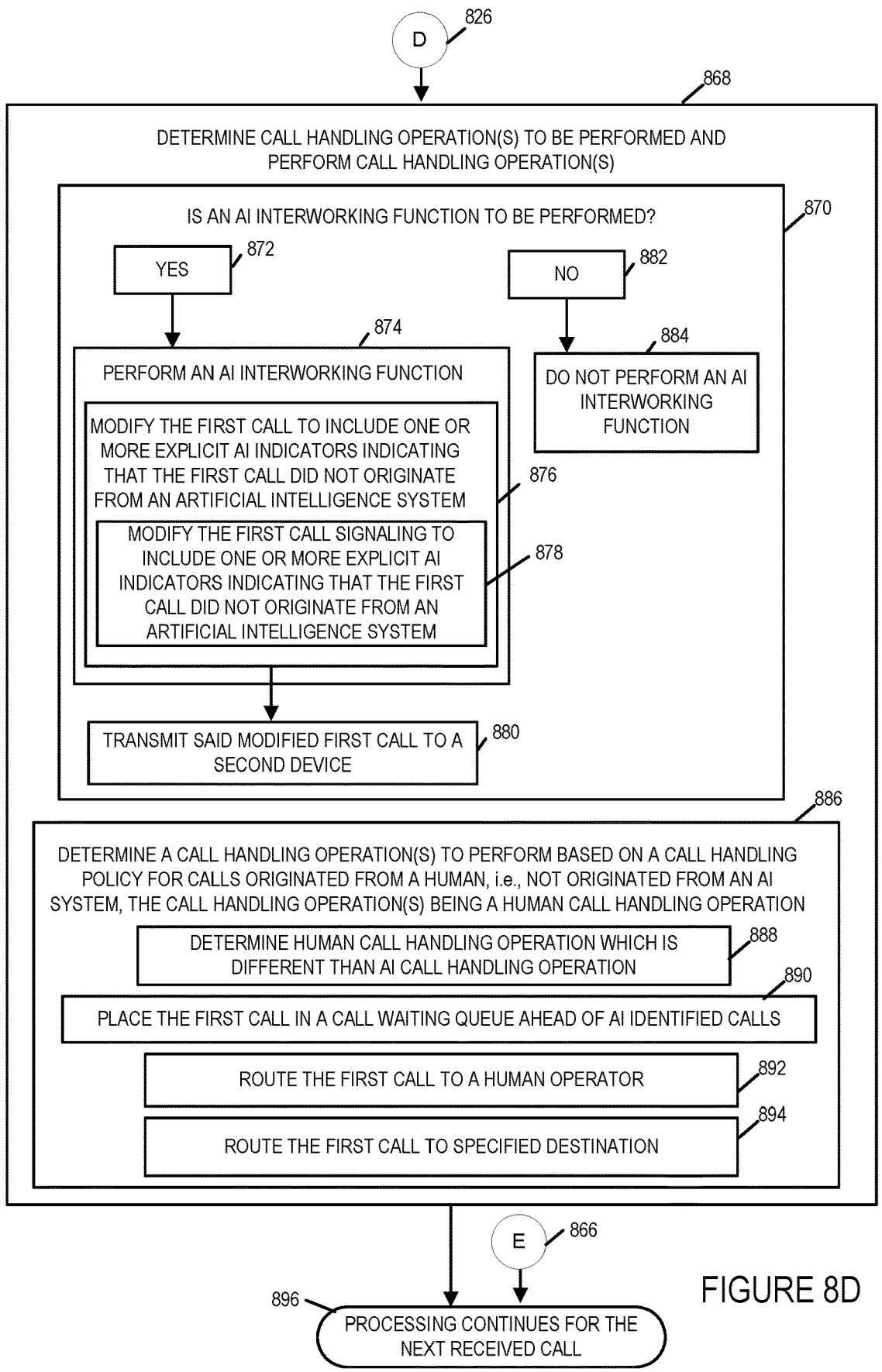
FIG. 8D illustrates the fourth part of a flowchart of a method in accordance with one embodiment of the present invention.

FIG. 8 comprises FIG. 8A, FIG. 8B, FIG. 8C and FIG. 8D. FIG. 8A illustrates the first part of a flowchart of a method in accordance with one embodiment of the present invention. FIG. 8B illustrates the second part of a flowchart of a method in accordance with one embodiment of the present invention. FIG. 8C illustrates the third part of a flowchart of a method in accordance with one embodiment of the present invention. FIG. 8D illustrates the fourth part of a flowchart of a method in accordance with one embodiment of the present invention.

FIG. 8 illustrates the steps of a flow chart of an exemplary method 800 in accordance with one embodiment of the invention which will now be described. The method may be, and in some embodiments, is implemented on a variety of different systems such as for example system 100, system 200, system 200', system 400. It is to be understood that these systems are only being discussed for explanatory purposes and that the method 800 may be, and in some embodiments is, used with other systems and/or devices.

The exemplary method 800 starts in start step 802 shown on FIG. 8A. Operation proceeds from start step 802 to step 804.

In step 802 a first call is received by a receiving device or system, e.g., a network device/system or endpoint device/system such as for example AI detection device 600, receiving system 101, intermediate AI interworking system 202, or AI detection system 402.

In some embodiments, step 804 includes one or more sub-steps 805 and 806. In sub-step 805, first call origination signaling is received by the device or system. In sub-step 806, the first call media, e.g., audio and/or video of the first call, is received by the device or system.

The first call origination signaling being signaling to establish the first call. In some embodiments, the first call is initiated using one of the following protocols Voice Over Internet Protocol, Session Initiation Protocol, ITU-T Recommendation H.323 protocol, WebRTC protocol, and Signaling System No. 7 telephony protocol by an endpoint communications device such as for example a smartphone, computer, tablet, mobile phone, computer, computing device, home entertainment device, or robocaller device. The endpoint device in some embodiments is an artificial intelligence agent that includes an artificial intelligence apparatus, application or software, e.g., AI 1 140, AI 1 404, Agent 1 204, Agent 2 206. In some embodiments, such as for example those embodiments in which the first call is initiated using Session Initiation Protocol, the first call origination signaling includes a SIP INVITE message. In some embodiments when the first call is initiated from an endpoint device or system including an AI agent or system, the first call origination signaling or first call media includes an explicit indication (e.g., AI indicator) indicating that the first call originated from an artificial intelligence system. For example, the SIP INVITE message in some embodiments includes an explicit AI indicator indicating whether or not the first call originated from an artificial intelligence system. In some embodiments, the presence of the AI indicator in the first call origination signaling or first call media indicates the call originated from an artificial intelligence system. In some embodiments, the first call origination signaling includes a SIP INVITE message with the explicit indication of whether the first call originated from an artificial intelligence being included in a parameter or header filed of the SIP INVITE message. In some embodiments, when the first call is not originated from an AI agent, device or system, the explicit AI indicator in the call originator indicates the call did not originate from an AI agent, device or system. In some other embodiments, when the endpoint device is not or does not include an AI agent, device or system that originated the first call, the endpoint device does not include any AI indicator in the first call origination signaling or first call media.

In some embodiments, an explicit indicator indicating whether or not the first call originated from an artificial intelligence system is included in one or more of the following: an extension of a User-Agent header field of a first call SIP INVITE message, said first call origination signaling including said first call SIP INVITE message; an extension of a From header field of the first call SIP INVITE message; an extension of a Feature-Caps header field of the first call SIP INVITE message; a private header (P-header) field or an extension of a private header field included in the first call SIP INVITE message; an experimental header (X-header) field or an extension of an experimental header field included in the first call SIP INVITE message; a Session Description Protocol (SDP) MIME included in a SDP offer message included in the first call SIP INVITE message; an extension of a field of the SDP offer message included in the first call SIP INVITE message; an audio tone or pattern of audio tones included in the media of the first call; an audio announcement included in the media of the first call; a video image or set of images included in the media of the first call; information included in the Initial Address Message (IAM) of the first call origination signaling; information included in the call setup signals for an H.323 call (e.g., call setup signaling of H.225 call control setup messages). In some embodiments, the audio tone or pattern of audio tones that indicates the first call originated from an AI agent, device or system is included at the beginning of the call (e.g., within the first 20 seconds of media). In some embodiments, the audio announcement that indicates the first call originated from an AI agent, device or system is included at the beginning of the call (e.g., within the first 20 seconds of media). In some embodiments, the video image or set of images that indicates the first call originated from an AI agent, device or system is included at the beginning of the call (e.g., within the first 20 seconds of media). Some endpoint devices with AI agents, systems or devices that originate the first call are self identifying AI agents, systems or devices that include an AI indicator indicating the first call originated from an AI agent, system or device in the call origination signaling and/or the media of the first call, e.g., at the start of the first call, to notify the recipient(s) of the first call (or intermediate devices in the first call path) that the call originated from an AI device. When the AI indicator is included in the media, the AI indicator is placed at the beginning of the first call media so as to provide notification that the first call is an AI originated call to the recipient of the call. The amount of time from the start of the first call media to the AI indicator included in the first call media may, and in some embodiments is, application specific such that the amount of time is different for different applications or use cases. The amount of time may be, and in some embodiments is, based on one or more of the following: the destination device which will playback the first call media, the first call media type in which the AI indicator is included, the duration of the AI indicator, the type of AI indicator, characteristics of the media path of the first call (e.g., network delay).

Operation proceeds from step 804 to step 808. In step 808, the receiving device or system determines whether or not the first call originated from an artificial intelligence, e.g., artificial intelligence system, device, or agent. In some embodiments step 808 includes one or more sub-steps 812, 814, 816, 818, and 822.

In sub-step 812, the receiving device or system determines that the first call originated from an artificial intelligence system when an explicit indicator (e.g., an explicit AI indicator) in the first call signaling (e.g., first call origination signaling) indicates that the first call originated from an artificial intelligence system, device or agent.

In sub-step 814, the receiving device or system determines that the first call did not originate from an artificial intelligence system when an explicit AI indicator in the first call signaling (e.g., the first call origination signaling) indicates that the first call did not originate from an artificial intelligence system, device or agent.

In sub-step 816, the receiving device or system determines that the first call did originate from an artificial intelligence system, device or agent when an AI indicator (explicit or implicit) in the first call media indicates that the first call did originate from an artificial intelligence system, agent or device.

In sub-step 818, the receiving device or system determines that the first call did not originate from an artificial intelligence system, device or agent when there is no artificial intelligence indicator (explicit or implicit) detected in the first call signaling and media (e.g., absence of the AI indicator (explicit or implicit) in the first call signaling or media indicates that the first call did not originate from an AI system, device or agent.

In sub-step 820, the receiving device or system makes a determination that the first call originated from an artificial intelligence system, device or agent.

In sub-step 822, the receiving device or system makes a determination that the first call did not originate from an artificial intelligence system, device or agent.

Operation proceeds from step 808 sub-step 820 via connection node C 824 to step 828 shown on FIG. 8B when the receiving device or system makes the determination that the first call did originate from an artificial intelligence system, agent or device.

Operation proceeds from step 808 sub-step 822 via connection node D 826 to step 868 shown on FIG. 8D when the receiving device or system makes the determination that the first call did not originate from an artificial intelligence system, agent or device.

In step 828, the receiving system or device determines one or more call handling operations to be performed and performs the one or more determined call handled operations. Step 828 in some embodiments includes one or more sub-step 830 shown on FIG. 8B and 848, 852, 854, 856, 858, 860, 862, and 864 shown in step 828' which is a continuation of step 828 shown on FIG. 8C.

In sub-step 830 shown on FIG. 8B, a determination is made by the receiving device or system as to whether an AI interworking function is to be performed, the AI interworking function being a call handling operation. In sub-step 832 the decision is yes that an interworking function is to be performed and in sub-step 834 the decision is no that an interworking function is not to be performed. The receiving device or system may be, and in some embodiments is, for example the intermediate AI interworking system 202 or an endpoint system. When the receiving system or device is an endpoint system the decision is no shown in sub-step 834. When the receiving system or device is an intermediate AI interworking device or system or includes AI interworking functionality, e.g., a network device such as a SBC which includes an activated AI interworking functionality feature, the decision is a yes.

When the decision is a yes, operation proceeds from sub-step 832 to sub-step 836. In sub-step 836, the receiving device or system performs an AI interworking function. Sub-step 836 includes in some embodiments sub-step 838. In sub-step 838, the receiving system or device modifies the first call to include one or more explicit AI indicators indicating that the first call did originate from an artificial intelligence system. In some embodiments, sub-step 838 includes one or more sub-steps 840 and 842. In sub-step 840, the receiving system or device modifies the first call signaling (e.g., call origination signaling) to include one or more explicit AI indicators indicating that the first call did originate from an artificial intelligence system, device or agent. In sub-step 842, the receiving system or device modifies the first call media to include one or more explicit AI indicators indicating that the first call did originate from an artificial intelligence, e.g., AI device, system or agent. Operation proceeds from sub-step 836 to sub-step 844. In sub-step 844, the receiving system or device transmits the modified first call (call signaling and/or call media) to a second device (e.g., first call destination such as an endpoint device). In some embodiments, such as the embodiment illustrated in FIGS. 2 and 3 the receiving system or device 202 transmits the modified first call signaling to a call server and the modified first call media to an end system or device. In some embodiments, the modification of the first call signaling to include one or more explicit AI indicators indicating that the first call did originate from an artificial intelligence in sub-step 840 includes modifying the first call signaling to include at least one explicit artificial intelligence indicator indicating that the first call originated from an artificial intelligence which is supported or recognized by the destination device which is to receive the first call signaling (e.g., an endpoint device such as smartphone or a call server). The receiving device retrieving information from memory on the types of explicit artificial intelligence call signaling indicators supported or recognized by the destination device specified in the first call signaling. The information on the types of explicit artificial intelligence call signaling indicators supported or recognized by the destination device specified in the first call signaling having been stored during configuration of the receiving system or having been stored after the receiving system determines the information from a message including the capabilities of the destination device including the AI explicit indicators supported or recognized by the destination device.

In some embodiments, the modification of the first call media to include one or more explicit AI indicators indicating that the first call did originate from an artificial intelligence in sub-step 842 includes modifying the first call media to include at least one explicit artificial intelligence indicator indicating that the first call originated from an artificial intelligence which is supported or recognized by the destination device which is to receive the first call signaling (e.g., an endpoint device such as smartphone or a call server). The receiving device retrieving information from memory on the types of explicit artificial intelligence call media indicators supported or recognized by the destination device specified in the first call signaling. The information on the types of explicit artificial intelligence call media indicators supported or recognized by the destination device specified in the first call signaling having been stored during configuration of the receiving system or having been stored after the receiving system determines the information from a message including the capabilities of the destination device including the AI explicit indicators supported or recognized by the destination device.

In sub-step 848 which in shown in step 828' which is a continuation of step 828, the receiving system or device determines one or more artificial intelligence call operations to be performed based on a call handling policy for call originated from an AI system, device or agent (e.g., either a network or end user AI call handling policy) and implements the determined one or more artificial intelligence call handling operations. In some embodiments, step 848 includes sub-step 850. In sub-step 850, the receiving system or device determines one or more calling handling operations based on one or more of the following: (i) a type of artificial intelligence system, device or agent from which the first call originated (e.g., such information may be, and in some embodiments is, included in an AI indicator or is determined from an AI indicator (either an explicit or implicit AI indicator); (ii) a version of the artificial intelligence system, device or agent from which the first call originated (e.g., such information may be, and in some embodiments is, included in an AI indicator or is determined from an AI indicator (either an explicit or implicit AI indicator); (iii) information about previous calls received from the specific artificial intelligence agent, system or device which originated the first call (e.g., pattern of AI originated calls indicating robocalling, malicious activity or potentially malicious activity); and (iv) additional information about the first call (e.g., one or more of the following: callee, caller, location, time of day, day of week, date, types of media used or to be used for the call, status of callee (off-line, on-line, available, busy), type of device and/or device capabilities from which the first call originated (e.g., computer, laptop, smartphone, e.g., iphone with iOS operating system, smartphone with Android operating system, etc. or to which the first call is destined.

In sub-step 852, the receiving system or device determines that the AI call handling operation to be performed is to place the first call in a call waiting queue behind calls identified as being non-artificial intelligence originated calls and performs the AI call handling operation.

In sub-step 854, the receiving system or device determines that the AI call handling operation to be performed is to instruct the artificial intelligence system, device or agent that originated the first call to call back at a different time via signaling inserted into the signaling or media path of the first call (e.g., by playing an audio announcement' with the instruction inserted in the media path of the first call) and performs the AI call handling operation.

In sub-step 856, the receiving system or device determines that the AI call handling operation to be performed is to instruct the artificial intelligence system, device or agent that originated the first call to call back to a different telephone number via signaling inserted into the signaling or media path of the first call (e.g., by playing an audio announcement with the instruction inserted in the media path of the first call) and performs the AI call handling operation.

In sub-step 858, the receiving system or device determines that the AI call handling operation to be performed is to redirect or transfer the first call to a voice messaging system to record a message.

In sub-step 860, the receiving system or device determines that the AI call handling operation to be performed is to block the first call unless the callee or AI system, agent or device identified is on a white list and performs the AI call handling operation. For example, if the callee is identified as an emergency broadcast messaging callee or the AI system, device or agent is identified as an emergency broadcast messaging system for example via information contained in an explicit AI indicator included in the first call signaling or media.

In sub-step 862, the receiving system or device determines that the AI call handling operation to be performed is to reject the first call and performs the call handling operation.

In sub-step 864, the receiving system or device determines that the AI call handling operation to be performed is to initiate and perform machine to machine call handling operations, e.g., to instruct the artificial intelligence system that originated the first call to contact a web service system with the contact information (e.g., IP address, URL, Web Address) of the web service system being included in a signaling response or media response to the first call. In some embodiments, one or more of the steps of the method 500 are implemented which describes an exemplary method for implementing machine to machine call handling.

Operation proceeds from step 828' which is a continuation of step 828 shown on FIG. 8C via connection node E 866 to step 896 shown on FIG. 8D. In step 896, processing continues for the next received call.

Returning to sub-step 830, when the decision in sub-step 830 is a no, operation then proceeds from sub-step 834 to sub-step 846. In sub-step 846, the receiving system or device does not perform and AI interworking function on the first call. In some embodiments, when the receiving system or device is an endpoint device sub-step 830 is bypassed or skipped.

Returning to step 808, when the determination in step 808 is a determination that the first call did not originate from an artificial intelligence system, agent or device, operation then proceeds from sub-step 822 via connection node D 826 to step 868 shown on FIG. 8D.

In step 868, the receiving system or device determines one or more call handling operations to be performed and performs the determined call handling operations. In some embodiments, step 868 includes one or more sub-steps 870 and 886.

In sub-step 870, a determination is made by the receiving device or system as to whether an AI interworking function is to be performed, the AI interworking function being a call handling operation. In sub-step 872 the decision is yes that an interworking function is to be performed and in sub-step 882 the decision is no that an interworking function is not to be performed. The receiving device or system may be, and in some embodiments is, for example the intermediate AI interworking system 202 or an endpoint system. When the receiving system or device is an endpoint system the decision is no shown in sub-step 882. When the receiving system or device is an intermediate AI interworking device or system or includes AI interworking functionality, e.g., a network device such as a SBC which includes an activated AI interworking functionality feature, the decision is a yes.

When the decision is a yes, operation proceeds from sub-step 872 to sub-step 874. In sub-step 874, the receiving device or system performs an AI interworking function. Sub-step 874 includes in some embodiments sub-step 876. In sub-step 876, the receiving system or device modifies the first call to include one or more explicit AI indicators indicating that the first call did not originate from an artificial intelligence system. In some embodiments, sub-step 876 includes sub-step 878. In sub-step 878, the receiving system or device modifies the first call signaling (e.g., call origination signaling) to include one or more explicit AI indicators indicating that the first call did not originate from an artificial intelligence system, device or agent. Operation proceeds from sub-step 878 to sub-step 880. In sub-step 880, the receiving system or device transmits the modified first call (call signaling and/or call media) to a second device (e.g., first call destination such as an endpoint device). In some embodiments, such as the embodiment illustrated in FIGS. 2 and 3 the receiving system or device 202 transmits the modified first call signaling to a call server and the first call media to an end system or device. In most embodiments, the first call media is not modified to include an explicit indication that the first call did not originate from an artificial intelligence system, agent or device but only includes an explicit AI indicator in the media of the first call when the first call originated from an AI system, agent or device.

Returning to sub-step 870, when the decision in sub-step 870 is a no, operation then proceeds from sub-step 882 to sub-step 884. In sub-step 884, the receiving system or device does not perform and AI interworking function on the first call. In some embodiments, when the receiving system or device is an endpoint device sub-step 870 is bypassed or skipped.

In sub-step 886, the receiving system or device determines one or more call handling operations to perform based on a call handling policy for calls originated from non-AI systems, agents or device, e.g., a call handling policy for calls originated from a human, the one or more call handling operations being a human call handling operation in at least some embodiments and the receiving system or device performs the determined operations. The human or non-AI system call handling policy and/or operations being different in at least some aspects from the AI call handling policy and/or operations. In some embodiments, sub-step 886 includes one or more sub-steps 888, 890, 892, and 894.

In sub-step 888, the receiving system or device determines a human call handling operation which is different than an AI call handling operation for the first call and performs the human call handling operation.

In sub-step 890, the receiving system or device determines that the call handling operation is to place the first call in a call waiting queue ahead of AI identified calls and performs the call handling operation.

In sub-step 892, the receiving system or device determines that the call handling operation is to route the first call to a human operator and performs the determined call handling operation.

In sub-step 894, the receiving system or device determines the call handling operation to be performed is to route the first call to the destination specified by the first call signaling and performs the call handling operation.

In some embodiments, the receiving system or device determines that the call handling operation is to give the call a higher quality of service than if the call was an AI originated call. In some embodiments, the receiving system or device determines that the call handling operation is one in which the receiving system or device gives preferential call handling treatment to non-AI originated calls over AI originated calls.

Operation proceeds from step 868 to step 896.

In step 896, processing continues for the next received call as the method 800 continues processing received calls.

Various additional embodiments of the method 800 with additional and/or different features and/or steps will now be discussed.

In some embodiments, the determination in step 808 of whether or not said first call originated from an artificial intelligence system is based on one or more of the following: (i) an explicit indicator included in said first call signaling that indicates that the first call originated from an artificial intelligence (e.g., device, system or agent), and (ii) an indicator (e.g., an implicit or explicit indicator) included in the first call media indicating that the first call originated from an artificial intelligence (e.g., device, system, or agent). In some embodiments, determining whether or not the first call originated from an artificial intelligence system includes one or more of the following: determining if an explicit artificial intelligence indicator is present in call signaling of the first call (e.g., new SIP header/parameter in a SIP INVITE or SDP mime (or equivalent signaling indicating the source of the call), and determining if an artificial intelligence indicator (explicit or implicit) is present in call media of the first call (e.g., audio signal such as a fixed tone, tone pattern, speech announcement designed to be understood by the human ear (e.g., "this is Alexa calling", "this is Google Assistant calling", "this is an Artificial Intelligence calling"), text, image or set of images designed to be understood by the human eye (e.g., text message indicating AI or image or set of images of an avatar representing an Artificial Intelligence).

In most embodiments, the determining whether the first call originated from an artificial intelligence device includes determining whether or not the first call includes an implicit indicator that the first call originated from an artificial intelligence system. Determining whether or not the first call includes an implicit indicator that the first call originated from an artificial intelligence system may, and in some embodiments does, include monitoring at least a portion of the contents of the media (RTP) packets received during the first call to detect whether the at least a portion of the contents of the media packets match a voice pattern of a previously identified artificial intelligence originated voice pattern. The at least a portion of the contents of the media packets being for example audio packets. In some such embodiments, upon the detection that at least a portion of the contents of the first call being monitored match a voice pattern of a previously identified artificial intelligence originated voice pattern determining that the first call was originated from an artificial intelligence, e.g., AI system, device or agent. In some embodiments, the step of detecting that the at least a portion of the contents of the media packets of the first call being monitored match a voice pattern of a previously identified artificial intelligence originated voice pattern includes comparing the monitored content of the media packets of the first call to recorded speech patterns known to be used for generating artificial intelligence speech. In some other embodiments, the monitoring of the at least a portion of the contents of media packets of the first call is performed using a machine learning algorithm that receives the monitored contents of the media packets of the first call and generates a probability that the first call is an artificial intelligence generated call. In some such embodiments, the machine learning algorithm is trained to generate a probability that a set of data corresponding to media content of a call was generated by an artificial intelligence prior to the monitoring of the contents of media of the first call is performed. The machine learning algorithm is typically trained using one or more of the following: (i) a dataset of artificial intelligence recorded speech patterns, (ii) a dataset of speech patterns used by artificial intelligence systems to generate speech, (iii) a first dataset of media content of a plurality of calls which were not originated by an artificial intelligence system, and (iv) a second dataset of media content from a plurality of calls, the second dataset including calls which originated from an artificial intelligence system and calls which did not originate from an artificial intelligence system. In some embodiments, the first and second dataset of media content from a plurality of calls includes media content from the first portion of each of the calls, e.g., media content from the first 25 seconds of each of the calls. In some embodiments, the first and second dataset of media content from a plurality of calls includes media content from a first portion of each of said calls. The first portion of each of said calls being less than a first threshold number of seconds since call connection establishment. The first threshold number of second in some embodiments being programmable. In first threshold number of seconds in some of said embodiments being a value substantially equal to the amount of time of media content of a call processed to detect whether the media content includes an AI indicator.

In some embodiments in which a probability that the first call is an artificial intelligence generated call is determined, the probability is used to make a determination that the call was originated from an artificial intelligence. For example, when the generated probability that the first call is an artificial intelligence generated call is greater than a first threshold, the first call is determined to be a call originated from an artificial intelligence, e.g., AI system, device or agent. The first threshold may be, and in some embodiments is, programmable allowing it to be set to different values for different applications. For example, in some embodiments, the first threshold is a probability of 85% while in other embodiments the probability may be another value such as for example 75%. In some embodiments, the call handling operation to be performed is based on the generated probability and/or whether the probability is below, equal to, or exceeds one or more thresholds. For example, if the generated probability exceeds a first threshold of 85% the call may be blocked while if it exceeds a second threshold of 50% but not the first threshold of 85% the call may be directed to a voice mail system.

In some embodiments, the step 808 of determining whether or not the first call originated from an artificial intelligence, e.g., AI system, device or agent, includes one or more of the following: (i) determining if an explicit artificial intelligence indicator indicating that the first call originated from an artificial intelligence system is present in the first call signaling; and (ii) determining if an explicit or implicit artificial intelligence indicator indicating that the first call originated from an artificial intelligence system is present in the first call media. In some embodiments, the first media content includes an audio signal and a video signal. In some of such embodiments, the step of determining if an explicit or implicit artificial intelligence indicator indicating that the first call originated from an artificial intelligence system is present in the first call media may, and in some embodiments does, include the sub-steps of: processing at least a portion of the audio signal of the first call to determine if it includes an explicit or implicit artificial intelligence indicator indicating the first call originated from an artificial intelligence system and/or processing at least a portion of the video signal of the first call to determine if it includes an explicit or implicit artificial intelligence indicator indicating the first call originated from an artificial intelligence, e.g., AI system, agent or device. Furthermore, in some embodiments, the processing of the at least a portion of the audio signal of the first call to determine if it includes an implicit artificial intelligence indicator indicating the first call is from an artificial intelligence system includes performing by a biometric measurement system artificial intelligence voice pattern recognition on the at least a portion of the audio signal of the first call.

In some embodiments, the step 808 of determining whether or not the first call originated from an artificial intelligence, e.g., AI system, device or agent, includes processing the audio signal of the first call to determine if it includes an explicit artificial intelligence indicator indicating the first call is from an artificial intelligence (e.g., AI agent, system or device) which includes determining whether the audio signal of the first call includes a fixed tone, tone pattern or speech announcement indicating that the first call originated from an artificial intelligence (e.g., AI agent, system or device). When it is determined that the audio signal of the first call includes a fixed tone, tone pattern or speech announcement indicating the first call originated from an artificial intelligence, determining that the first call originated from an artificial intelligence.

In some embodiments, the step 808 of determining whether or not the first call originated from an artificial intelligence, e.g., AI system, device or agent, includes processing the video signal of the first call to determine if it includes an explicit artificial intelligence indicator indicating the first call is from an artificial intelligence (e.g., AI agent, system or device) which includes determining whether the video signal of the first call includes text, a control signal, an image (e.g., a frame or portion of a frame), or set of images indicating that the first call originated from an artificial intelligence (e.g., AI agent, system or device). When it is determined that the video signal of the first call includes text, a control signal, an image, or set of images indicating that the first call originated from an artificial intelligence, determining that the first call originated from an artificial intelligence. In some embodiments, the image included in the video signal of the first call indicating that the first call originated from an artificial intelligence includes an image of an avatar representing an Artificial Intelligence or a Quick Response (QR) code. In some embodiments, in which the image that indicates the first call originated from an artificial intelligence includes a QR code, the QR code may, and in some embodiments does, include one or more of the following pieces of information embedded in it: a URL to a web page, the version of the originating artificial intelligence system, device or agent, the type of originating artificial intelligence system, device or agent, or an indication of the purpose of the call (e.g., emergency announcement, service request, etc.).

In some embodiments of the method 800, the first call is received by a network equipment device, e.g., a SBC, and the artificial intelligence call handling operations to be performed are determined based on an artificial intelligence call handling operation network policy when said network equipment device determines that the first call originated from an artificial intelligence. In some such embodiments, the artificial intelligence call handling operation network policy is obtained from a network equipment policy database either prior to the receipt of the first call or in response to a query of the network equipment policy database to determine the artificial intelligence call handling operation to apply to the first call upon determining the first call originated from an artificial intelligence.

In some embodiments of the method 800, the first call is received by an endpoint device or system corresponding to the destination address of the first call and the artificial intelligence call handling operation(s) to be performed are determined based on an artificial intelligence call handling operation endpoint policy when said endpoint system or device determines that the first call originated from an artificial intelligence. In some embodiments, the method further includes the step of obtaining by the endpoint device or system from a policy database the artificial intelligence call handling operation policy to apply to the first call either prior to receipt of the first call or in response to a query by the endpoint device or system sent to the policy database upon determining the first call originated from an artificial intelligence system.

In some embodiments, the receiving system in step 864 or as an alternative to step 864 directs the artificial intelligence that originated the first call to move to a Machine to Machine (M:M) form of communication by transmitting contact information for another machine system to the artificial intelligence which originated the first call via the media path or signaling path of the first call while also advertising the capabilities offered by the a M:M form of communication with the another machine system via information transmitted to the artificial intelligence which originated the first call, the information being transmitted via the media path or signaling path of the first call. In some embodiments, the another machine system is a web service system and the contact information for the web service system is a URL or web address of the web service system. The capabilities advertised may be, and in some embodiments are, type of communication interface supported by the web service system (e.g., English language text, Spanish language text, etc.) and the service(s) provided by the web service system. In some embodiments, the contact information for the another machine system is provided as an audio announcement played by the receiving system or device to the originating artificial intelligence (e.g., AI agent, system or device). The contact information including a URL address of a web service system which is the another machine system. In some embodiments, the contact information is a URL address of a web service system included in a call rejection messages sent by the receiving system to the artificial intelligence that originated the first call. The call rejection message is in some embodiments a SIP 4XX message sent in response to a SIP INVITE message received as part of the first call from the artificial intelligence which originated the first call. In some embodiments, the artificial intelligence system, agent or device which originated the first call receives and stores the contact information for the another machine system, e.g., web service system, in memory wherein at a later time the artificial intelligence which originated the first call accesses the received contact information for the another machine system from memory and uses it to place a machine to machine call to the another machine system instead of placing a voice call to the receiving system. In some embodiments of method 800 the artificial intelligence call handling operation performed by the receiving system includes responding to the call initiation message from the artificial intelligence device, system or agent by generating a call initiation response message including contact information for a web service system (e.g., web service system 408) and transmitting the call initiation response message to the artificial intelligence system that originated the first call. The receiving system or device itself including an artificial intelligence system, agent or device or application. In some such embodiments, the call initiation request message received as part of the first call signaling is a SIP INVITE message with a header filed including an artificial intelligence indicator and the call response message generated by the receiving system or device is a SIP 4XX response message including the contact information for the web service system. The contact information being for example a URL address.

In some embodiments of the method 800, the first call is received by a receiving system or device that includes an artificial intelligence system, device, or agent and the media of the first call includes an artificial intelligence indicator indicating that the first call was originated from an artificial intelligence, the artificial intelligence call handling operation(s) performed by the receiving system or device includes communicating via the media path an indication that the first call is a machine to machine call by playing an audio announcement message including contact information for a web service system inserted onto the media path connecting the first device to the artificial intelligence which originated the first call. In some such embodiments, the artificial intelligence system included in the receiving system or device is an Interactive Voice Response system and the contact information provided in the first call media path is a Universal Resource Identifier (URI). Furthermore, in some embodiments, the artificial intelligence in the receiving system also plays an announcement to the originating artificial intelligence system, device or agent advertising one or more of the following: services provided by the web service (e.g., making or booking a flight reservations, updating a flight reservation, cancelling a flight reservation), the type of communications interfaces (e.g., speech recognition, text recognition, API interfaces) available for communicating with the web service system.

One or more embodiments of the present invention include one or more of the following features: (1) self identification of AI calls from the originating party via either signalling or media means, (2) interworking of an "AI indication" between different signalling and media encoding schemes to aid compatibility in a complex network, (3) identification by an intermediate node or terminating party of an AI originated call via media analysis, (4) differential treatment for AI originated calls versus human calls by means of policy applied either in the network or on an end point, (5) directing an AI call originator to reattempt at a later point or on a different path via signalling or media clues back to the originator, (6) identification that 2 AI systems are talking to each other, (7) directing AI system 1 to move to a M:M communication by AI system 2 (either via clues in the media path or signalling path) with the AI system 1 in some embodiments being the AI system that generated the call, (8) the advertisement of the capabilities offered by a M:M communication system to AI system 1 from AI system 2 via clues provided by AI system 2 in either the media or signalling path with the AI system 1 being the AI system that generated the call in some embodiments, (9) discovery by AI system 1 (e.g., via a cache table) that the destination supports a web service or other M:M communication path that should be tried in preference to a voice call.

While many of the embodiments discussed refer to a call, a call includes a call session such as for example a media session, a Voice Over Internet Protocol call session, a WebRTC session and a telephony call, e.g., using Signaling System Number 7 signaling. It should also be understood that communications devices, e.g., smartphones, computers, etc. that include AI agents, systems or devices in most embodiment also support generating/originating calls without the use of the AI agent, system or device for example by a human dialing a telephone number. As such the calls received by an AI detection system or receiving system even if some the same telephone number, IP address or same device in some instances will be AI originated calls while in other instances will be non-AI originated calls.

Numbered List of Exemplary Method Embodiments

Method Embodiment 1. A communications method comprising: receiving a first call; determining whether or not said first call originated from an artificial intelligence system; and when said first call is determined to have originated from an artificial intelligence system performing artificial intelligence call handling operations.

Method Embodiment 1A. The communications method of method embodiment 1 wherein receiving said first call includes receiving first call origination signaling to establish said first call, said first call origination signaling including an explicit indication whether the first call was originated from an artificial intelligence system.

Method Embodiment 1A1. The communications method of method embodiment 1 wherein the first call is initiated using one of the following protocols: Voice Over Internet Protocol, Session Initiation Protocol, ITU-T Recommendation H.323 protocol, and Signaling System No. 7 telephony protocol.

Method Embodiment 1AA. The communications method of method embodiment 1A, wherein the first call origination signaling includes a SIP INVITE message with said explicit indication of whether said first call originated from an artificial intelligence being included in a parameter or header field of the SIP INVITE message.

Method Embodiment 1AAA. The communications method of method embodiment 1A, wherein the explicit indication of whether or not said first call originated from an artificial intelligence system is included as one or more of the following: an extension of a User-Agent header field of a first call SIP INVITE message, said first call origination signaling including said first call SIP INVITE message; an extension of a From header field of the first call SIP INVITE message; an extension of a Feature-Caps header field of the first call SIP INVITE message; a private header (P-header) field or an extension of a private header field included in the first call SIP INVITE message; an experimental header (X-header) field or an extension of an experimental header field included in the first call SIP INVITE message; a Session Description Protocol (SDP) MIME included in a SDP offer message included in the first call SIP INVITE message; an extension of a field of the SDP offer message included in the first call SIP INVITE message; an audio tone or pattern of audio tones included in the media of the first call; an audio announcement included in the media of the first call; a video image or set of images included in the media of the first call; information included in the Initial Address Message (IAM) of the first call origination signaling; information included in the call setup signals for an H.323 call (e.g., call setup signaling of H.225 call control setup messages).

Method Embodiment 1AAAA. The communications method of method embodiment 1AAA, wherein the audio tone or pattern of audio tones is included at the beginning of the call (e.g., within the first 20 seconds of media); wherein the audio announcement is included at the beginning of the call (e.g., within the first 20 seconds of media); and wherein the video image or set of images is included at the beginning of the call (e.g., within the first 20 seconds of media).

Method Embodiment 2. The communications method of method embodiment 1, wherein said determining whether or not said first call originated from an artificial intelligence system is based on one or more of the following: (i) an explicit indicator included in said first call signaling that said first call originated from an artificial intelligence device, (ii) an indicator (e.g., could be implicit or explicit) included in said first call media that said first call originated from an artificial intelligence system.

Method Embodiment 2A. The communications method of method embodiment 2, wherein determining whether or not said first call originated from an artificial intelligence system includes one or more of the following: determining if an explicit artificial intelligence indicator is present in call signaling of the first call (e.g., new SIP header/parameter in SIP INVITE or SDP mime (or equivalent signaling indicating source of the call)); and determining if an artificial intelligence indicator (explicit or implicit) is present in call media of the first call (e.g., audio signal such as a fixed tone, tone pattern, speech announcement designed to be understood by the human ear (e.g., "this is Alexa calling", "this is Google Assistant calling", "this is an Artificial Intelligence calling"), text, image or set of images designed to be understood by the human eye (e.g., text message indicating AI or image or set of images of an avatar representing an Artificial Intelligence).

Method Embodiment 2B. The communications method of method embodiment 2A, wherein determining whether said first call originated from an artificial intelligence device further includes: determining whether or not the first call includes an implicit indicator that the first call originated from an artificial intelligence system.

Method Embodiment 2B1. The communications method of method embodiment 2B, wherein determining whether said first call includes an implicit indication that the first call originated from an artificial intelligence system includes: monitoring at least a portion of the contents of the media (RTP) packets received during the first call to detect whether the at least a portion of the contents of the media packets match a voice pattern of a previously identified artificial intelligence originated voice pattern, said at least a portion of the contents of the media packets being audio packets.

Method Embodiment 2C. The communications method of method embodiment 2B1 wherein upon detecting that at least a portion of the contents of the media packets of the first call being monitored match a voice pattern of a previously identified artificial intelligence originated voice pattern determining that the first call was originated from an artificial intelligence system.

Method Embodiment 2D. The communications method of method embodiment 2C, wherein detecting that the at least a portion of the contents of the media packets of the first call being monitored match a voice pattern of a previously identified artificial intelligence originated voice pattern includes comparing the monitored content of the media packets of the first call to recorded speech patterns known to be used for generating artificial intelligence speech.

Method Embodiment 2E. The communications method of method embodiment 2B, wherein said monitoring of said at least a portion of the contents of media packets of the first call is performed using a machine learning algorithm that receives the monitored contents of the media packets of the first call and generates a probability that the first call is an artificial intelligence generated call.

Method Embodiment 2F. The communications method of method embodiment 2E, wherein prior to said monitoring of said contents of media packets of the first call is performed, training the machine learning algorithm to generate a probability that a set of data corresponding to media content of a call was generated by an artificial intelligence, said training using one or more of the following: (i) a dataset of artificial intelligence recorded speech patterns, (ii) a dataset of speech patterns used by artificial intelligence systems to generate speech, (iii) a first dataset of media content of a plurality of calls which were not originated by an artificial intelligence system, (iv) a second dataset of media content from a plurality of calls, said second dataset including calls which originated from an artificial intelligence system and calls which did not originate from an artificial intelligence system.

Method Embodiment 2G. The communications method of method embodiment 2F, wherein the first and second dataset of media content from a plurality of calls includes media content from the first 50 seconds of each the calls.

Method Embodiment 2G1. The communications method of method embodiment 2F, wherein the first and second dataset of media content from a plurality of calls includes media content from a first portion of each of said calls, said first portion of each of said calls being less than a first threshold number of seconds since call connection establishment, said first threshold number of seconds being programmable.

Method Embodiment 2G2. The communications method of method embodiment 2G1, wherein said first programmable threshold number of seconds is 25 seconds.

Method Embodiment 2H. The communications method of method embodiment 2F, wherein when said generated probability that the first call is an artificial intelligence generated call is greater than a first threshold the first call is determined to be a call originating from an artificial intelligence system.

Method Embodiment 2I. The communications method of method embodiment 2H, wherein the first threshold is programmable.

Method Embodiment 2J. The communications method of method embodiment 2H, wherein the threshold is a probability of 85%.

Method Embodiment 2K. The communications method of method embodiment 2H, wherein when said first call is determined to have originated from an artificial intelligence system providing different call handling operations on the first call based on the generated probability that the call was originated from an artificial intelligence system.

Method Embodiment 2K1. The communications method of method embodiment 2K, wherein when the first call is determined to have originated from an artificial intelligence system based on an explicit artificial intelligence indicator being present in call signaling of the first call (e.g., new SIP header/parameter in SIP INVITE or SDP mime (or equivalent signaling indicating source of the call)); or an explicit artificial intelligence indicator being present in call media of the first call assigning a probability of 100% that the first call was originated from an artificial intelligence system.

Method Embodiment 3. The communications method of method embodiment 1, wherein determining whether or not said first call originated from said artificial intelligence system includes one or more of the following: determining if an explicit artificial intelligence indicator indicating that the first call originated from an artificial intelligence system is present in first call signaling of the first call; determining if an explicit or implicit artificial intelligence indicator indicating that the first call originated from an artificial intelligence system is present in first call media of the first call.

Method Embodiment 3A. The communications method of method embodiment 3, wherein determining if an explicit or implicit artificial intelligence indicator indicating that the first call originated from an artificial intelligence system is present in said first call media includes: processing at least a portion of an audio signal of the first call to determine if it includes an explicit or implicit artificial intelligence indicator indicating the first call originated from an artificial intelligence system; and processing at least a portion of a video signal of the first call to determine if the video signal includes an explicit or implicit artificial intelligence indicator indicating the first call originated from an artificial intelligence system.

Method Embodiment 3B. The communications method of method embodiment 3A wherein said processing of the at least a portion of the audio signal of the first call to determine if the audio signal includes an implicit artificial intelligence indicator indicating the first call is from an artificial intelligence system includes performing by a biometric measurement system artificial intelligence voice pattern recognition on at least a portion of the audio signal of the first call.

Method Embodiment 4. The communications method of method embodiment 3, when an explicit artificial intelligence indicator is detected in said first call checking whether said detected explicit artificial intelligence indicator indicates the first call originated from an artificial intelligence system; and when said explicit artificial intelligence indicator is not detected in said first call determining that the first call did not originate from an artificial intelligence system.

Method Embodiment 4A. The communications method of method embodiment 4, wherein said explicit artificial intelligence indicator is an artificial intelligence flag included in said first call signaling, and wherein checking whether said detected explicit artificial intelligence indicator indicates the first call originated from an artificial intelligence system includes checking whether the artificial intelligence flag is set. (e.g., AI bit flag with a value of 1 indicating the first call is from an artificial intelligence system and a value of 0 to indicate that the call is not from an AI or alternatively the AI indicator has boolean true or false values).

Method Embodiment 5. The communications method of method embodiment 3A, wherein said processing at least a portion of the audio signal of the first call to determine if the audio signal includes an explicit artificial intelligence indicator indicating the first call is from an artificial intelligence system includes determining whether the at least a portion of the audio signal of the first call includes a fixed tone, tone pattern or speech announcement indicating that the first call originated from an artificial intelligence system.

Method Embodiment 6. The communications method of method embodiment 5 further comprising: determining that the first call originated from an artificial intelligence system upon determining that the at least a portion of the audio signal of the first call does include a fixed tone, tone pattern or speech announcement indicating that the first call originated from an artificial intelligence system.

Method Embodiment 7. The communication method of method embodiment 5, wherein said processing the at least a portion of the video signal of the first call to determine if the video signal includes an explicit indicator indicating the first call is from an artificial intelligence system includes determining whether the at least a portion of the video signal of the first call includes text, a control signal, an image, or a set of images that indicates the first call originated from an artificial intelligence system.

Method Embodiment 7A. The communications method of method embodiment 7, wherein the image is a frame or a portion of a frame.

Method Embodiment 7B. The communications method of method embodiment 7, wherein the image that indicates the first call originated from an artificial intelligence system includes an image of an avatar representing an Artificial Intelligence or a Quick Response (QR) code.

Method Embodiment 7C. The communications method of method embodiment 7B, wherein the image that indicates the first call originated from an artificial intelligence system includes a QR code, said QR code including one or more of the following pieces of information embedded in it: a URL to a web page, the version of the originating AI system, the type of the originating AI system, or an indication of the purpose of the call (e.g., emergency announcement, service request, etc.).

Method Embodiment 8. The communications method of method embodiment 1 further including: when said first call is determined not to have originated from an artificial intelligence system performing a call handling operation on said first call different than said artificial intelligence call handling operations.

Method Embodiment 8A. The communications method of method embodiment 1 further comprising: determining based on a call handling policy the call handling operations to be performed, said call handling operations being call handling operations applied for human originated calls when said first call is determined not to have originated from an artificial intelligence system, said human call handling operations being different than said artificial intelligence call handling operations.

Method Embodiment 8B. The communications method of method embodiment 1 further comprising: determining based on call handling policies stored in a database, the artificial intelligence call handling operations to be performed when said first call is determined to have been originated from an artificial intelligence system.

Method Embodiment 9. The communications method of method embodiment 1 wherein when said first call is determined to have originated from an artificial intelligence system performing artificial intelligence call handling operations includes performing one or more of the following: placing said first call in a call waiting queue behind non-artificial intelligence originated (e.g., human originated) identified calls; instructing the artificial intelligence system that originated the first call to call back at a different time via signaling inserted into the signaling or media path of the first call; instructing the artificial intelligence system that originated the first call to call back to a different telephone number via signaling inserted into the signaling or media path of the first call; redirecting or transferring the first call to a voice messaging system to record a message; redirecting or transferring the first call to an interactive voice response system that will acquire the artificial intelligence's contact information to contact the artificial intelligence at a future time; blocking the first call; rejecting the first call; instructing the artificial intelligence system that originated the first call to contact a web service system, the contact information (e.g., IP address, URL, web address) of said web service system being included in a signaling response or media response to said first call.

Method Embodiment 9A. The communications method of method embodiment 9 further comprising: wherein said call handling operation is further based on one or more of the following: a type of artificial intelligence system from which the first call originated; information identifying the specific artificial intelligence system which originated the first call; information about previous calls received from the specific artificial intelligence system which originated the first call (e.g., pattern of AI originated calls indicating robocall, malicious activity or potentially malicious activity); additional information about the first call (e.g., one or more of the following: callee, caller, location, time of day, date, types of media used or to be used for the call, status of callee (off line, on-line, available, busy), type of device and/or device capabilities from which the first call originated (e.g., computer, laptop, smartphone, e.g., (iphone with iOs, Android, etc.).

Method Embodiment 9B. The communications method of method embodiment 9 wherein said instructing the artificial intelligence that originated the first call to call back at a different time via signaling inserted into the signaling or media path of the first call comprises: playing an audio announcement with the instruction inserted into the media path of the first call.

Method Embodiment 9C. The communications method of method embodiment 9 wherein instructing the artificial intelligence that originated the first call to call back on a different telephone number via signaling inserted into the signaling or media path of the first call comprises: playing an audio announcement with the instruction inserted into the media path of the first call.

Method Embodiment 10. The communications method of method embodiment 9, wherein said first call is received by a network equipment device; and wherein the artificial intelligence call handling operations to be performed are determined based on an artificial intelligence call handling operation network policy when said network equipment device determines that said first call originated from an artificial intelligence system.

Method Embodiment 10A. The communications method of method embodiment 10 further comprising: querying by the network equipment device a network equipment policy database to determine the artificial intelligence call handling operation policy to apply to the first call upon determining the first call originated from an artificial intelligence system.

Method Embodiment 11. The communications method of method embodiment 9, wherein said first call is received by an end point system corresponding to the destination address of the first call; and wherein the artificial intelligence call handling operations to be performed are determined based on an artificial intelligence call handling operation end point policy when said end point system determines that said first call originated from an artificial intelligence system.

Method Embodiment 11A. The communications method of method embodiment 11 further comprising: querying by the endpoint equipment device a policy database to determine the artificial intelligence call handling operation policy to apply to the first call upon determining the first call originated from an artificial intelligence system.

Method Embodiment 12. The communications method of method embodiment 1, wherein said first call is received by a first device from an originating system, said first call being destined for a second device, said first device being located in the signaling and media path between the originating system and the second device; and wherein performing artificial intelligence call handling operations includes: modifying said first call to include one or more artificial intelligence indicators in said signaling or said media of said first call, said one or more artificial intelligence indicators being artificial intelligence indicators not included in said first call; and transmitting said modified first call to said second device.

Method Embodiment 12A. The communications method of method embodiment 12 further comprising: when said first call is determined to not have originated from an artificial intelligence system modifying the first call to include an explicit artificial indicator indicating that the call did not originate from an artificial intelligence system, and transmitting said first call to said second device.

Method Embodiment 12AA. The communications method of method embodiment 12A wherein said one or more explicit artificial intelligence indicators include one or more of the following indicators indicating that the first call originated from an artificial intelligence system: an extension of a User-Agent header field of a first call SIP INVITE message, said first call origination signaling including said first call SIP INVITE message; an extension of a From header field of the first call SIP INVITE message; an extension of a Feature-Caps header field of the first call SIP INVITE message; a private header (P-header) field or an extension of a private header field included in the first call SIP INVITE message; an experimental header (X-header) field or an extension of an experimental header field included in the first call SIP INVITE message; a Session Description Protocol (SDP) MIME included in a SDP offer message included in the first call SIP INVITE message; an extension of a field of the SDP offer message included in the first call SIP INVITE message; information included in the Initial Address Message (IAM) of the first call origination signaling; and information included in the call setup signals for an H.323 call (e.g., call setup signaling of H.225 call control setup messages).

Method Embodiment 12AAA. The communications method of method embodiment 12 further comprising: when said first call is determined to not have originated from an artificial intelligence system refraining from modifying said first call to include an artificial intelligence indicator, and transmitting said first call to said second device.

Method Embodiment 12B. The communications method of method embodiment 12A, wherein said one or more artificial intelligence indicators includes at least one artificial intelligence indicator supported or recognized by said second device.

Method Embodiment 12B1. The communications method of method embodiment 12, wherein said one or more artificial intelligence indicators are explicit artificial intelligence indicators.

Method Embodiment 12B2. The communications method of method embodiment 12B1 wherein said one or more explicit artificial intelligence indicators include one or more of the following indicators indicating that the first call originated from an artificial intelligence system: an extension of a User-Agent header field of a first call SIP INVITE message, said first call origination signaling including said first call SIP INVITE message; an extension of a From header field of the first call SIP INVITE message; an extension of a Feature-Caps header field of the first call SIP INVITE message; a private header (P-header) field or an extension of a private header field included in the first call SIP INVITE message; an experimental header (X-header) field or an extension of an experimental header field included in the first call SIP INVITE message; a Session Description Protocol (SDP) MIME included in a SDP offer message included in the first call SIP INVITE message; an extension of a field of the SDP offer message included in the first call SIP INVITE message; an audio tone or pattern of audio tones included in the media of the first call; an audio announcement included in the media of the first call; a video image or set of images included in the media of the first call; information included in the Initial Address Message (IAM) of the first call origination signaling; and information included in the call setup signals for an H.323 call (e.g., call setup signaling of H.225 call control setup messages).

Method Embodiment 12C. The communications method of method embodiment 1, wherein said first call is received by a first device from an originating system, said first call being destined for a second device, said first device being located in the signaling and media path between the originating system and the second device; and wherein determining whether said first call originated from said artificial intelligence system includes determining if an artificial intelligence indicator (implicit or explicit) is present in said first call.

Method Embodiment 12C1. The communications method of method embodiment 12C wherein said determining if an artificial intelligence indicator is present in said first call includes: processing the signaling of the first call (e.g., call setup signaling) to determine if it is from an artificial intelligence; processing the audio signal of the first call to determine if it is from an artificial intelligence; processing the video signal of the first call to determine if it is from an artificial intelligence; and wherein performing artificial intelligence call handling operations includes: modifying said first call to include one or more explicit artificial intelligence indicators in said signaling or said media of said first call, said one or more explicit artificial intelligence indicators being artificial intelligence indicators supported or recognized by said second device but not included in said first call; and transmitting said modified first call to said second device.

Method Embodiment 12C2. The communications method of method embodiment 12C, wherein said determining if an artificial intelligence indicator is present in said first call includes: processing the signaling of the first call (e.g., call setup signaling) to determine if it is includes an explicit artificial intelligence indicator indicating the first call originated from an artificial intelligence system; processing the audio signal of the first call to determine if it includes an explicit artificial intelligence indicator indicating the first call originated from an artificial intelligence system; processing the video signal of the first call to determine if it includes an explicit artificial intelligence indicator indicating the first call originated from an artificial intelligence system; and wherein performing artificial intelligence call handling operations includes: when said processing of the signaling, the audio and the video results in a determination that the first call does not include a explicit artificial intelligence indicator indicating that the first call originated from an artificial intelligence system modifying said first call to include one or more explicit artificial intelligence indicators in said signaling of said first call indicating that the first call did not originate from an artificial intelligence system, said one or more explicit artificial intelligence indicators being artificial intelligence indicators supported or recognized by said second device but not included in said first call.

Method Embodiment 12C3. The communications method of method embodiment 12C2, wherein when said processing of the signaling, the audio and the video results in a determination that the first call does include an explicit artificial intelligence indicator indicating that the first call originated from an artificial intelligence system modifying said first call to include one or more additional explicit artificial intelligence indicators in said signaling or said media of said first call, said one or more explicit artificial intelligence indicators being artificial intelligence indicators supported or recognized by said second device but not included in said first call.

Method Embodiment 12D. The communications method of method embodiment 12C further comprising: prior to modifying said first call to include one or more artificial intelligence indicators determining that said artificial intelligence indicators included in said first call are not recognized or supported by said second device.

Method Embodiment 12D1. The communications method of method embodiment 12D further comprising: prior to determining that said artificial intelligence indicators included in said first call are not recognized or supported by said second device receiving at the first device information identifying the explicit artificial intelligence indicators the second device is equipped to recognize or support.

Method Embodiment 12D2. The communication method of method embodiment 12D1 wherein said information identifying the explicit artificial intelligence indicators the second device is equipped to recognize or support from one or more of the following: the second device, an operator of the second device, a network operator, or an AI interworking configuration equipment database.

Method Embodiment 12E. The communications method of method embodiment 12D wherein said first device is a network device.

Method Embodiment 12F. The communications method of method embodiment 1, wherein said first call is received by a first device from an originating system, said first call being destined for a second device, said first device being located in the signaling and media path between the originating system and the second device; said method further comprising: determining whether said first call includes one or more artificial intelligence indicators (implicit or explicit) in said signaling or media of said first call; when said first call is determined to include one or more artificial intelligence indicators in said signaling or media of said first call: modifying said first call to include one or more additional artificial intelligence indicators in said signaling or said media of said first call, and transmitting said modified first call to said second device.

Method Embodiment 12F1. The communication method of method embodiment 12F wherein said one or more additional artificial intelligence indicators are explicit artificial intelligence indicators.

Method Embodiment 12F2. The communications method of method embodiment 12F1 further comprising: when said first call is determined not to include an artificial intelligence indicator in said signaling or media of said first call: modifying said first call to include an explicit artificial intelligence indicator indicating that said first call was not originated from an artificial intelligence system, and transmitting said first call to said second device.

Method Embodiment 12G1. The communications method of method embodiment 12F further comprising: when said first call is determined not to include an artificial intelligence indicator in said signaling or media of said first call: refraining from modifying said first call, and transmitting said first call to said second device.

Method Embodiment 13. A communications method comprising: receiving at a first device a first call destined for a second device; determining whether said first call includes first information identifying said first call as originating from an artificial intelligence system; and when the first device determines that the first call includes first information identifying said first call as originating from an artificial intelligence system modifying by the first device at least one of said signaling of the first call or media of the first call to include second information identifying said first call as originating from an artificial intelligence system and transmitting the modified first call to the second device, said first information and said second information being different.

Method Embodiment 13A. The communications method of method embodiment 13 further comprising: when the first device determines that the first call does not include said first information identifying said first call as originating from an artificial intelligence system: modifying by the first device the first call to include second information identifying said first call as not originating from an artificial intelligence system, and transmitting by the first device the modified first call to the second device.

Method Embodiment 13A1. The communications method of method embodiment 13 further comprising: when the first device determines that the first call does not include said first information identifying said first call as originating from an artificial intelligence system, said first device refrains from modifying the first call to include second information identifying said first call as originating from an artificial intelligence system and transmitting the first call to the second device.

Method Embodiment 13B. The communications method of method embodiment 13A wherein said first information identifying said first call as originating from an artificial intelligence system includes one or more of the following: one or more explicit artificial intelligence indicators being present in call signaling of the first call (e.g., new SIP header/parameter in SIP INVITE or SDP mime (or equivalent signaling indicating source of the call)); and one or more artificial intelligence indicators being present in call media of the first call (e.g., audio signal such as a fixed tone, tone pattern, speech announcement designed to be understood by the human ear (e.g., "this is Alexa calling", "this is Google Assistant calling", "this is an Artificial Intelligence calling"), text or image designed to be understood by the human eye (e.g., text message indicating AI or image of an avatar representing an Artificial Intelligence).

Method Embodiment 13C. The communications method of method embodiment 13B wherein said second information identifying said first call as originating from an artificial intelligence system includes one or more of the following: at least one explicit artificial intelligence indicator added to the call signaling of the first call (e.g., new SIP header/parameter in SIP INVITE or SDP mime (or equivalent signaling indicating source of the call), and at least one explicit artificial intelligence indicator added to the call media of the first call (e.g., audio signal such as a fixed tone, tone pattern, speech announcement designed to be understood by the human ear (e.g., "this is Alexa calling", "this is Google Assistant calling", "this is an Artificial Intelligence calling"), text, image, or set of images designed to be understood by the human eye (e.g., text message indicating AI or image of an avatar representing an Artificial Intelligence).

Method Embodiment 14. The communications method of method embodiment 13, wherein said second device does not make a determination as to whether said first call originated from an artificial intelligence system based on said first information identifying said first call as originating from an artificial intelligence system; and wherein said second device does make a determination as to whether said first call originated from an artificial intelligence system based on said second information identifying said first call as originating from an artificial intelligence system.

Method Embodiment 15. The communications method of method embodiment 13, wherein said first information includes artificial intelligence indicators that are not supported or recognized by said second device; and wherein said second information includes at least one artificial intelligence indicator recognized or supported by said second device.

Method Embodiment 15A. The communications method of method embodiment 13, wherein at least one artificial intelligence indicator recognized or supported by said second device is an explicit artificial intelligence indicator.

Method Embodiment 16. A communications method comprising: receiving at a first device a first call destined for a second device; determining whether said first call includes a first type of artificial intelligence indicator identifying said first call as originating from an artificial intelligence system, said first artificial intelligence indicator being a call signaling artificial intelligence indicator included in said call signaling of said first call or being a call media artificial intelligence indicator included in said call media of the first call; when said first call is determined to include the first type of artificial intelligence indicator determining by said first device whether said second device recognizes or supports said first type of artificial intelligence indicator; and when said first device determines that said second device does not recognize or support said first type of artificial intelligence indicator performing by said first device an interworking operation on said first call modifying at least one of the signaling or the media of the first call to include a second type of artificial intelligence indicator that identifies said first call as being originated by an artificial intelligence system, said second type of artificial intelligence indicator being an artificial intelligence indicator recognized and supported by the second device and transmitting said modified first call to said second device.

Method Embodiment 17. The communications method of method embodiment 1: wherein said first call is received at a first device, said first device including an artificial intelligence system; wherein said first device makes said determination as to whether said first call originated from an artificial intelligence system; and when said first call is determined to have originated from an artificial intelligence system said first device performs said artificial intelligence call handling operations, said artificial intelligence call handling operations including one or more of the following: directing said artificial intelligence system that originated said first call to move to a Machine to Machine (M:M) form of communication by transmitting contact information for another machine system to the artificial intelligence system which originated the first call via the media path or signaling path of the first call; advertising the capabilities offered by a M:M form of communication with said another machine system via information transmitted to the artificial intelligence system which originated the first call, said information being transmitted via the media path or signaling path of the first call.

Method Embodiment 17A. The communications method of method embodiment 17, wherein the another machine system is a web service system; wherein the contact information for the web service system is a URL or web address of the web service system; and wherein the capabilities advertised include the type of communication interface supported by the web service system (e.g., English language text, Spanish language text, etc.) and the service provided by the web service system.

Method Embodiment 17B. The communications method of method embodiment 17, wherein said contact information is provided as audio announcement played by the first device to said originating artificial intelligence system, said contact information including a URL address of a web service system.

Method Embodiment 17C. The communications method of method embodiment 17, wherein said contact information is a URL address of a web service system included in a call rejection message sent by said first device to said artificial intelligence system that originated said first call.

Method Embodiment 17D. The communications method of method embodiment 17C, wherein said call rejection message is a SIP 4XX message sent in response to a SIP INVITE message received as part of the first call from the artificial intelligence system which originated the first call.

Method Embodiment 18. The communications method of method embodiment 17, wherein said artificial intelligence system that originated said first call stores the received contact information for the another machine system in memory.

1 Method Embodiment 9. The communications method of method embodiment 18, wherein at a later time the artificial intelligence system that originated the first call accesses the received contact information for the another machine system from memory and uses it to place a machine to machine call to the another machine system instead of placing a voice call to the second device.

Method Embodiment 20. The communications method of method embodiment 1, wherein receiving said first call includes receiving a call initiation request message including an artificial intelligence indicator indicating the first call is from an artificial intelligence system; and wherein a first device including an artificial intelligence system receives said first call and makes said determination that said first call is a call originating from an artificial intelligence system based on said artificial intelligence indicator included in said call initiation message; and wherein said artificial intelligence call handling operation performed by said first device includes responding to the call initiation message by: generating a call initiation response message including contact information for a web service system, and transmitting the call initiation response message to the artificial intelligence system that originated the first call.

Method Embodiment 21. The communications method of method embodiment 20, wherein the call initiation request message is a SIP INVITE message with a header field including the artificial intelligence indicator; and wherein the call response message is a SIP 4XX response message including the contact information for the web service system, said contact information being a URL address.

Method Embodiment 22. The communications method of method embodiment 1, wherein said first call is received by a first device including an artificial intelligence system, media of said first call including an artificial intelligence indicator; wherein said artificial intelligence system of the first device makes said determination that said first call is a call originating from an artificial intelligence system based on said artificial intelligence indicator included in said media of said first call; and wherein said artificial intelligence call handling operation performed by said first device includes communicating via the media path of the first call to the artificial intelligence system that originated the first call an indication that the first call is a machine to machine call by playing an audio announcement message including contact information for a web service system inserted onto the media path connecting the first device to the artificial intelligence system from which the first call was originated.

Method Embodiment 23. The communications method of method embodiment 22, wherein said artificial intelligence system included in the first device is an Interactive Voice Response (IVR) system; wherein said contact information is a Universal Resource Identifier (URI).

Method Embodiment 24. The communications method of method embodiment 23, wherein the artificial intelligence system included in the first device also plays an announcement to the originating artificial intelligence system advertising one or more of the following: services provided by the web service (e.g., making or booking a flight reservations, updating a flight reservation, cancelling a flight reservation), the type of communications interfaces (e.g., speech recognition, text recognition, API interfaces) available for communicating with the web service system.

Method Embodiment 25. The communications method of method embodiment 24, wherein said artificial intelligence system included in the first device announces that it is an artificial intelligence device upon the establishment of the media path of the first call and that the first call is being recorded.

Method Embodiment 26. A method of operating a user device comprising: establishing a first call with a second system by an artificial intelligence system or application included in the user device in response to a first request for service from a first user; requesting the service from the second system by playing an announcement; receiving an indication that the second system is an artificial intelligence system via signaling or media received from the second system as part of the first call, said indication including a URI for a web service system; establishing a connection with the web service system using said URI; completing a transaction with the web service system; notifying the user of the user device that the requested service has been completed; storing in memory of the user device the type of service requested by the user, contact information initially used to contact the second system, and the URI provided by the second system.

Method Embodiment 26A. The method of method embodiment 26, wherein the artificial intelligence system or application included in the user device in establishing the first call includes an indication in either the call signaling or the call media that the call is being originated from an artificial intelligence.

Method Embodiment 27. The method of method embodiment 26 further comprising: receiving a second request for service from a user of the user device, said second request being for the same type of service as included in said first request; refraining from initiating a call to the second system; retrieving from said memory said URI provided by the second system; establishing a second connection with the web service system using said retrieved URI; completing a second transaction with the web service system; notifying the user of the user device that the second requested service has been completed.

Method Embodiment 28. The method of method embodiment 27, wherein said memory is cache memory; wherein said URI is a URL; wherein said notifying said user of the user device includes one or more of: displaying a notification on the display of the user device, updating a transaction log file on the user device, sending an e-mail to an e-mail account corresponding to the user that requested the service, playing an announcement on the speaker phone of the user device. sending a text message to the user device using Short Message Service, and sending a multimedia message to the user device using Multimedia Messaging Service.

Method Embodiment 29. The method of method embodiment 28, wherein the requested service is one of the following: a request to make a transaction, a request to make a flight reservation, a request to change or update a flight reservation, a request to cancel a flight reservation, a request to determine the status of a flight, a request to make an appointment, a request to change an appointment, a request to purchase an item or service, a request for account information, a request to obtain information on the shipping status of a purchased item, a request for status on a refund (e.g., refund of a purchased item, tax refund, etc.), a request for information on an individual or business (e.g., contact information, telephone number, location or address, business hours, individual alive or deceased, SSN number, driver's license, bank information, credit information, account status, URI information, etc.).

Numbered List of Exemplary System Embodiments

System Embodiment 1. A communications system comprising: a communications device including a processor, said processor controlling the operation of the communications device to: receive a first call; determine whether said first call originated from an artificial intelligence system; and when said first call is determined to have originated from an artificial intelligence system perform one or more artificial intelligence call handling operations.

System Embodiment 1A. The communications system of system embodiment 1 wherein said operation to receive a first call includes receiving first call origination signaling to establish said first call, said first call origination signaling including an explicit indication whether the first call was originated from an artificial intelligence system.

System Embodiment 1A1. The communications system of system embodiment 1 wherein the first call is initiated using one of the following protocols: Voice Over Internet Protocol, Session Initiation Protocol, ITU-T Recommendation H.323 protocol, and Signaling System No. 7 telephony protocol.

System Embodiment 1AA. The communications system of system embodiment 1A, wherein the first call origination signaling includes a SIP INVITE message with said explicit indication of whether said first call originated from an artificial intelligence being included in a parameter or header field of the SIP INVITE message.

System Embodiment 1AAA. The communications system of system embodiment 1A, wherein the explicit indication of whether or not said first call originated from an artificial intelligence system is included as one or more of the following: an extension of a User-Agent header field of a first call SIP INVITE message, said first call origination signaling including said first call SIP INVITE message; an extension of a From header field of the first call SIP INVITE message; an extension of a Feature-Caps header field of the first call SIP INVITE message; a private header (P-header) field or an extension of a private header field included in the first call SIP INVITE message; an experimental header (X-header) field or an extension of an experimental header field included in the first call SIP INVITE message; a Session Description Protocol (SDP) MIME included in a SDP offer message included in the first call SIP INVITE message; an extension of a field of the SDP offer message included in the first call SIP INVITE message; an audio tone or pattern of audio tones included in the media of the first call; an audio announcement included in the media of the first call; a video image or set of images included in the media of the first call; information included in the Initial Address Message (IAM) of the first call origination signaling; and information included in the call setup signals for an H.323 call (e.g., call setup signaling of H.225 call control setup messages).

System Embodiment 1AAAA. The communications system of system embodiment 1AAA, wherein the audio tone or pattern of audio tones is included at the beginning of the call (e.g., within the first 20 seconds of media); wherein the audio announcement is included at the beginning of the call (e.g., within the first 20 seconds of media); and wherein the video image or set of images is included at the beginning of the call (e.g., within the first 20 seconds of media).

System Embodiment 2. The communications system of system embodiment 1, wherein said operation to determine whether or not said first call originated from an artificial intelligence system is based on one or more of the following: (i) an explicit indicator included in first call signaling of the first call that said first call originated from an artificial intelligence device, (ii) an indicator (e.g., could be implicit or explicit) included in first call media of the first call that said first call originated from an artificial intelligence system System Embodiment 2A. The communications system of system embodiment 2, wherein said operation to determine whether or not said first call originated from an artificial intelligence system includes one or more of the following: determining if an explicit artificial intelligence indicator is present in call signaling of the first call (e.g., new SIP header/parameter in SIP INVITE or SDP mime (or equivalent signaling indicating source of the call)); and determining if an artificial intelligence indicator (explicit or implicit) is present in call media of the first call (e.g., audio signal such as a fixed tone, tone pattern, speech announcement designed to be understood by the human ear (e.g., "this is Alexa calling", "this is Google Assistant calling", "this is an Artificial Intelligence calling"), text, image or set of images designed to be understood by the human eye (e.g., text message indicating AI or image or set of images of an avatar representing an Artificial Intelligence).

System Embodiment 2B. The communications system of system embodiment 2A, wherein said operation to determine whether said first call originated from an artificial intelligence device further includes: determining whether or not the first call includes an implicit indicator that the first call originated from an artificial intelligence system.

System Embodiment 2B1. The communications system of system embodiment 2B, wherein said determining whether said first call includes an implicit indication that the first call originated from an artificial intelligence system includes: monitoring at least a portion of the contents of the media (RTP) packets received during the first call to detect whether the at least a portion of the contents of the media packets match a voice pattern of a previously identified artificial intelligence originated voice pattern, said at least a portion of the contents of the media packets being audio packets.

System Embodiment 2C. The communications system of system embodiment 2B1 wherein said processor operates the communications device to determine that the first call was originated from an artificial intelligence system upon detecting that at least a portion of the contents of the media packets of the first call being monitored match a voice pattern of a previously identified artificial intelligence originated voice pattern.

System Embodiment 2D. The communications system of system embodiment 2C, wherein detecting that the at least a portion of the contents of the media packets of the first call being monitored match a voice pattern of a previously identified artificial intelligence originated voice pattern includes comparing the monitored content of the media packets of the first call to recorded speech patterns known to be used for generating artificial intelligence speech.

System Embodiment 2E. The communications system of system embodiment 2B, wherein said monitoring of said at least a portion of the contents of media packets of the first call is performed using a machine learning algorithm that receives the monitored contents of the media packets of the first call and generates a probability that the first call is an artificial intelligence generated call.

System Embodiment 2F. The communications system of system embodiment 2E, wherein prior to said monitoring of said contents of media packets of the first call is performed, training the machine learning algorithm to generate a probability that a set of data corresponding to media content of a call was generated by an artificial intelligence, said training using one or more of the following: (i) a dataset of artificial intelligence recorded speech patterns, (ii) a dataset of speech patterns used by artificial intelligence systems to generate speech, (iii) a first dataset of media content of a plurality of calls which were not originated by an artificial intelligence system, (iv) a second dataset of media content from a plurality of calls, said second dataset including calls which originated from an artificial intelligence system and calls which did not originate from an artificial intelligence system.

System Embodiment 2G. The communications system of system embodiment 2F, wherein the first and second dataset of media content from a plurality of calls includes media content from the first 50 seconds of each the calls.

System Embodiment 2G1. The communications system of system embodiment 2F, wherein the first and second dataset of media content from a plurality of calls includes media content from a first portion of each of said calls, said first portion of each of said calls being less than a first threshold number of seconds since call connection establishment, said first threshold number of seconds being programmable.

System Embodiment 2G2. The communications system of system embodiment 2G1, wherein said first programmable threshold number of seconds is 25 seconds.

System Embodiment 2H. The communications system of system embodiment 2F, wherein when said generated probability that the first call is an artificial intelligence generated call is greater than a first threshold the first call is determined to be a call originating from an artificial intelligence system.

System Embodiment 2I. The communications system of system embodiment 2H, wherein the first threshold is programmable.

System Embodiment 2J. The communications system of system embodiment 2H, wherein the threshold is a probability of 85%.

System Embodiment 2K. The communications system of system embodiment 2H, wherein when said first call is determined to have originated from an artificial intelligence system providing different call handling operations on the first call based on the generated probability that the call was originated from an artificial intelligence system.

System Embodiment 2K1. The communications system of system embodiment 2K, wherein when the first call is determined to have originated from an artificial intelligence system based on an explicit artificial intelligence indicator being present in call signaling of the first call (e.g., new SIP header/parameter in SIP INVITE or SDP mime (or equivalent signaling indicating source of the call)); or an explicit artificial intelligence indicator being present in call media of the first call assigning a probability of 100% that the first call originated from an artificial intelligence system.

System Embodiment 3. The communications system of system embodiment 1, wherein said operation to determine whether or not said first call originated from said artificial intelligence system includes one or more of the following: determining if an explicit artificial intelligence indicator indicating that the first call originated from an artificial intelligence system is present in first call signaling of the first call; determining if an explicit or implicit artificial intelligence indicator indicating that the first call originated from an artificial intelligence system is present in first call media of the first call.

System Embodiment 3A. The communications system of system embodiment 3, wherein said determining if an explicit or implicit artificial intelligence indicator indicating that the first call originated from an artificial intelligence system is present in said first call media includes: processing at least a portion of an audio signal of the first call to determine if the audio signal includes an explicit or implicit artificial intelligence indicator indicating the first call originated from an artificial intelligence system; and processing at least a portion of a video signal of the first call to determine if the video signal includes an explicit or implicit artificial intelligence indicator indicating the first call originated from an artificial intelligence system.

System Embodiment 3B. The communications system of system embodiment 3A, wherein said processing at least a portion of the audio signal of the first call to determine if it includes an implicit artificial intelligence indicator indicating the first call is from an artificial intelligence system includes performing by a biometric measurement system artificial intelligence voice pattern recognition on at least a portion of the audio signal of the first call.

System Embodiment 4. The communications system of system embodiment 3 further comprising, when an explicit artificial intelligence indicator is detected in said first call checking whether said detected explicit artificial intelligence indicator indicates the first call originated from an artificial intelligence system; and when said explicit artificial intelligence indicator is not detected in said first call determining that the first call did not originate from an artificial intelligence system.

System Embodiment 4A. The communications system of system embodiment 4, wherein said explicit artificial intelligence indicator is an artificial intelligence flag included in said first call signaling, and wherein checking whether said detected explicit artificial intelligence indicator indicates the first call originated from an artificial intelligence system includes checking whether the artificial intelligence flag is set. (e.g., AI bit flag with a value of 1 indicating the first call is from an artificial intelligence system and a value of 0 to indicate that the call is not from an AI or alternatively the AI indicator has boolean true or false values).

System Embodiment 5. The communications system of system embodiment 3A, wherein said processing at least a portion of the audio signal of the first call to determine if the audio signal includes an explicit artificial intelligence indicator indicating the first call is from an artificial intelligence system includes determining whether the at least a portion of the audio signal of the first call includes a fixed tone, tone pattern or speech announcement indicating that the first call originated from an artificial intelligence system.

System Embodiment 6. The communications system of system embodiment 5 further comprising: determining that the first call was originated from an artificial intelligence system upon determining that the at least a portion of the audio signal of the first call does include a fixed tone, tone pattern or speech announcement indicating that the first call originated from an artificial intelligence system.

System Embodiment 7. The communication system of system embodiment 5, wherein said processing the at least a portion of the video signal of the first call to determine if the video signal includes an explicit indicator indicating the first call is from an artificial intelligence system includes determining whether the at least a portion of the video signal of the first call includes text, a control signal, an image, or a set of images that indicates the first call originated from an artificial intelligence system.

System Embodiment 7A. The communications system of system embodiment 7, wherein the image is a frame or a portion of a frame.

System Embodiment 7B. The communications system of system embodiment 7, wherein the image that indicates the first call originated from an artificial intelligence system includes an image of an avatar representing an Artificial Intelligence or a Quick Response (QR) code.

System Embodiment 7C. The communications system of system embodiment 7B, wherein the image that indicates the first call originated from an artificial intelligence system includes a QR code, said QR code including one or more of the following pieces of information embedded in it: a URL to a web page, the version of the originating AI system, the type of the originating AI system, or an indication of the purpose of the call (e.g., emergency announcement, service request, etc.).

System Embodiment 8. The communications system of system embodiment 1 wherein when said first call is determined not to have originated from an artificial intelligence system said processor controls the communications device to perform a call handling operation on said first call different than said artificial intelligence call handling operations.

System Embodiment 8A. The communications system of system embodiment 1, wherein the processor further controls the communication device to perform the following additional operation: determine based on a call handling policy the call handling operations to be performed, said call handling operations being call handling operations applied for human originated calls when said first call is determined not to have originated from an artificial intelligence system, said human call handling operations being different than said artificial intelligence call handling operations.

System Embodiment 8B. The communications system of system embodiment 1, wherein the processor further controls the communications device to perform the following operation: determine based on call handling policies stored in a database, the artificial intelligence call handling operations to be performed when said first call is determined to have been originated from an artificial intelligence system.

System Embodiment 9. The communications system of system embodiment 1 wherein when said first call is determined to have originated from an artificial intelligence system performing artificial intelligence call handling operations includes performing one or more of the following: placing said first call in a call waiting queue behind non-artificial intelligence originated (e.g., human originated) identified calls; instructing the artificial intelligence system that originated the first call to call back at a different time via signaling inserted into the signaling or media path of the first call; instructing the artificial intelligence system that originated the first call to call back to a different telephone number via signaling inserted into the signaling or media path of the first call; redirecting or transferring the first call to a voice messaging system to record a message; redirecting or transferring the first call to an interactive voice response system that will acquire the artificial intelligence's contact information to contact the artificial intelligence at a future time; blocking the first call; rejecting the first call; instructing the artificial intelligence system that originated the first call to contact a web service system, contact information (e.g., IP address, URL, web address) of said web service system being included in a signaling response or media response to said first call.

System Embodiment 9A. The communications system of system embodiment 9, wherein said call handling operation is further based on one or more of the following: a type of artificial intelligence system from which the first call originated; information identifying the specific artificial intelligence system which originated the first call; information about previous calls received from the specific artificial intelligence system which originated the first call (e.g., pattern of AI originated calls indicating robocall, malicious activity or potentially malicious activity); additional information about the first call (e.g., one or more of the following: callee, caller, location, time of day, date, types of media used or to be used for the call, status of callee (off line, on-line, available, busy), type of device and/or device capabilities from which the first call originated (e.g., computer, laptop, smartphone, e.g., (iphone with iOs, Android, etc.).

System Embodiment 9B. The communications system of system embodiment 9 wherein said instructing the artificial intelligence that originated the first call to call back at a different time via signaling inserted into the signaling or media path of the first call comprises: playing an audio announcement with the instruction inserted into the media path of the first call.

System Embodiment 9C. The communications system of system embodiment 9 wherein instructing the artificial intelligence that originated the first call to call back on a different telephone number via signaling inserted into the signaling or media path of the first call comprises: playing an audio announcement with the instruction inserted into the media path of the first call.

System Embodiment 10. The communications system of system embodiment 9, wherein said communications device is a network equipment device; and wherein the artificial intelligence call handling operations to be performed are determined based on an artificial intelligence call handling operation network policy when said network equipment device determines that said first call originated from an artificial intelligence system.

System Embodiment 10A. The communications system of system embodiment 10 wherein said processor further controls the communications device to a network equipment policy database to determine the artificial intelligence call handling operation policy to apply to the first call upon determining the first call originated from an artificial intelligence system.

System Embodiment 11. The communications system of system embodiment 9, wherein said communications device is an end point system corresponding to the destination address of the first call; and wherein the artificial intelligence call handling operations to be performed are determined based on an artificial intelligence call handling operation end point policy when said end point system determines that said first call originated from an artificial intelligence system.

System Embodiment 11A. The communications system of system embodiment 11, wherein said processor further controls the communications device to query a policy database to determine the artificial intelligence call handling operation policy to apply to the first call upon determining the first call originated from an artificial intelligence system.

System Embodiment 12. The communications system of system embodiment 1, wherein said first call is received by a first device from an originating system, said first call being destined for a second device, said first device being located in the signaling and media path between the originating system and the second device; and wherein performing artificial intelligence call handling operations includes: modifying said first call to include one or more artificial intelligence indicators in said signaling or said media of said first call, said one or more artificial intelligence indicators being artificial intelligence indicators not included in said first call; and transmitting said modified first call to said second device.

System Embodiment 12A. The communications system of system embodiment 12, wherein when said first call is determined to not have originated from an artificial intelligence system, the processor further controls the communications device to: modify the first call to include an explicit artificial indicator indicating that the call did not originate from an artificial intelligence system, and transmit said first call to said second device.

System Embodiment 12AA. The communications system of system embodiment 12A wherein said one or more explicit artificial intelligence indicators include one or more of the following indicators indicating that the first call originated from an artificial intelligence system: an extension of a User-Agent header field of a first call SIP INVITE message, said first call origination signaling including said first call SIP INVITE message; an extension of a From header field of the first call SIP INVITE message; an extension of a Feature-Caps header field of the first call SIP INVITE message; a private header (P-header) field or an extension of a private header field included in the first call SIP INVITE message; an experimental header (X-header) field or an extension of an experimental header field included in the first call SIP INVITE message; a Session Description Protocol (SDP) MIME included in a SDP offer message included in the first call SIP INVITE message; an extension of a field of the SDP offer message included in the first call SIP INVITE message; and information included in the Initial Address Message (IAM) of the first call origination signaling; and information included in the call setup signals for an H.323 call (e.g., call setup signaling of H.225 call control setup messages).

System Embodiment 12AAA. The communications system of system embodiment 12 wherein when said first call is determined to not have originated from an artificial intelligence system, the processor controls the communications device to perform the following operations: refrain from modifying said first call to include an artificial intelligence indicator, and transmit said first call to said second device.

System Embodiment 12B. The communications system of system embodiment 12A, wherein said one or more artificial intelligence indicators includes at least one artificial intelligence indicator supported or recognized by said second device.

System Embodiment 12B1. The communications system of system embodiment 12, wherein said one or more artificial intelligence indicators are explicit artificial intelligence indicators.

System Embodiment 12B2. The communications system of system embodiment 12B1 wherein said one or more explicit artificial intelligence indicators include one or more of the following indicators indicating that the first call originated from an artificial intelligence system: an extension of a User-Agent header field of a first call SIP INVITE message, said first call origination signaling including said first call SIP INVITE message; an extension of a From header field of the first call SIP INVITE message; an extension of a Feature-Caps header field of the first call SIP INVITE message; a private header (P-header) field or an extension of a private header field included in the first call SIP INVITE message; an experimental header (X-header) field or an extension of an experimental header field included in the first call SIP INVITE message; a Session Description Protocol (SDP) MIME included in a SDP offer message included in the first call SIP INVITE message; an extension of a field of the SDP offer message included in the first call SIP INVITE message; an audio tone or pattern of audio tones included in the media of the first call; an audio announcement included in the media of the first call; a video image or set of images included in the media of the first call; information included in the Initial Address Message (IAM) of the first call origination signaling; and information included in the call setup signals for an H.323 call (e.g., call setup signaling of H.225 call control setup messages).

System Embodiment 12C. The communications system of system embodiment 1, wherein said first call is received by the communications device from an originating system, said first call being destined for a second device, said communications device being located in the signaling and media path between the originating system and the second device; and wherein said operation to determine whether said first call originated from said artificial intelligence system includes determining if an artificial intelligence indicator (implicit or explicit) is present in said first call.

System Embodiment 12C1. The communications system of system embodiment 12C wherein said operation to determine if an artificial intelligence indicator is present in said first call includes: processing the signaling of the first call (e.g., call setup signaling) to determine if it is from an artificial intelligence; processing the audio signal of the first call to determine if it is from an artificial intelligence; processing the video signal of the first call to determine if it is from an artificial intelligence; and wherein performing artificial intelligence call handling operations includes: modifying said first call to include one or more explicit artificial intelligence indicators in said signaling or said media of said first call, said one or more explicit artificial intelligence indicators being artificial intelligence indicators supported or recognized by said second device but not included in said first call; and transmitting said modified first call to said second device.

System Embodiment 12C2. The communications system of system embodiment 12C, wherein said operation to determine if an artificial intelligence indicator is present in said first call includes: processing the signaling of the first call (e.g., call setup signaling) to determine if it is includes an explicit artificial intelligence indicator indicating the first call originated from an artificial intelligence system; processing the audio signal of the first call to determine if it includes an explicit artificial intelligence indicator indicating the first call originated from an artificial intelligence system; processing the video signal of the first call to determine if it includes an explicit artificial intelligence indicator indicating the first call originated from an artificial intelligence system; and wherein said operation to perform artificial intelligence call handling operations includes: when said processing of the signaling, the audio and the video results in a determination that the first call does not include an explicit artificial intelligence indicator indicating that the first call originated from an artificial intelligence system modifying said first call to include one or more explicit artificial intelligence indicators in said signaling of said first call indicating that the first call did not originate from an artificial intelligence system, said one or more explicit artificial intelligence indicators being artificial intelligence indicators supported or recognized by said second device but not included in said first call.

System Embodiment 12C3. The communications system of system embodiment 12C2, wherein when said processing of the signaling, the audio and the video results in a determination that the first call does include an explicit artificial intelligence indicator indicating that the first call originated from an artificial intelligence system modifying said first call to include one or more additional explicit artificial intelligence indicators in said signaling or said media of said first call, said one or more explicit artificial intelligence indicators being artificial intelligence indicators supported or recognized by said second device but not included in said first call.

System Embodiment 12D. The communications system of system embodiment 12C, wherein prior to modifying said first call to include one or more artificial intelligence indicators said processor controls the communications device to determine that said artificial intelligence indicators included in said first call are not recognized or supported by said second device.

System Embodiment 12D1. The communications system of system embodiment 12D, wherein prior to determining that said artificial intelligence indicators included in said first call are not recognized or supported by said second device receiving at the first device information, the processor controls the communications device to identify the explicit artificial intelligence indicators the second device is equipped to recognize or support.

System Embodiment 12D2. The communication system of system embodiment 12D1, wherein said information identifying the explicit artificial intelligence indicators the second device is equipped to recognize or support from one or more of the following: the second device, an operator of the second device, a network operator, or an AI interworking configuration equipment database.

System Embodiment 12E. The communications system of system embodiment 12D, wherein said first device is a network device.

System Embodiment 12F. The communications system of system embodiment 1, wherein said first call is received by the communications device from an originating system, said first call being destined for a second device, said communication device being located in the signaling and media path between the originating system and the second device; said processor further controlling the communications device to: determine whether said first call includes one or more artificial intelligence indicators (implicit or explicit) in said signaling or media of said first call; and when said first call is determined to include one or more artificial intelligence indicators in said signaling or media of said first call: modify said first call to include one or more additional artificial intelligence indicators in said signaling or said media of said first call, and transmit said modified first call to said second device.

System Embodiment 12F1. The communication system of system embodiment 12F wherein said one or more additional artificial intelligence indicators are explicit artificial intelligence indicators.

System Embodiment 12F2. The communications system of system embodiment 12F1 further comprising: when said first call is determined not to include an artificial intelligence indicator in said signaling or media of said first call said processor controls the communications device to: modify said first call to include an explicit artificial intelligence indicator indicating that said first call was not originated from an artificial intelligence system, and transmit said first call to said second device.

System Embodiment 12G1. The communications system of system embodiment 12F, wherein when said first call is determined not to include an artificial intelligence indicator in said signaling or media of said first call, the processor controls the communications device to: refrain from modifying said first call, and transmit said first call to said second device.

System Embodiment 13. A communications system comprising: a first device including a processor, said processor controlling the first device to perform the following operations: receive at the first device a first call destined for a second device; determine whether said first call includes first information identifying said first call as originating from an artificial intelligence system; and when the first device determines that the first call includes first information identifying said first call as originating from an artificial intelligence system modifying by the first device at least one of said signaling of the first call or media of the first call to include second information identifying said first call as originating from an artificial intelligence system and transmitting the modified first call to the second device, said first information and said second information being different.

System Embodiment 13A. The communications system of system embodiment 13, wherein when the first device determines that the first call does not include said first information the processor controls the first device to: identify said first call as originating from an artificial intelligence system; modify by the first device the first call to include second information identifying said first call as not originating from an artificial intelligence system, and transmit by the first device the modified first call to the second device.

System Embodiment 13A1. The communications system of system embodiment 13, wherein when the first device determines that the first call does not include said first information identifying said first call as originating from an artificial intelligence system, said first device refrains from modifying the first call to include second information identifying said first call as originating from an artificial intelligence system and transmitting the first call to the second device.

System Embodiment 13B. The communications system of system embodiment 13A wherein said first information identifying said first call as originating from an artificial intelligence system includes one or more of the following: one or more explicit artificial intelligence indicators being present in call signaling of the first call (e.g., new SIP header/parameter in SIP INVITE or SDP mime (or equivalent signaling indicating source of the call)); and one or more artificial intelligence indicators being present in call media of the first call (e.g., audio signal such as a fixed tone, tone pattern, speech announcement designed to be understood by the human ear (e.g., "this is Alexa calling", "this is Google Assistant calling", "this is an Artificial Intelligence calling"), text or image designed to be understood by the human eye (e.g., text message indicating AI or image of an avatar representing an Artificial Intelligence).

System Embodiment 13C. The communications system of system embodiment 13B wherein said second information identifying said first call as originating from an artificial intelligence system includes one or more of the following: at least one explicit artificial intelligence indicator added to the call signaling of the first call (e.g., new SIP header/parameter in SIP INVITE or SDP mime (or equivalent signaling indicating source of the call), and at least one explicit artificial intelligence indicator added to the call media of the first call (e.g., audio signal such as a fixed tone, tone pattern, speech announcement designed to be understood by the human ear (e.g., "this is Alexa calling", "this is Google Assistant calling", "this is an Artificial Intelligence calling"), text, image, or set of images designed to be understood by the human eye (e.g., text message indicating AI or image of an avatar representing an Artificial Intelligence).

System Embodiment 14. The communications system of system embodiment 13, wherein said second device does not make a determination as to whether said first call originated from an artificial intelligence system based on said first information identifying said first call as originating from an artificial intelligence system; and wherein said second device does make a determination as to whether said first call originated from an artificial intelligence system based on said second information identifying said first call as originating from an artificial intelligence system.

System Embodiment 15. The communications system of system embodiment 13, wherein said first information includes artificial intelligence indicators that are not supported or recognized by said second device; and wherein said second information includes at least one artificial intelligence indicator recognized or supported by said second device.

System Embodiment 15A. The communications system of system embodiment 13, wherein at least one artificial intelligence indicator recognized or supported by said second device is an explicit artificial intelligence indicator.

16. A communications system comprising: a first device including a processor that controls the first device to: receive a first call destined for a second device; determine whether said first call includes a first type of artificial intelligence indicator identifying said first call as originating from an artificial intelligence system, said first artificial intelligence indicator being a call signaling artificial intelligence indicator included in said call signaling of said first call or being a call media artificial intelligence indicator included in said call media of the first call; and when said first call is determined to include the first type of artificial intelligence indicator determine by said first device whether said second device recognizes or supports said first type of artificial intelligence indicator; and when said first device determines that said second device does not recognize or support said first type of artificial intelligence indicator said processor control the first device to perform an interworking operation on said first call modifying at least one of the signaling or the media of the first call to include a second type of artificial intelligence indicator that identifies said first call as being originated by an artificial intelligence system, said second type of artificial intelligence indicator being an artificial intelligence indicator recognized and supported by the second device and transmitting said modified first call to said second device.

System Embodiment 17. The communications system of system embodiment 1: said communications device including an artificial intelligence system; wherein said processor controls the communications device to make said determination as to whether said first call originated from an artificial intelligence system; and when said first call is determined to have originated from an artificial intelligence system said processor controls the communications device to perform said artificial intelligence call handling operations, said artificial intelligence call handling operations including one or more of the following: directing said artificial intelligence system that originated said first call to move to a Machine to Machine (M:M) form of communication by transmitting contact information for another machine system to the artificial intelligence system which originated the first call via the media path or signaling path of the first call; advertising the capabilities offered by a M:M form of communication with said another machine system via information transmitted to the artificial intelligence system which originated the first call, said information being transmitted via the media path or signaling path of the first call.

System Embodiment 17A. The communications system of system embodiment 17, wherein the another machine system is a web service system; wherein the contact information for the web service system is a URL or web address of the web service system; and wherein the capabilities advertised include the type of communication interface supported by the web service system (e.g., English language text, Spanish language text, etc.) and the service provided by the web service system.

System Embodiment 17B. The communications system of system embodiment 17, wherein said contact information is provided as audio announcement played by the first device to said originating artificial intelligence system, said contact information including a URL address of a web service system.

System Embodiment 17C. The communications system of system embodiment 17, wherein said contact information is a URL address of a web service system included in a call rejection message sent by said first device to said artificial intelligence system that originated said first call.

System Embodiment 17D. The communications system of system embodiment 17C, wherein said call rejection message is a SIP 4XX message sent in response to a SIP INVITE message received as part of the first call from the artificial intelligence system which originated the first call.

System Embodiment 18. The communications system of system embodiment 17, wherein said artificial intelligence system that originated said first call stores the received contact information for the another machine system in memory.

System Embodiment 19. The communications system of system embodiment 18, wherein at a later time the artificial intelligence system that originated the first call accesses the received contact information for the another machine system from memory and uses it to place a machine to machine call to the another machine system instead of placing a voice call to the second device.

System Embodiment 20. The communications system of system embodiment 1, wherein receiving said first call includes receiving a call initiation request message including an artificial intelligence indicator indicating the first call is from an artificial intelligence system; and wherein the communications device includes an artificial intelligence system that receives said first call and makes said determination that said first call is a call originating from an artificial intelligence system based on said artificial intelligence indicator included in said call initiation message; and wherein said artificial intelligence call handling operation performed by said communications device includes responding to the call initiation message by: generating a call initiation response message including contact information for a web service system, and transmitting the call initiation response message to the artificial intelligence system that originated the first call.

System Embodiment 21. The communications system of system embodiment 20, wherein the call initiation request message is a SIP INVITE message with a header field including the artificial intelligence indicator; and wherein the call response message is a SIP 4XX response message including the contact information for the web service system, said contact information being a URL address.

System Embodiment 22. The communications system of system embodiment 1, wherein said communications device includes an artificial intelligence system, media of said first call including an artificial intelligence indicator; wherein said artificial intelligence system of the communications device is operated by said processor to make said determination that said first call is a call originating from an artificial intelligence system based on said artificial intelligence indicator included in said media of said first call; and wherein said artificial intelligence call handling operation performed by said communications device includes communicating via the media path of the first call to the artificial intelligence system that originated the first call an indication that the first call is a machine to machine call by playing an audio announcement message including contact information for a web service system inserted onto the media path connecting the first device to the artificial intelligence system from which the first call was originated.

System Embodiment 23. The communications system of system embodiment 22, wherein said artificial intelligence system included in the communications device is an Interactive Voice Response (IVR) system; wherein said contact information is a Universal Resource Identifier (URI).

System Embodiment 24. The communications system of system embodiment 23, wherein the artificial intelligence system included in the communications device also plays an announcement to the originating artificial intelligence system advertising one or more of the following: services provided by the web service (e.g., making or booking a flight reservations, updating a flight reservation, cancelling a flight reservation), the type of communications interfaces (e.g., speech recognition, text recognition, API interfaces) available for communicating with the web service system.

System Embodiment 25. The communications system of system embodiment 24, wherein said artificial intelligence system included in the first device announces that it is an artificial intelligence device upon the establishment of the media path of the first call and that the first call is being recorded.

List of Numbered Exemplary Apparatus Embodiments

Apparatus Embodiment 1. A user device comprising: a processor that controls the user device to: establish a first call with a second system by an artificial intelligence system or application included in the user device in response to a first request for service from a first user; request the service from the second system by playing an announcement; receive an indication that the second system is an artificial intelligence system via signaling or media received from the second system as part of the first call, said indication including a URI for a web service system; establish a connection with the web service system using said URI; complete a transaction with the web service system; notify the user of the user device that the requested service has been completed; store in memory of the user device the type of service requested by the user, contact information initially used to contact the second system, and the URI provided by the second system.

Apparatus Embodiment 2. The user device of apparatus embodiment 1, wherein the artificial intelligence system or application included in the user device in establishing the first call includes an indication in either the call signaling or the call media that the call is being originated from an artificial intelligence.

Apparatus Embodiment 3. The user device of apparatus embodiment 1, wherein said processor controls the user device to: receive a second request for service from a user of the user device, said second request being for the same type of service as included in said first request; refrain from initiating a call to the second system; retrieve from said memory said URI provided by the second system; establish a second connection with the web service system using said retrieved URI; complete a second transaction with the web service system; notify the user of the user device that the second requested service has been completed.

Apparatus Embodiment 4. The user device of apparatus embodiment 3, wherein said memory is cache memory; wherein said URI is a URL; wherein said notifying the user of the user device includes one or more of: displaying a notification on the display of the user device, updating a transaction log file on the user device, sending an e-mail to an e-mail account corresponding to the user that requested the service, playing an announcement on the speaker phone of the user device; sending a text message to the user device using Short Message Service, and sending a multimedia message to the user device using Multimedia Messaging Service.

Apparatus Embodiment 5. The user device of apparatus embodiment 4, wherein the requested service is one of the following: a request to make a transaction, a request to make a flight reservation, a request to change or update a flight reservation, a request to cancel a flight reservation, a request to determine the status of a flight, a request to make an appointment, a request to change an appointment, a request to purchase an item or service, a request for account information, a request to obtain information on the shipping status of a purchased item, a request for status on a refund (e.g., refund of a purchased item, tax refund, etc.), a request for information on an individual or business (e.g., contact information, telephone number, location or address, business hours, individual alive or deceased, SSN number, driver's license, bank information, credit information, account status, URI information, etc.).

List of Numbered Exemplary Computer Readable Medium Embodiments

Computer Readable Medium Embodiment 1. A non-transitory computer readable medium including a first set of computer executable instructions which when executed by a processor of a communication device cause the communications device to: receive a first call; determine whether said first call originated from an artificial intelligence system; and when said first call is determined to have originated from an artificial intelligence system perform one or more artificial intelligence call handling operations.

Computer Readable Medium Embodiment 2. The non-transitory computer readable medium of computer readable medium embodiment 1, wherein said first call is received from an originating system, said first call being destined for a second device, said communications device being located in the signaling and media path between the originating system and the second device; and wherein to perform artificial intelligence call handling operations includes: modifying said first call to include one or more artificial intelligence indicators in said signaling or said media of said first call, said one or more artificial intelligence indicators being artificial intelligence indicators not included in said first call; and transmitting said modified first call to said second device.

Computer Readable Medium Embodiment 3. The non-transitory computer readable medium of computer readable medium embodiment 1, wherein said communications device includes an artificial intelligence system; wherein said first said of instructions which when executed by the processor control the communications device to make said determination as to whether said first call originated from an artificial intelligence system; and when said first call is determined to have originated from an artificial intelligence system said first set of instructions which when executed by the processor control the communications device to perform said artificial intelligence call handling operations, said artificial intelligence call handling operations including one or more of the following: directing said artificial intelligence system that originated said first call to move to a Machine to Machine (M:M) form of communication by transmitting contact information for another machine system to the artificial intelligence system which originated the first call via the media path or signaling path of the first call; advertising the capabilities offered by a M:M form of communication with said another machine system via information transmitted to the artificial intelligence system which originated the first call, said information being transmitted via the media path or signaling path of the first call.

Computer Readable Medium Embodiment 4. A non-transitory computer readable medium including a first set of computer executable instructions which when executed by a processor of a user device cause the user device to: establish a first call with a second system by an artificial intelligence system or application included in the user device in response to a first request for service from a first user; request the service from the second system by playing an announcement; receive an indication that the second system is an artificial intelligence system via signaling or media received from the second system as part of the first call, said indication including a URI for a web service system; establish a connection with the web service system using said URI; complete a transaction with the web service system; notify the user of the user device that the requested service has been completed; store in memory of the user device the type of service requested by the user, contact information initially used to contact the second system, and the URI provided by the second system.

The techniques of various embodiments may be implemented using software, hardware and/or a combination of software and hardware. Various embodiments are directed to apparatus, e.g., AI devices, AI systems, user equipment, call processing devices, session border controllers, interworking devices, interworking systems, network nodes, customer premise equipment and/or network equipment devices. Various embodiments are also directed to methods, e.g., method of controlling and/or operating devices such as AI devices, AI systems, user equipment, call processing devices, session border controllers, interworking devices, interworking systems, network nodes, customer premise equipment and/or network equipment devices. Various embodiments are also directed to machine, e.g., computer readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements is implemented using hardware circuitry.

In various embodiments nodes and/or elements described herein are implemented using one or more components to perform the steps corresponding to one or more methods, for example, message reception, message generation, media processing, signal processing, sending, comparing, determining and/or transmission steps, detecting signals identifying AI calls, sessions, etc., generating signaling identifying calls, sessions, communications as AI calls, sessions or communications, voice recognition processing, biometric signal processing, etc. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., AI devices, AI systems, user equipment, call processing devices, session border controllers, interworking devices, interworking systems, network nodes, customer premise equipment and/or network equipment devices, including a processor configured to implement one, multiple or all of the steps of one or more methods of the invention.

In some embodiments, the processor or processors, e.g., CPUs, of one or more devices, e.g., AI devices, AI systems, user equipment, call processing devices, session border controllers, interworking devices, interworking systems, network nodes, customer premise equipment and/or network equipment devices, are configured to perform the steps of the methods described as being performed by the computing nodes, e.g., AI devices, AI systems, user equipment, call processing devices, session border controllers, interworking devices, interworking systems, network nodes, customer premise equipment and/or network equipment devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as AI devices, AI systems, user equipment, call processing devices, session border controllers, interworking devices, interworking systems, network nodes, customer premise equipment and/or network equipment devices with a processor which includes a component corresponding to each of the steps of the various described methods performed by the device in which the processor is included. In some but not all embodiments a device, e.g., AI devices, AI systems, user equipment, call processing devices, session border controllers, interworking devices, interworking systems, network nodes, customer premise equipment and/or network equipment devices, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope of the present invention. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
   receiving first call initiation signaling for a first call by a first device from an originating system, said first call initiation signaling being destined for a second device, said first device being located in a signaling path between the originating system and the second device;
   determining whether or not said first call initiation signaling originated from an artificial intelligence system; and
   when said first call initiation signaling is determined to have originated from an artificial intelligence system:
      modifying said first call initiation signaling to include one or more explicit artificial intelligence indicators indicating that the first call initiation signaling originated from an artificial intelligence system, said one or more explicit artificial intelligence indicators being artificial intelligence indicators not included in said first call initiation signaling; and
      transmitting said modified first call initiation signaling to said second device; and
   when said first call initiation signaling is determined to not have originated from an artificial intelligence system:
      modifying said first call initiation signaling to include one or more explicit artificial intelligence indicators indicating that the first call initiation signaling did not originate from an artificial intelligence system, said one or more explicit artificial intelligence indicators being artificial intelligence indicators not included in said first call initiation signaling; and
      transmitting said modified first call initiation signaling to said second device.

2. The communications method of claim 1,
   wherein said one or more explicit artificial intelligence indicators indicating that the first call initiation signaling did not originate from an artificial intelligence system includes at least one explicit artificial intelligence indicator supported or recognized by said second device.

3. The communications method of claim 1, wherein said one or more explicit artificial intelligence indicators indicating that the first call initiation signaling did originate from an artificial intelligence system includes at least one explicit artificial intelligence indicator supported or recognized by said second device.

4. The communications method of claim 1, wherein said first device is a network device.

5. The communications method of claim 1,
   wherein said first call initiation signaling includes a Session Initiation Protocol (SIP) INVITE request; and
   wherein modifying said first call initiation signaling to include one or more explicit artificial intelligence indicators indicating that the first call initiation signaling originated from an artificial intelligence system includes: (i) adding a SIP header or SIP parameter to the SIP INVITE request, said added SIP header or added SIP parameter including information indicating that the first call initiation signaling originated from an artificial intelligence system, or (ii) modifying a SIP header of the SIP INVITE request or a SIP parameter of the SIP INVITE request to include information indicating that the first call initiation signaling originated from an artificial intelligence system.

6. A communications method comprising:
   receiving first call initiation signaling for a first call by a first device from an originating system, said first call initiation signaling being destined for a second device, said first device being located in a signaling path between the originating system and the second device;
   determining whether or not said first call initiation signaling originated from an artificial intelligence system, said determining whether or not said first call initiation signaling originated from said artificial intelligence system includes: determining if an explicit artificial intelligence indicator is present in said first call initiation signaling; and
   when said first call initiation signaling is determined to have originated from an artificial intelligence system:
      modifying said first call initiation signaling to include one or more explicit artificial intelligence indicators indicating that the first call initiation signaling originated from an artificial intelligence system, said one or more explicit artificial intelligence indicators being artificial intelligence indicators not included in said first call initiation signaling; and
      transmitting said modified first call initiation signaling to said second device; and
      prior to modifying said first call initiation signaling to include one or more artificial intelligence indicators indicating that the first call initiation signaling originated from an artificial intelligence system, determining that the received first call initiation signaling does not include an explicit artificial intelligence indicator recognized or supported by said second device.

7. The communications method of claim 6, wherein determining whether or not said first call initiation signaling originated from said artificial intelligence system further includes:
when an explicit artificial intelligence indicator is determined to be present in said first call initiation signaling:
determining that the first call initiation signaling originated from an artificial intelligence system when the explicit artificial intelligence indicator included in the first call initiation signaling indicates that the first call initiation signaling originated from an artificial intelligence system; and
determining that the first call initiation signaling did not originate from an artificial intelligence system when the explicit artificial intelligence indicator included in the first call initiation signaling indicates that the first call initiation signaling did not originate from an artificial intelligence system.

8. The communications method of claim 6, wherein determining whether or not said first call initiation signaling originated from said artificial intelligence system further includes:
when an explicit artificial intelligence indicator is determined to be present in said first call initiation signaling:
determining that the first call initiation signaling originated from an artificial intelligence system when the presence of the explicit artificial intelligence indicator determined to be included in the first call initiation signaling is an indication that the first call initiation signaling originated from an artificial intelligence system.

9. The communications method of claim 6, further comprising:
prior to determining that the received first call initiation signaling does not include an explicit artificial intelligence indicator recognized or supported by said second device, receiving at the first device information identifying one or more explicit artificial intelligence indicators the second device is equipped to recognize or support.

10. The communication method of claim 9,
wherein said information identifying the explicit artificial intelligence indicators the second device is equipped to recognize or support is received from one or more of the following: the second device, an operator of the second device, a network operator, or an artificial intelligence interworking configuration equipment database.

11. The communications method of claim 6,
wherein said first call initiation signaling includes a Session Initiation Protocol (SIP) INVITE request; and
wherein modifying said first call initiation signaling to include one or more explicit artificial intelligence indicators indicating that the first call initiation signaling originated from an artificial intelligence system includes: (i) adding a SIP header or SIP parameter to the SIP INVITE request, said added SIP header or added SIP parameter including information indicating that the first call initiation signaling originated from an artificial intelligence system, or (ii) modifying a SIP header of the SIP INVITE request or a SIP parameter of the SIP INVITE request to include information indicating that the first call initiation signaling originated from an artificial intelligence system.

12. The communications method of claim 6,
wherein said first call initiation signaling includes a Session Description Protocol (SDP) Offer message; and
wherein modifying said first call initiation signaling to include one or more explicit artificial intelligence indicators indicating that the first call initiation signaling originated from an artificial intelligence system includes: (i) adding an SDP MIME to the SDP Offer message or (ii) modifying a field or of the SDP Offer message.

13. A first device comprising:
a processor, said processor controlling the first device to perform the following operations:
receive first call initiation signaling for a first call from an originating system, said first call initiation signaling being destined for a second device, said first device being located in a signaling path between the originating system and the second device;
determine whether or not said first call initiation signaling originated from an artificial intelligence system; and
when said first call initiation signaling is determined to have originated from an artificial intelligence system to:
modify said first call initiation signaling to include one or more explicit artificial intelligence indicators indicating that the first call originated from an artificial intelligence system, said one or more explicit artificial intelligence indicators being artificial intelligence indicators not included in said first call initiation signaling; and
transmit said modified first call initiation signaling to said second device; and
wherein when said first call initiation signaling is determined to not have originated from an artificial intelligence system, the processor further controls the first device to:
modify said first call initiation signaling to include one or more explicit artificial intelligence indicators indicating that the first call initiation signaling did not originate from an artificial intelligence system, said one or more explicit artificial intelligence indicators being artificial intelligence indicators not included in said first call initiation signaling; and
transmit said modified first call initiation signaling to said second device.

14. The first device of claim 13,
wherein said one or more explicit artificial intelligence indicators indicating that the first call initiation signaling did not originate from an artificial intelligence system includes at least one explicit artificial intelligence indicator supported or recognized by said second device.

15. The first device of claim 13, wherein said one or more explicit artificial intelligence indicators indicating that the first call initiation signaling did originate from an artificial intelligence system includes at least one explicit artificial intelligence indicator supported or recognized by said second device.

16. The first device of claim 13,
wherein determining whether or not said first call originated from said artificial intelligence system includes:
determining if an explicit artificial intelligence indicator is present in said first call initiation signaling.

17. The first device of claim 16,
wherein the processor further controls the first device to perform the following additional operations:
determine that the first call initiation signaling originated from an artificial intelligence system when the explicit artificial intelligence indicator included in the first call initiation signaling indicates that the first call initiation signaling originated from an artificial intelligence system; and
determine that the first call initiation signaling did not originate from an artificial intelligence system when the explicit artificial intelligence indicator included in the first call initiation signaling indicates that the first call initiation signaling did not originate from an artificial intelligence system.

18. A non-transitory computer readable medium including a first set of computer executable instructions which when executed by a processor of a first device cause the first device to:
receive first call initiation signaling for a first call from an originating system, said first call initiation signaling being destined for a second device, said first device being located in a signaling path between the originating system and the second device;
determine whether or not said first call initiation signaling originated from an artificial intelligence system; and
when said first call initiation signaling is determined to have originated from an artificial intelligence system to:
modify said first call initiation signaling to include one or more explicit artificial intelligence indicators indicating that the first call initiation signaling originated from an artificial intelligence system, said one or more explicit artificial intelligence indicators being artificial intelligence indicators not included in said first call initiation signaling; and
transmit said modified first call initiation signaling to said second device; and
when said first call initiation signaling is determined to not have originated from an artificial intelligence system to:
modify said first call initiation signaling to include one or more explicit artificial intelligence indicators indicating that the first call initiation signaling did not originate from an artificial intelligence system, said one or more explicit artificial intelligence indicators being artificial intelligence indicators not included in said first call initiation signaling; and
transmit said modified first call initiation signaling to said second device.

19. A first device comprising:
a processor, said processor controlling the first device to perform the following operations:
receive first call initiation signaling for a first call from an originating system, said first call initiation signaling being destined for a second device, said first device being located in a signaling path between the originating system and the second device;
determine whether or not said first call initiation signaling originated from an artificial intelligence system, said determine whether or not said first call initiation signaling originated from said artificial intelligence system including: determining if an explicit artificial intelligence indicator is present in said first call initiation signaling; and
when said first call initiation signaling is determined to have originated from an artificial intelligence system to:
modify said first call initiation signaling to include one or more explicit artificial intelligence indicators indicating that the first call originated from an artificial intelligence system, said one or more explicit artificial intelligence indicators being artificial intelligence indicators not included in said first call initiation signaling;
transmit said modified first call initiation signaling to said second device; and
prior to modifying said first call initiation signaling to include one or more artificial intelligence indicators indicating that the first call initiation signaling originated from an artificial intelligence system, determine that the received first call initiation signaling does not include an explicit artificial intelligence indicator recognized or supported by said second device.

20. A non-transitory computer readable medium including a first set of computer executable instructions which when executed by a processor of a first device cause the first device to:
receive first call initiation signaling for a first call from an originating system, said first call initiation signaling being destined for a second device, said first device being located in a signaling path between the originating system and the second device;
determine whether or not said first call initiation signaling originated from an artificial intelligence system, said determine whether or not said first call initiation signaling originated from said artificial intelligence system including: determining if an explicit artificial intelligence indicator is present in said first call initiation signaling; and
when said first call initiation signaling is determined to have originated from an artificial intelligence system to:
modify said first call initiation signaling to include one or more explicit artificial intelligence indicators indicating that the first call originated from an artificial intelligence system, said one or more explicit artificial intelligence indicators being artificial intelligence indicators not included in said first call initiation signaling;
transmit said modified first call initiation signaling to said second device; and
prior to modifying said first call initiation signaling to include one or more artificial intelligence indicators indicating that the first call initiation signaling originated from an artificial intelligence system, determine that the received first call initiation signaling does not include an explicit artificial intelligence indicator recognized or supported by said second device.

\* \* \* \* \*